(12) United States Patent
Torii et al.

(10) Patent No.: US 11,236,483 B2
(45) Date of Patent: Feb. 1, 2022

(54) ATTACHING-DETACHING STRUCTURE OF A FRONT LOADER, FRONT LOADER AND WORK VEHICLE

(71) Applicant: KUBOTA CORPORATION, Osaka (JP)

(72) Inventors: Shin Torii, Osaka (JP); Yuta Ozeki, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/950,264

(22) Filed: Nov. 17, 2020

(65) Prior Publication Data

US 2021/0071386 A1 Mar. 11, 2021

Related U.S. Application Data

(63) Continuation of application No. 15/975,104, filed on May 9, 2018, now Pat. No. 10,876,271.

(30) Foreign Application Priority Data

May 11, 2017 (JP) .............................. JP2017-094474
May 11, 2017 (JP) .............................. JP2017-094475
Nov. 2, 2017 (JP) .............................. JP2017-212979

(51) Int. Cl.
*E02F 3/627* (2006.01)
*B62D 49/02* (2006.01)
(Continued)

(52) U.S. Cl.
CPC .............. *E02F 3/627* (2013.01); *B62D 49/02* (2013.01); *E02F 3/34* (2013.01); *A01D 87/0076* (2013.01)

(58) Field of Classification Search
None
See application file for complete search history.

(56) References Cited

U.S. PATENT DOCUMENTS 3,746,368 A 7/1973 Gledhill et al.
3,991,890 A 11/1976 Frank
(Continued)

FOREIGN PATENT DOCUMENTS

EP 1 528 164 A1 4/2005
FR 2 747 137 A1 10/1997
(Continued)

OTHER PUBLICATIONS

Extended European Search Report dated Nov. 2, 2018 in EP 18171647.3.

(Continued)

*Primary Examiner* — Gerald McClain
(74) *Attorney, Agent, or Firm* — Greenblum & Bernstein P.L.C.

(57) ABSTRACT

A readily attaching-detaching structure of a front loader that can make the attaching and detaching work to a vehicle body easier, a front loader, and a work vehicle. The attaching-detaching structure of a front loader is provided with a first retained member that is on either a main frame on a vehicle body or a sub-frame that supports a boom; a second retained member on the other of the main frame or the sub-frame; a first retaining member that retains the first retained member and is on the side opposite of the first retained member; a second retaining member that retains the second retained member and is on the side opposite to the second retained member; a first guiding member that guides the first retained member to the first retaining member when the sub-frame is mounted on the main frame; and a second guiding member that guides the second retained member to the second (Continued)

retaining member when the sub-frame is mounted on the main frame.

8 Claims, 34 Drawing Sheets

(51) Int. Cl.
    *E02F 3/34*         (2006.01)
    *A01D 87/00*     (2006.01)

(56) References Cited

U.S. PATENT DOCUMENTS

| | | | |
|---|---|---|---|
| 4,780,046 | A | 10/1988 | Friesen et al. |
| 5,387,075 | A | 2/1995 | Aoki |
| 7,549,832 | B2 * | 6/2009 | Mailleux ............... E02F 3/6273 172/274 |
| 10,145,082 | B2 | 12/2018 | Miyazaki |
| 2003/0009920 | A1 | 1/2003 | Aoki et al. |
| 2007/0292254 | A1 | 12/2007 | Mailleux |
| 2010/0127513 | A1 | 5/2010 | Akahane et al. |
| 2015/0093227 | A1 | 2/2015 | Faivre |

FOREIGN PATENT DOCUMENTS

| | | | | |
|---|---|---|---|---|
| FR | 2747137 | A1 * | 10/1997 | ........... A01B 59/048 |
| JP | H06-264465 | A | 9/1994 | |
| JP | 2008-501879 | A | 1/2008 | |
| JP | 2008-285960 | A | 11/2008 | |
| JP | 2011-126325 | A | 6/2011 | |

OTHER PUBLICATIONS

Office Action issued in Japanese family member having Patent Appl. No. 2017-094474, dated Jun. 3, 2020 and English translation thereof.

Office Action issued in Japanese family member having Patent Appl. No. 2017-094475, dated Jun. 3, 2020 and English translation thereof.

* cited by examiner

FIG. 3
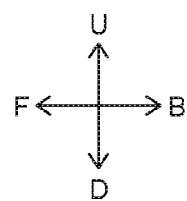
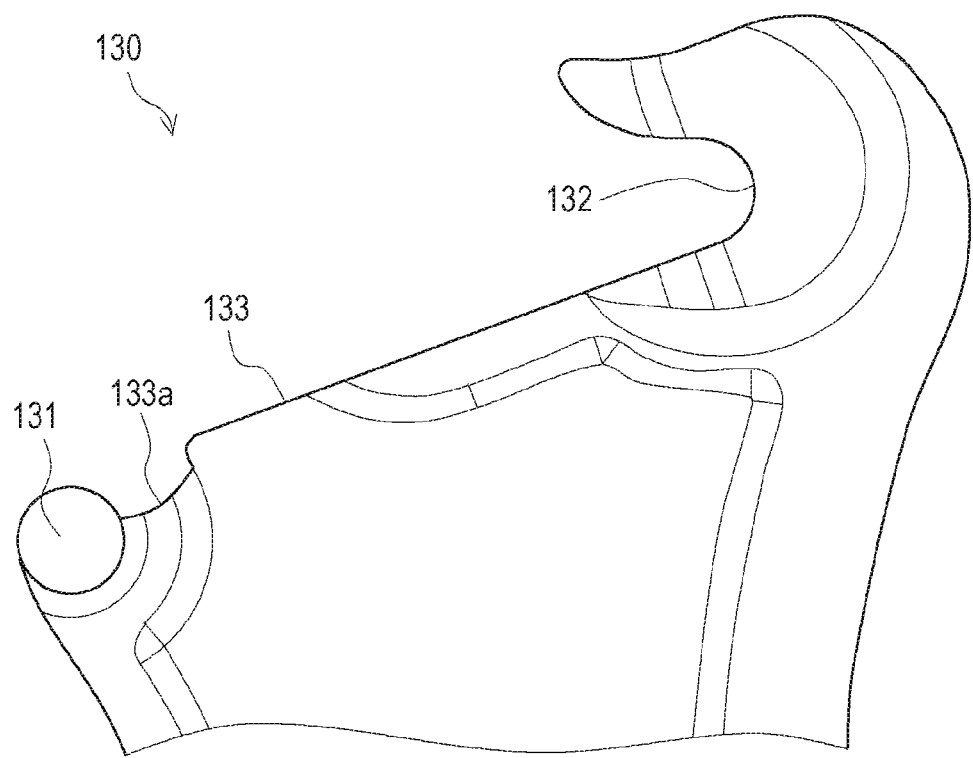

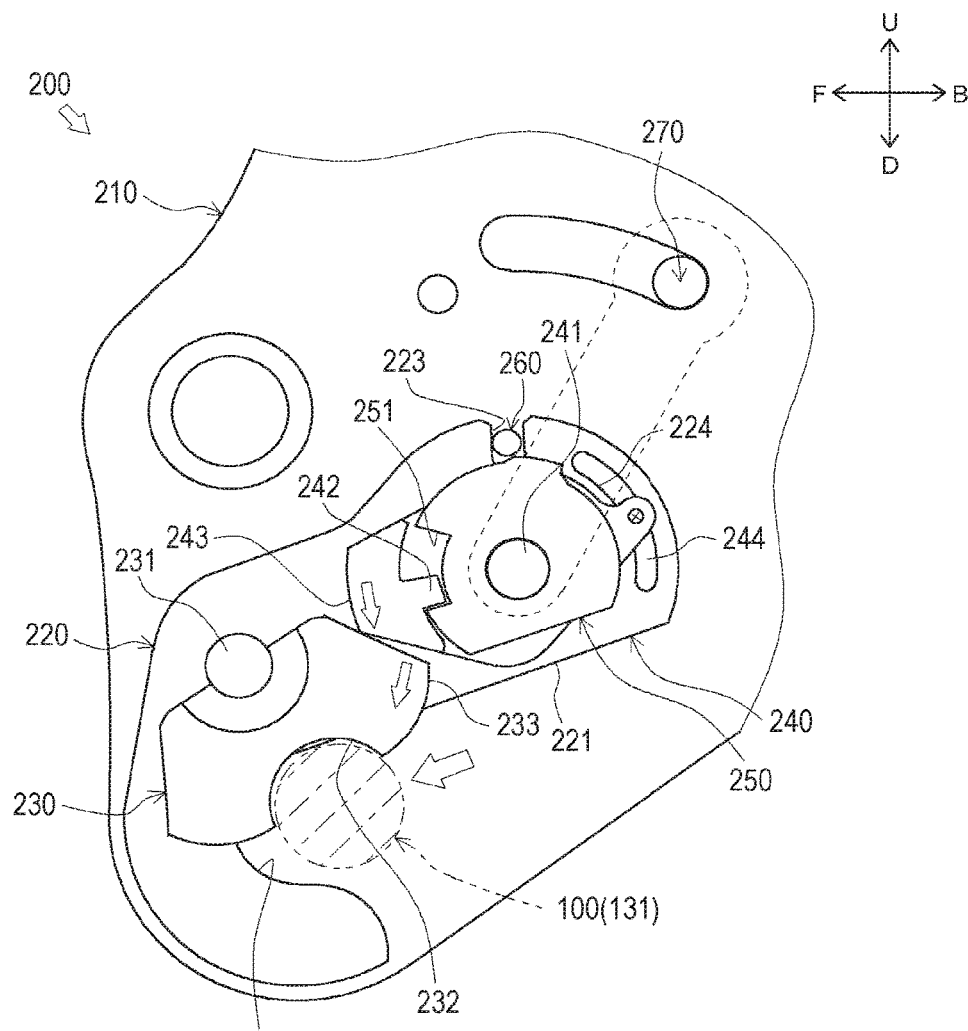
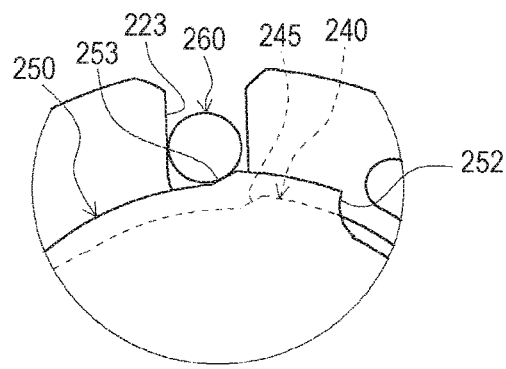

ATTACHING-DETACHING STRUCTURE OF A FRONT LOADER, FRONT LOADER AND WORK VEHICLE

CROSS-REFERENCE TO RELATED APPLICATIONS

This is a continuation application of U.S. patent application Ser. No. 15/975,104, filed on May 9, 2018, which claims priority to Japanese Patent Application No. 2017-212979, filed on Nov. 2, 2017, Japanese Patent Application No. 2017-94474, filed May 11, 2017, and Japanese Patent Application No. 2017-94475, filed on May 11, 2017. The disclosure of each of these applications is herein incorporated by reference in its entirety.

FIELD OF THE INVENTION

The present invention relates to the technology of attaching-detaching structures, such as a front loader, and such structures mounted on a working vehicle, such as a tractor, etc., (i.e., such structures which are readily attachable and detachable) to enable ready attaching and detaching of front loaders and similar equipment on work vehicles such as tractors and the like.

BACKGROUND

Technology for an attaching-detaching structure of a front loader mounted on a working vehicle such as a tractor, etc., is well known from the past. An example is described in JP 2011-126325 A.

In JP 2011-126325 A, described is a tractor provided with a front loader for performing loading of earth and sand, etc. That front loader is mounted on a vehicle body of the tractor via a work support unit attached to a main frame.

This kind of front loader is removed from the vehicle body when not needed, and is mounted on the vehicle body when needed. For this reason, there is demand for a front loader for which the work of attaching and detaching to the vehicle body is easy.

SUMMARY

The present invention was created considering the status described above, and the problem it is to solve is to provide an attaching-detaching structure of a front loader that can make the work of attaching and detaching to a vehicle body easier, a front loader, and a work vehicle.

The problem that the present invention is to solve is as described above, and next, the means for solving this problem is explained.

Specifically, an attaching-detaching structure of a front loader of one mode of the present invention comprises an engaging member supported on a sub-frame for supporting a boom so as to be movable between an engagement position and a release position, wherein the engagement position is a position for engaging with a main frame provided on a vehicle body, and the release position is a position at which engagement with the main frame is released, and biased in the release direction to the release position from the engagement position; and a regulating member supported on the sub-frame so as to be movable between a regulated position and a regulation release position, wherein the regulated position is a position for regulating the movement of the engaging member to the release direction from the engagement position, and the regulation release position is a position where the engaging member is allowed to move to the release position.

According to an embodiment, the regulating member is configured, in the regulated position, to abut with the engaging member positioned at the engagement position, and to regulate the movement of the engaging member in the release direction.

According to this configuration, it is possible to regulate the movement of the engaging member in the release direction using a simple structure.

According to an embodiment, the engaging member is configured to be supported on the sub-frame to be able to swing between the engagement position and the release position.

According to this configuration, using a simple structure, it is possible to engage the engaging member with the main frame, and also possible to release engagement of the engaging member with the main frame.

According to an embodiment, the regulating member s configured to be supported on the sub-frame to be able to swing between the regulated position and the regulation release position.

According to this configuration, using a simple structure, it is possible to regulate the movement of the engaging member in the release direction from the engagement position, and also to release regulation of the movement of the engaging member.

According to an embodiment, the engaging member is configured, when the main frame moves relatively to approach the sub-frame, to be pressed by the main frame, and move toward the engagement position from the release position.

According to this configuration, by having the vehicle body approach the sub-frame that is removed from the vehicle body (main frame), it is possible to easily engage the engaging member with the main frame.

According to an embodiment, the regulating member is biased in a regulated direction toward the regulated position from the regulation release position, and the regulating member is configured, when the engaging member moves toward the engagement position from the release position, to follow the engaging member and move in the regulated direction from the regulation release position.

According to this configuration, when the engaging member returns to the engagement position and is engaged with the main frame, it is possible to return the regulating member to the regulated position, and thus possible to regulate the movement of the engaging member in the release direction using the regulating member.

According to an embodiment, provided is a retention mechanism retaining the regulating member at the regulated position and the regulation release position.

According to this configuration, by retaining the regulating member at the regulated position, it is possible to retain the engaging member at the engagement position. Also, by retaining the regulating member at the regulation release position, it is possible to retain the engaging member at the release position.

According to an embodiment, provided is a retention mechanism retaining the regulating member at the regulated position and the regulation release position; wherein the retention mechanism has a detent mechanism configured to lock the regulating member at an intermediate position between the regulated position and the regulation release position so as not to move in the regulated direction; and the engaging member is configured to, in a state for which the regulating member is locked at the intermediate position by the detent mechanism, when moved in the release direction, press the regulating member to be moved to the regulation release position.

According to this configuration, it is possible to suppress the engaging member from forcefully moving to the release position.

According to an embodiment, the detent mechanism has a locking part biased to abut the outer periphery part of the regulating member, and a locked part provided on the regulating member, and is locked by the locking part in the intermediate position.

According to this configuration, by having the locking part locked to the locked part, it is possible to retain the regulating member at the intermediate position.

According to an embodiment, provided is a control member configured to, when the regulating member moves toward the regulated direction from the regulation release position, avoid having the locking part be locked to the locked part in the intermediate position.

According to this configuration, when moving the regulating member toward the regulation release position from the regulated position, it is possible to retain the regulating member at the intermediate position, and when moving the regulating member toward the regulated position form the regulation release position, it is possible to move the regulating member to the regulated position without retaining at the intermediate position.

According to an embodiment, the control member is configured to avoid the locking part being locked to the locked part by pressing the locking part in resistance to the biasing force received by the locking part in the intermediate position.

According to this configuration, with a simple structure, when moving the regulating member toward the regulated position from the regulation release position, it is possible to move the regulating member to the regulated position without retaining at the intermediate position.

According to an embodiment, the engaging member is configured to be supported on the sub-frame to be able to swing between the engagement position and the release position; the regulating member is configured to be supported on the sub-frame to be able to swing between the regulated position and the regulation release position; a swing shaft of the engaging member is arranged to be parallel with a swing shaft of the regulating member; an abutting part of the regulating member and the engaging member is formed in an arc shape with the swing shaft of the regulating member as the center in the swing-axis-line direction view of the regulating member; and an abutting part of the engaging member and the regulating member is formed in an arc shape for which the radius of curvature is approximately the same radius of curvature as that of the abutting part of the regulating member and the engaging member in the swing-axis-line direction view of the engaging member.

According to this configuration, it is possible to swing the regulating member without being hindered by the engaging member.

According to an embodiment, the regulating member is configured such that in the regulated position, the pressing force received from the engaging member positioned at the engagement position faces the swing center of the regulating member.

According to this configuration, when the regulating member is regulating the swing of the engaging member, it is possible to prevent having the regulating member swing due to pressing force received from the engaging member.

Also, a front loader according to one mode of the present invention is provided with the attaching-detaching structure.

According to this configuration, it is possible to provide the front loader that can make the work of attaching and detaching to the vehicle body easier.

Also, the work vehicle according to one mode of the present invention is provided with the front loader.

According to this configuration, it is possible to provide the work vehicle that can make the work of attaching and detaching the front loader to the vehicle body easier.

The present invention is able to make the work of attaching and detaching to the vehicle body easier. In specific terms, simply by moving the regulating member to the regulation release position, it is possible to easily move the engaging member to the release position, and thus it is possible to release the engagement of the engaging member and the main frame.

BRIEF DESCRIPTION OF THE DRAWINGS

FIG. 3 is a left side view of the top part of a main frame.

FIG. 8 (*b*) is a partial enlarged view of FIG. 8 (*a*).

FIG. 9 (*b*) is a partial enlarged view of FIG. 9 (*a*).

FIG. 10 (*b*) is a partial enlarged view of FIG. 10 (*a*).

FIG. 11 (*b*) is a partial enlarged view of FIG. 11 (*a*).

FIG. 12 (*b*) is a partial enlarged view of FIG. 12(*a*).

FIG. 15 (*b*) is a partial enlarged view of FIG. 15 (*a*).

FIG. 16 (*a*) is a left side view showing a part of the sub-frame unit midway in mounting on the main frame.

FIG. 16 (*b*) is a partial enlarged view of FIG. 16 (*a*).

FIG. 17 (b) is a partial enlarged view of FIG. 17 (a).

DETAILED DESCRIPTION OF PREFERRED EMBODIMENTS

Figure 1:
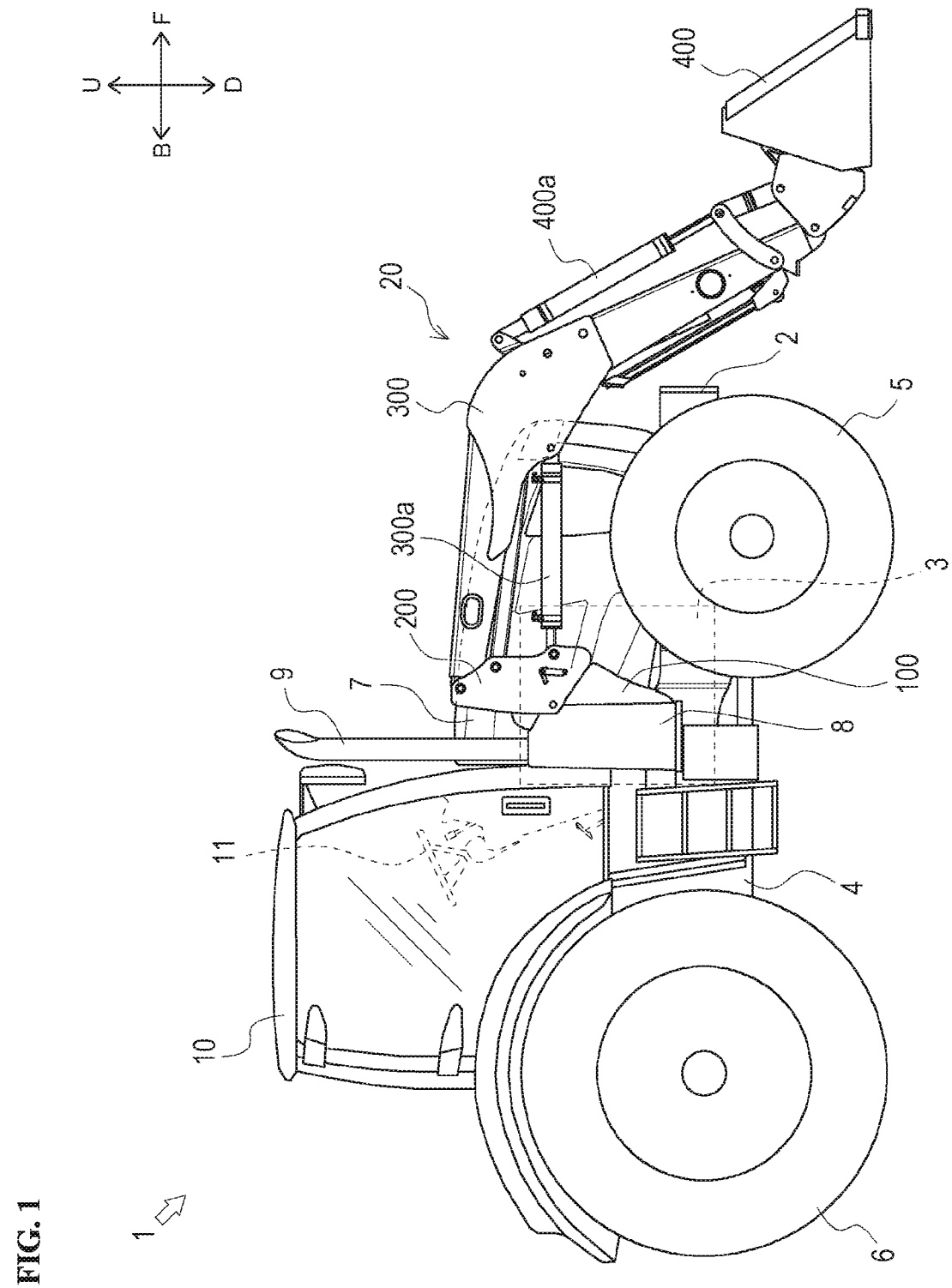
FIG. 1 is a side view showing the overall configuration of a tractor in which the front loader of one embodiment of the present invention is mounted.

Hereafter, the explanation will be given with the directions indicated in the drawing as arrow U, arrow D, arrow F, arrow B, arrow L, and arrow R defined as the up direction, down direction, front direction, back direction, left direction, and right direction.

Figure 2:
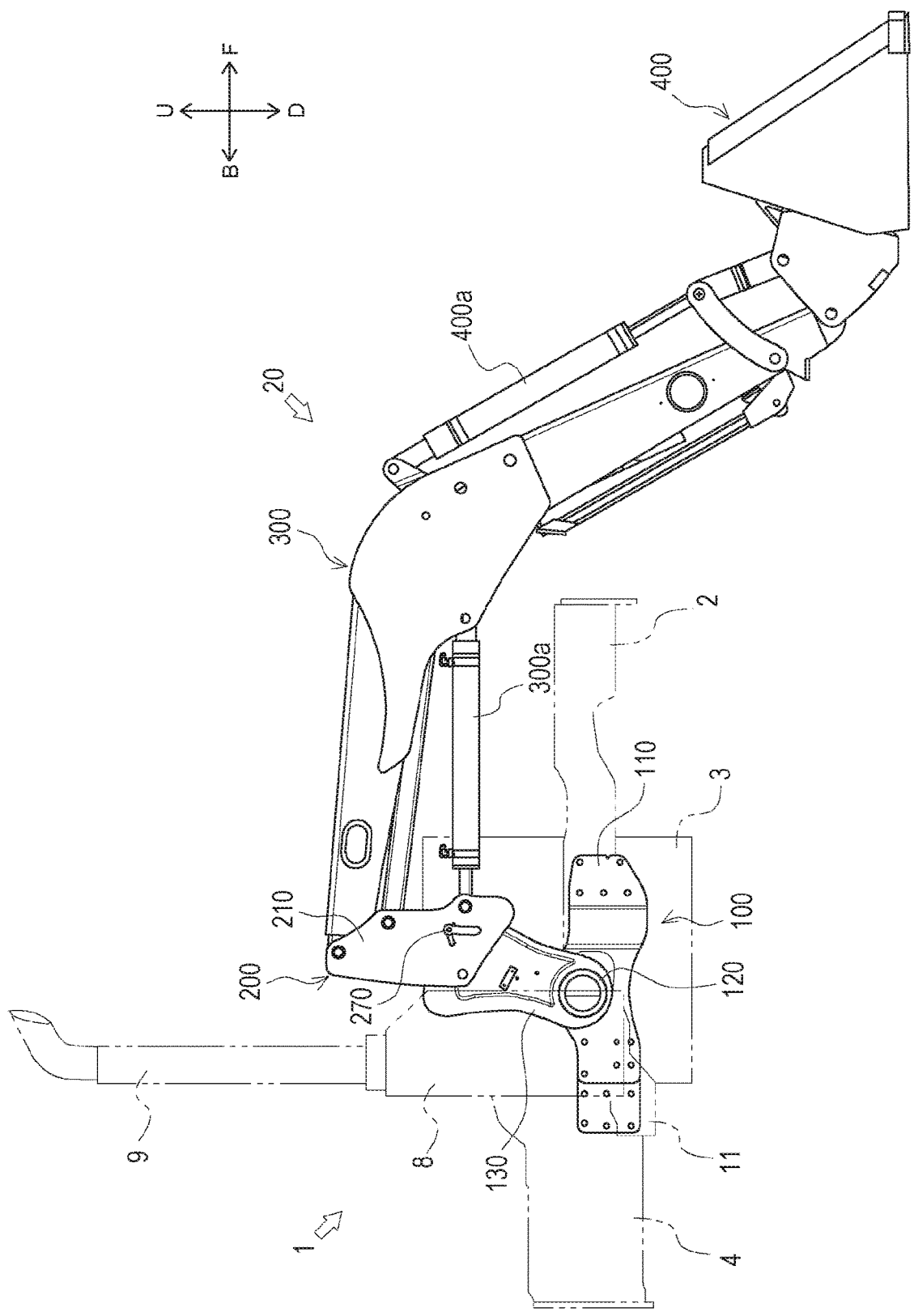
FIG. 2 is a side view of the front loader attached to a body frame, etc.

First, the overall configuration of a vehicle body 1 of a tractor provided with a front loader 20 of a first embodiment of the present invention is explained using FIG. 1 and FIG. 2.

The tractor is equipped mainly with a body frame 2, an engine 3, a transmission case 4, front wheels 5, rear wheels 6, a hood 7, an SCR 8, a muffler 9, a cabin 10, a steering wheel 11, and a front loader 20.

The body frame 2 is a frame shaped member formed by suitably combining of a plurality of plates. The body frame 2 is formed in an approximately rectangular shape in plan view. The body frame 2 is placed at the front part of the vehicle body 1 with the lengthwise direction facing the front-back direction. The engine 3 is fixed to the back part of the body frame 2. The transmission case 4 is fixed to the back part of the engine 3. The front part of the body frame 2 is supported on the left-right pair of front wheels 5 via a front axle mechanism (not shown). The back part of the transmission case 4 is supported on a left-right pair of rear wheels 6 via a rear axle mechanism (not shown). The engine 3 is covered by the hood 7.

The SCR (Selective Catalytic Reduction) 8 for purifying the exhaust gas of the engine 3 is placed at the right side of the hood 7. The muffler 9 that exhausts the exhaust gas of the engine 3 is placed on the top part of the SCR 8. The SCR 8 and the muffler 9 are fixed on the transmission case 4.

The power of the engine 3, after gear shifting is done by a transmission device (not shown) housed inside the transmission case 4, can be transmitted to the front wheels 5 via the front axle mechanism, and can also be transmitted to the rear wheels 6 via the rear axle mechanism. The front wheels 5 and the rear wheels 6 are rotationally driven by the power of the engine 3, and the tractor is able to travel.

The cabin 10 is provided behind the engine 3. A dwelling space in which the driver rides is formed in the interior of the cabin 10. In the dwelling space are placed a steering wheel 11 for adjusting the steering angle of the front wheels 5, various operation tools (not shown), and a seat (not shown) for the driver to sit on, etc.

The front loader 20 is mounted on the front part of the vehicle body 1. The front loader 20 is mainly equipped with a left-fight pair of main frames 100, a left-right pair of sub-frame units 200, a left-right pair of booms 300, and a bucket 400.

The main frames 100 are respectively fixed to the left and right of the vehicle body 1 (body frame 2 and transmission case 4). The sub-frame units 200 are detachably supported on the top part of each main frame 100. The booms 300 are supported to be able to rotate on each sub-frame unit 200. The booms 300 are placed so as to extend facing front and downward from the top part of the main frames 100. The bucket 400 is rotatably coupled to the front end parts of the booms 300. By expanding and contracting the boom cylinders 300a of the booms 300, it is possible to rotate with respect to the sub-frame units 200. By expanding and contracting the bucket cylinder 400a, the bucket 400 can be rotated with respect to the booms 300. In this way, it is possible to perform transport work or earth and sand, etc., while suitably rotating the booms 300 and the bucket 400.

Figure 7:
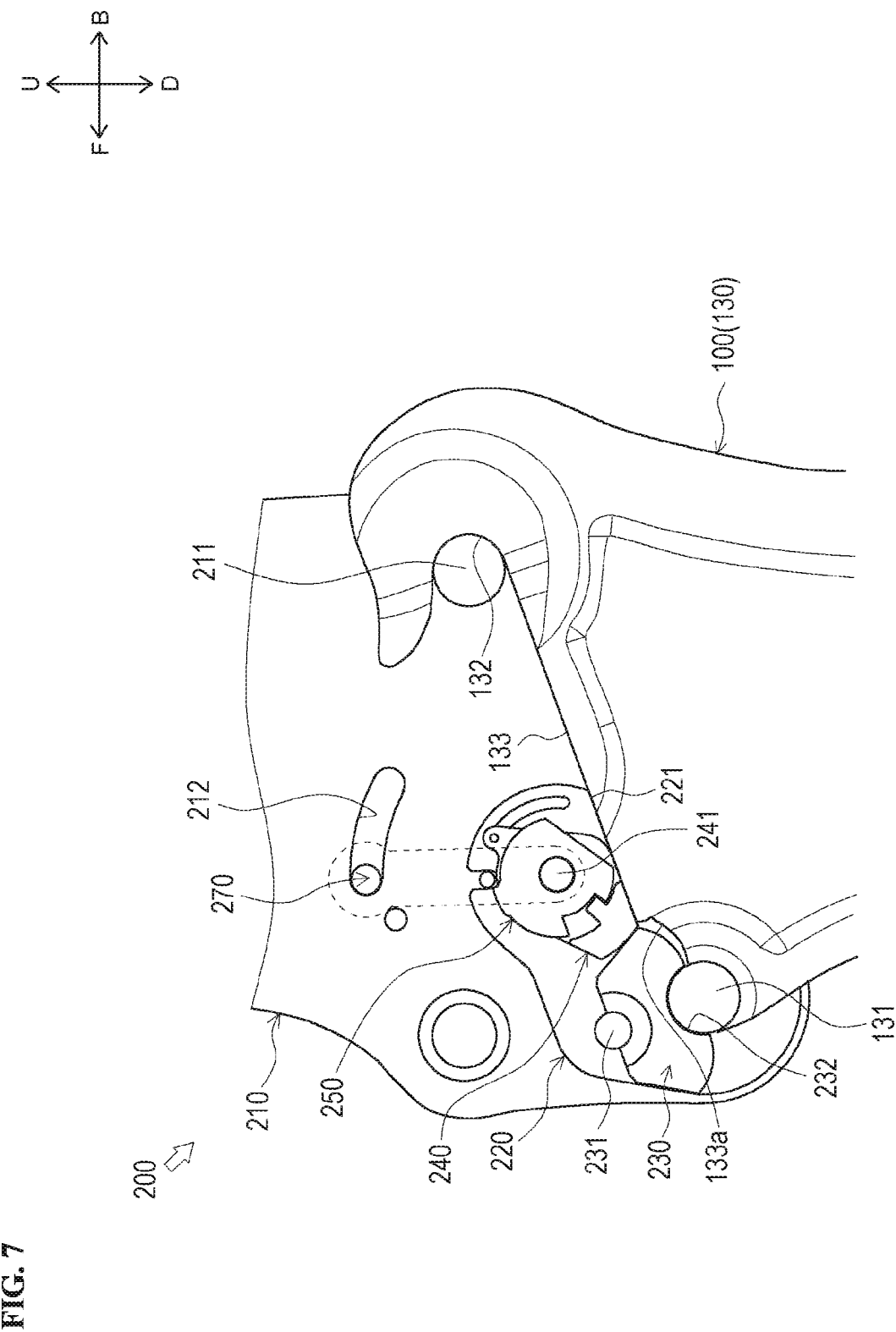
FIG. 7 is a left side view showing the attaching-detaching structure of the main frame and the sub-frame unit.

Next, the detailed configuration of the main frames 100 is explained using FIG. 2, FIG. 3, and FIG. 7. The left-right pair of main frames 100 is placed at mutually symmetrical left-right positions.

The main frame 100 shown in FIG. 2 supports the sub-frame unit 200 that supports the boom 300. Said another way, the main frame 100 is an item that supports the boom 300 via the sub-frame unit 200. The main frame 100 is mainly equipped with a fixed frame 110, a coupling frame 120, and a support frame 130.

The fixed frame 110 shown in FIG. 2 is a part that is fixed to the vehicle body 1. The fixed frame 110 is formed in a plate shape with the plate surfaces facing the left-right direction. The fixed frame 110 is fixed to the body frame 2 using bolts, etc.

The coupling frame 120 shown in FIG. 2 is an item that couples the fixed frame 110 and the support frame 130 that is described later. The coupling frame 120 is formed in an approximately cylindrical shape with the axis line facing the left-right direction. One end part (left end) of the coupling frame 120 is inserted through the fixed frame 110, and is suitably fixed to the fixed frame 11 by welding.

The support frame 130 shown in FIG. 2 is a part that supports the sub-frame unit 200. The support frame 130 is formed in a plate shape with the plate surfaces facing the left-right direction. The support frame 130 is placed with the lengthwise direction facing the up-down direction. The coupling frame 120 is inserted through the bottom part of the support frame 130, and the support frame 130 and the coupling frame 120 are fixed by welding. Formed on the support frame 130 are a main frame side pin 131, a main frame side hook 132, and a main frame side guide face 133.

The main frame side pin 131 shown in FIG. 3 and FIG. 7 is a part retained by the sub-frame unit 200 described later (more specifically, the sub-frame side hook 222 of the guide plate 220). The main frame side pin 131 is formed in a round pillar shape with the axis line facing the left-right direction at the front top end part of the support frame 130. The main frame side pin 131 is formed so as to project at left and right from the support frame 130.

The main frame side hook 132 shown in FIG. 3 and FIG. 7 is a part that retains the sub-frame unit 200 described later (more specifically, a sub-frame side pin 211 of the sub-frame 210). The main frame side hook 132 is formed in approximately a U shape with the front side opened in the side view, and can support the sub-frame side pin 211 described later from below. The main frame side hook 132 is formed on the back top end part of the support frame 130, and further above than the main frame side pin 131.

The main frame side guide face 133 shown in FIG. 3 and FIG. 7, when the sub-frame unit 200 described later is mounted on the main frame 100, is an item for guiding the sub-frame unit 200 (more specifically, the sub-frame side pin 211 of the sub-frame 210) to the attachment position. The main frame side guide face 133 is formed in a planar shape with the surface facing approximately upward on the top end part of the support frame 130. More specifically, the main frame side guide face 133 is formed between the main frame side pin 131 and the main frame side hook 132, in a front-declining inclined plane form for which the vertical direction height becomes lower as it faces forward. The main frame side guide face 133 is not formed continuously to the main frame side pin 131, but rather has a recess 133*a* formed between the main frame side pin 131 and the main frame side guide face 133. By having the recess 133*a* formed, it is possible to prevent deformation and damage of the main frame side pin 131 due to contact impact, etc., during attaching and detaching.

Figure 4:
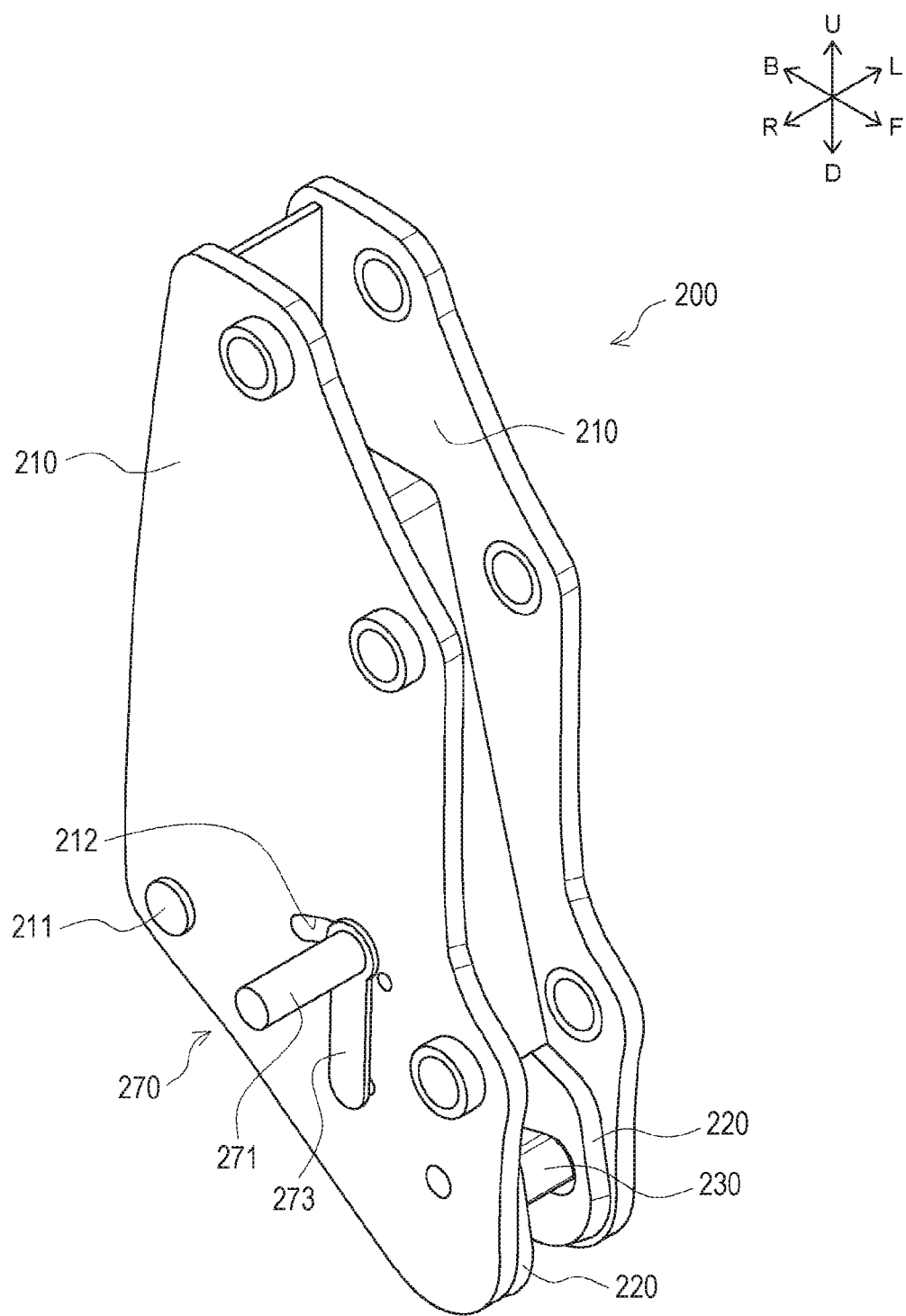
FIG. 4 is a right upper perspective view of a sub-frame unit.
Figure 8A:
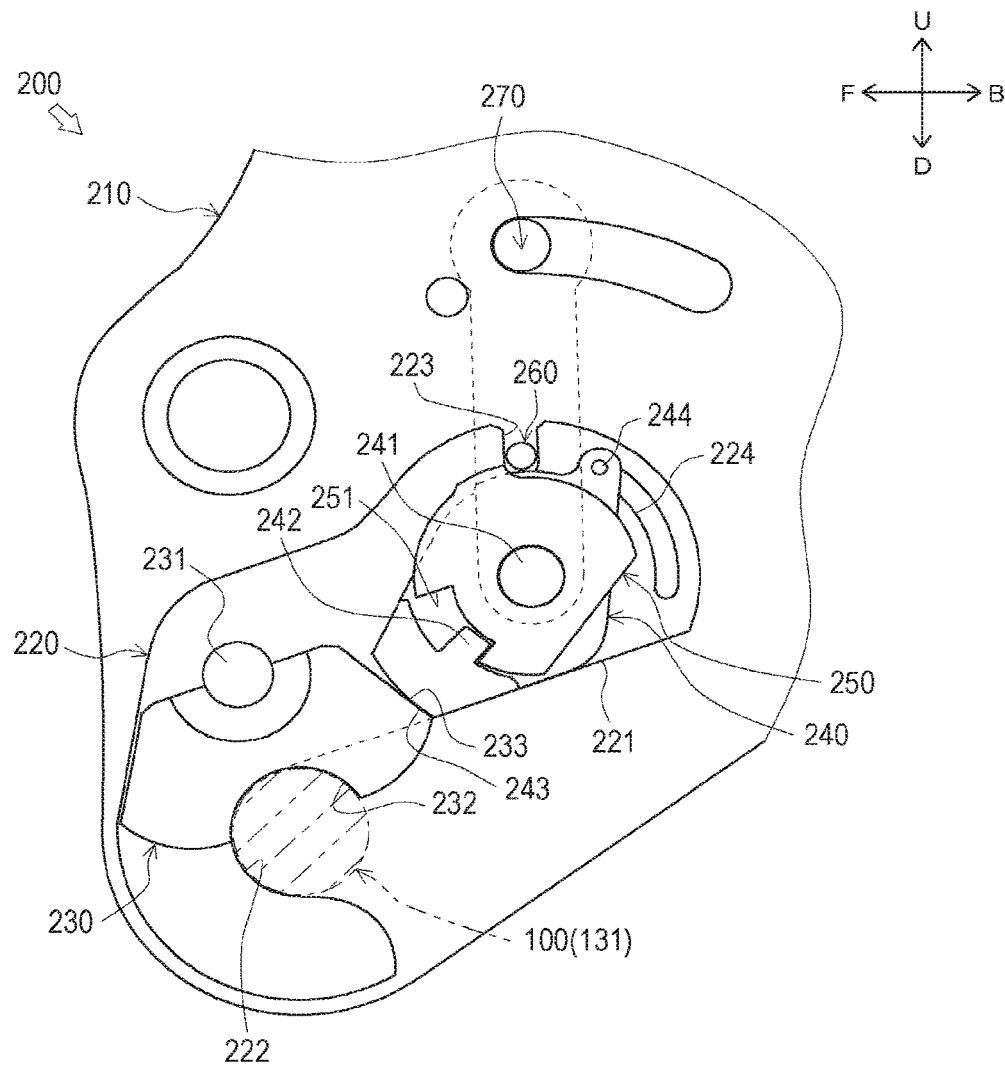
FIG. 8 (*a*) is a left side view showing a part of the sub-frame unit in a state retained on the main frame.
Figure 8B:
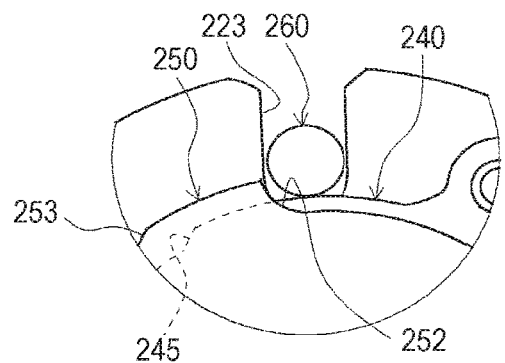

Next, the detailed configuration of the sub-frame unit 200 is explained using FIG. 4 and FIG. 8. The left-right pair of sub-frame units 200 is formed in a mutually left-right symmetrical form, and in FIG. 4 to FIG. 8 (and in FIG. 9 to FIG. 19 described later), of the left-right pair of sub-frame units 200, the right side sub-frame unit 200 is illustrated. Hereafter, unless specifically noted otherwise, the right side sub-frame unit 200 is explained, and explanation of the left side sub-frame unit 200 is omitted. Also, in FIG. 4 to FIG. 8, the sub-frame unit 200 is shown in a state mounted on the main frame 100 (mounted state), and hereafter, the explanation is made using this mounted state as the standard.

The sub-frame unit 200 is a part provided between the main frame 100 and the boom 300. The sub-frame unit 200 rotatably supports the boom 300 at the top part (see FIG. 2). The sub-frame unit 200 is equipped with the sub-frame 210, the guide plate 220, a thumb 230, a lock bar 240, a control plate 250, a detent pin 260, and an operation tool 270.

The sub-frame 210 is a part configuring the right part and the left part of the sub-frame unit 200. The sub-frame 210 is formed in a plate form with the plate surfaces facing the left-right direction. The sub-frame 210 is placed with the lengthwise direction facing the up-down direction. The sub-frames 210 are provided in a pair at left and right, and are connected to each other using a suitable member. In FIG. 5 to FIG. 8 (and in FIG. 9 to FIG. 20 described later), for convenience of the explanation, illustration of the left side sub-frame 210 is omitted. The sub-frame side pin 211 and a regulating hole 212 are formed on the sub-frame 210.

Figure 5:
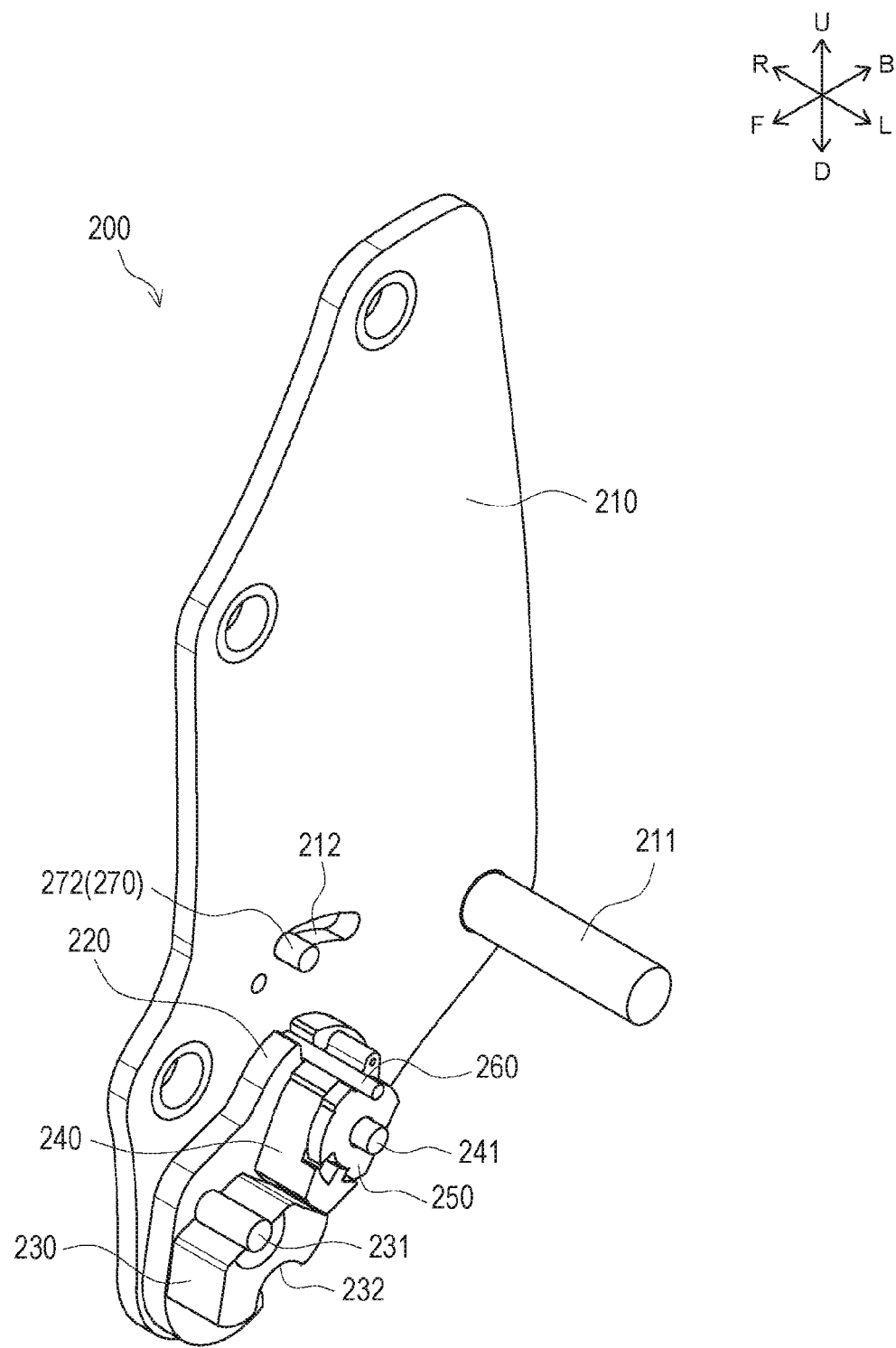
FIG. 5 is a left upper perspective view of the sub-frame unit.

The sub-frame side pin 211 shown in FIG. 4, FIG. 5, and FIG. 7 is a part retained by the main frame side hook 132 of the support frame 130 (see FIG. 3). The sub-frame side pin 211 is formed in a round pillar shape. The sub-frame side pin 211 is fixed to the rear bottom part of the sub-frame 210 in a state with the axis line facing the left-right direction. The sub-frame side pin 211 is provided between the left-right pair of sub-frames 210 so as to connect the left-right pair of sub-frames 210.

The regulating hole 212 shown in FIG. 4 to FIG. 8 is an item for regulating the operating range of the operation tool 270 described later. The regulating hole 212 is formed so as to pierce through the sub-frame 210 in the left-right direction. The regulating hole 212 is formed in a partial ring shape with a central angle of approximately 30°, and has the swing center (swing shaft 241) of the lock bar 240 described later as the center in the side view.

The guide plate 220 shown in FIG. 4 to FIG. 8 is for guiding the main frame 100 to the attachment position and retaining the main frame 100 in that attachment position when mounting the sub-frame unit 200 on the main frame 100. The guide plate 220 is formed in a plate shape with the plate surfaces facing the left-right direction. A pair of the guide plates 220 is provided at left and right. Each guide plate 220 is respectively fixed on the inside of the left and right pair of the sub-frames 210. In FIG. 5 to FIG. 8 (and in FIG. 9 to FIG. 20 described later), for convenience of the explanation, an illustration of the left side guide plate 220 is omitted. On the guide plate 220 are formed a sub-frame side guide face 221, the sub-frame side hook 222, a notch part 223, and an engaging hole 224.

The sub-frame side guide face 221 shown in FIG. 7 and FIG. 8 is an item for guiding the main frame side pin 131 to the attachment position when mounting the sub-frame unit 200 on the main frame 100. The sub-frame side guide face 221 is formed in a planar shape with the surface facing approximately downward on the bottom end part of the guide plate 220. More specifically, the sub-frame side guide face 221 is formed in an inclined plane form for which the vertical direction height become slower as it faces forward. The sub-frame side guide face 221 is formed so as to be parallel to the main frame side guide face 133. The sub-frame side guide face 221 is % lined so as to extend from the rear end part of the guide plate 220 to near the front end part (more specifically, the sub-frame side hook 222 described later).

The sub-frame side hook 222 is a part that retains the main frame side pin 131 of the main frame 100. The sub-frame side hook 222 is formed on the front lower part of the guide plate 220. The sub-frame side hook 222 is formed in approximately a U shape with the back opened in the side view, and is able to support the main frame side pin 131 described later from below. The sub-frame side hook 222 is connected with the front end part of the sub-frame side guide face 221.

The notch part 223 shown in FIG. 8 is an item for regulating the movement of the detent pin 260 described later. The notch part 223 is formed so that the top end part of the guide plate 220 is open. The notch part 223 is formed so as to extend downward from the top end part of the guide plate 220.

The engaging hole 224 shown in FIG. 8 is an item for regulating the swing range of the lock bar 240 described later. The engaging hole 224 is formed so as to pierce through the guide plate 220 in the left-right direction. The engaging hole 224 is formed in a partial ring shape with a central angle of approximately 65° with the swing center of the lock bar 240 described later (swing shaft 241) as the center in the side view. The engaging hole 224 is formed on the rear upward of the swing shaft 241.

The thumb 230 shown in FIG. 4 to FIG. 8 is an item for retaining the main frame side pin 131 immovably on the sub-frame side hook 222 (for preventing the main frame side pin 131 from falling off from the sub-frame side hook 222). The thumb 230 is formed in an approximately trapezoidal shape in the side view. The thumb 230 is provided between the left-right pair of guide plates 220. The swing shaft 231 with the axis line facing the left-right direction is formed on the top part of the thumb 230. The thumb 230 is supported to be able to swing around the axis line of the swing shaft 231 on the sub-frame 210 above the main frame side pin 131. With the thumb 230, the thumb 230 is biased in the direction for swinging in the counterclockwise direction in the left side view (see FIG. 8) using an biasing means such as a spring, etc. On the thumb 230, in addition to the swing shaft 231, formed are an engagement groove 232 and a thumb side abutting surface 233.

The engagement groove 232 shown in FIG. 5 and FIG. 8 is a part that engages with the main frame side pin 131. The engagement groove 232 is formed on the thumb 230 bottom part, and the front-back center part. The engagement groove 232 is formed in a semicircular arc shape that opens downward in the side view. The engagement groove 232 is formed so that the diameter is approximately the same as the diameter of the main frame side pin 131 in the side view.

Figure 6:
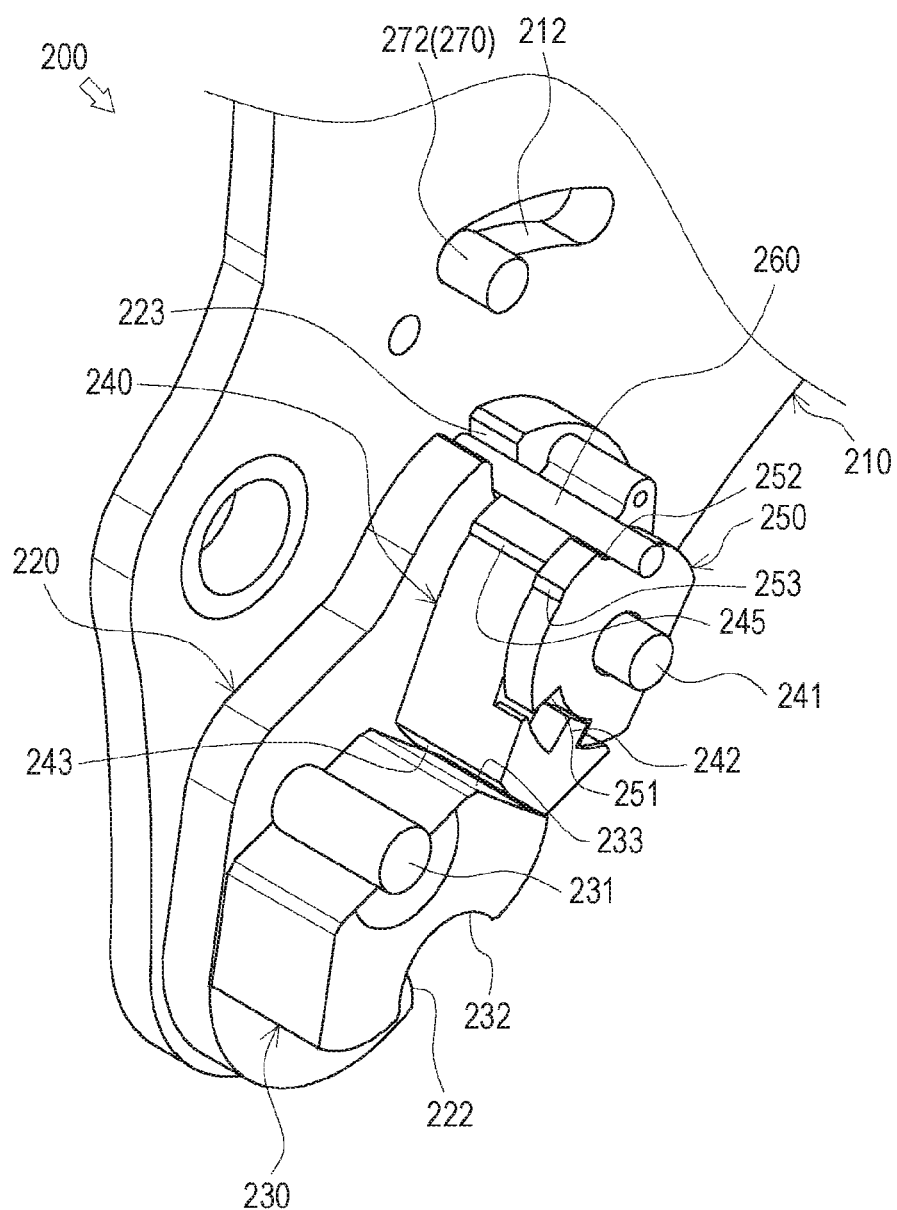
FIG. 6 is an enlarged view of the major parts of FIG. 5.

The thumb side abutting surface 233 shown in FIG. 6 and FIG. 8 is the side surface at the rear of the thumb 230. The thumb side abutting surface 233 is formed in a planar shape for which the surface faces to the rear upward, or in a curved surface shape having a radius that is larger than the arc of a lock bar side abutting surface 243 described later.

The lock bar 240 shown in FIG. 5 to FIG. 8 is an item for regulating the swing of the thumb 230. The lock bar 240 is formed in an approximate pentagon shape in the side view. The right surface of the lock bar 240 is provided so as to face opposite the left surface of the guide plate 220 on the right side. The thickness in the left-right direction of the lock bar 240 is formed to be thinner than the thickness in the left-right direction of the thumb 230.

The swing shaft 241 for which the axis line faces the left-right direction is formed at approximately the center part of the lock bar 240. The lock bar 240 is supported to be able to swing around the axis line of the swing shaft 241 on the sub-frame 210, to the rear upward of the thumb 230. The lock bar 240 is biased in the direction for which the lock bar 240 swings counterclockwise in the left side view (see FIG. 8) by an biasing means such as a spring, etc. (not shown). The biasing force in the counterclockwise direction in the left side view that is received by the lock bar 240 is set so as to be greater than the biasing force in the counterclockwise direction in the left side view received by the thumb 230. On the lock bar 240, in addition to the swing shaft 241, formed are a projecting part 242, a lock part side abutting surface 243, an inserted through pin 244, and a first locked part 245.

The projecting part 242 shown in FIG. 6 and FIG. 8 is an item for pressing and swinging the control plate 250 described later. The front part of the lock bar 240 is formed to be thicker than the other parts of the lock bar 240, and the projecting part 242 is formed so that a portion of that thick part projects facing the swing shaft 241 (see FIG. 6).

The lock bar side abutting surface 243 shown in FIG. 6 and FIG. 8 is the side surface of the front of the lock bar 240. The lock bar side abutting surface 243 is formed in an arc shape with the swing shaft 241 as the center in the side view. The lock bar side abutting surface 243 is formed to be able to abut the thumb side abutting surface 233 in the mounted state.

The inserted through pin 244 shown in FIG. 8 is an item that is inserted through the engaging hole 224 of the guide plate 220. The inserted through pin 244 is formed in a round pillar shape projecting to the right from the left surface of the lock bar 240. The swing range of the lock bar 240 is regulated by the inserted through pin 244 and the engaging hole 224.

The first locked part 245 shown in FIG. 6 and FIG. 8 (*b*) is a part for locking with the detent pin 260 described later. The first locked part 245 is formed on the outer periphery part of the lock bar 240. The first locked part 245 is formed so as to be positioned further to the front than the notch part 223 in the mounted state. The first locked part 245 is formed so that the outer peripheral surface of the lock bar 240 is in an inclined plane form as it rises radially outward as it faces the clockwise direction in the left side view.

The control plate 250 shown in FIG. 5 to FIG. 8 is an item for controlling the swing of the lock bar 240. The control plate 250 is formed in an approximately circular plate shape with the plate's surfaces facing the left-right direction. The control plate 250 is provided to be able to swing around the swing shaft 241 of the lock bar 240. The right surface of the control plate 250 is provided so as to face opposite the left surface of the lock bar 240. The left surface of the control plate 250 is formed so as to be approximately flush with the left surface of the projecting part 242 of the lock bar 240. On the control plate 250 are formed a notch part 251, a second locked part 252, and a third locked part 253.

The notch part 251 shown in FIG. 6 and FIG. 8 (*a*) is a part for making it possible for the control plate 250 to co-rotate with the lock bar 240. The notch part 251 is formed so that the front end part of the control plate 250 opens. The notch part 251 is formed in an arc shape of central angle approximately 30° with the swing shaft 241 as the center. The notch part 251 is formed to be able to house the projecting part 242 at a position facing opposite the projecting part 242 of the lock bar 240.

The second locked part 252 shown in FIG. 6 and FIG. 8 (*b*) is a part for locking with the detent pin 260 described later. The second locked part 252 is formed on the outer periphery part of the control plate 250. The second locked part 252 is formed at a position that overlaps the notch part 223 in the side view when in the mounted state. The second locked part 252 is formed in an inclined plane form that rises radially outward as the outer peripheral surface of the control plate 250 faces the counterclockwise direction in the left side view.

The third locked part 253 shown in FIG. 6 and FIG. 8 (*b*) is a part for locking with the detent pin 260 described later. The third locked part 253 is formed on the outer periphery part of the control plate 250. The third locked part 253 is formed so as to be positioned further to the front than the notch part 223 in the mounted state. More specifically, the third locked part 253 is formed at a gap of approximately 35° at the clockwise direction side in the left side view with respect to the second locked part 252. The third locked part 253 is formed in an inclined plane form that rises radially outward as the outer peripheral surface of the control plate 250 faces the clockwise direction in the left side view.

The detent pin 260 shown in FIG. 6 and FIG. 8 (*a*) is an item for regulating the swing of the lock bar 240 and the control plate 250. The detent pin 260 is formed in a round pillar shape. The detent pin 260, in a state with the axis line facing the left-right direction, has both left and right end parts provided so as to be inserted through the respective notch parts 223 of the left-right pair of guide plates 220. Also, the detent pin 260 is biased in the direction facing downward along the notch part 223 by an biasing means such as a spring, etc., (not shown). The detent pin 260 abuts the outer peripheral surface of the lock bar 240 by the biasing force received by the detent pin 260 in the mounted state.

The operation tool 270 shown in FIG. 4 and FIG. 6 is an item for swinging the lock bar 240 when the sub-frame unit 200 is removed from the main frame 100. The operation tool 270 is equipped with a grip part 271, an inserted through pin 272, and a connecting plate 273.

The grip part 271 shown in FIG. 4 is a part for the operator to grip. The grip part 271 is provided on the outside of the sub-frame 210 (laterally outward of the vehicle body 1). The grip part 271 is formed in a suitable shape that is easily gripped by the operator.

The inserted through pin 272 is a part that is inserted through the regulating hole 212 of the sub-frame 210. The inserted through pin 272 is formed in a round pillar form with the axis line facing the left-right direction. The inserted through pin 272 is connected to the grip part 271 via the connecting plate 273 described later, and is inserted through the regulating hole 212 of the sub-frame 210. Thus, the movement range of the inserted through pin 272 is regulated by the regulation hole 212.

The connecting plate 273 is an item for connecting the grip part 271 and the inserted through pin 272 with the swing shaft 241 of the lock bar 240, The connecting plate 273 is formed in a plate shape with the plate surfaces facing the left-right direction. The grip part 271 and the inserted through pin 272 are connected to one end part of the connecting plate 273. Meanwhile, the swing shaft 241 of the lock bar 240 is connected to the other end of the connecting plate 273 so as to co-rotate with the lock bar 240 in the movement range of the inserted through pin 272.

Next, the method of removing the front loader 20 (more specifically, the part of the front loader 20 excluding the main frame 100) from the vehicle body 1 is explained using FIG. 7 through FIG. 12.

FIG. 7 and FIG. 8 show the state with the sub-frame unit 200 mounted on the main frame 100 (mounted state). In the mounted state, the main frame side pin 131 is retained on the sub-frame side hook 222, and also, the sub-frame side pin 211 is retained on the main frame side hook 132 (see FIG. 7).

At this time, the lock bar 240 is biased in the counterclockwise direction in the left side view, so this is the furthest front downward position (regulated position) within the movement range determined by the inserted through pin 244 and the engaging hole 224. Also, the lock bar 240 regulates the swing of the thumb 230 in the counterclockwise direction in the left side view by the lock bar side abutting surface 243 abutting the thumb side abutting surface 233. As a result, the thumb 230 is retained at the position at which the engagement groove 232 is engaged with the main frame side pin 131 (engagement position), and falling out of the main frame side pin 131 from the sub-frame side hook 222 is prevented. At this time, the main frame side pin 131 is fixed at three points: the left and right sub-frame side hooks 222, and the engagement groove 232 positioned between those.

The thumb side abutting surface 233 and the lock bar side abutting surface 243 are formed so that at this time, the pressing force received by the lock bar 240 from the thumb 230 faces the swing center of the lock bar 240 (swing shaft 241). As a result, by the pressing force received by the lock bar 240 from the thumb 230, it is possible to have the lock bar 240 not swing.

Figure 9A:
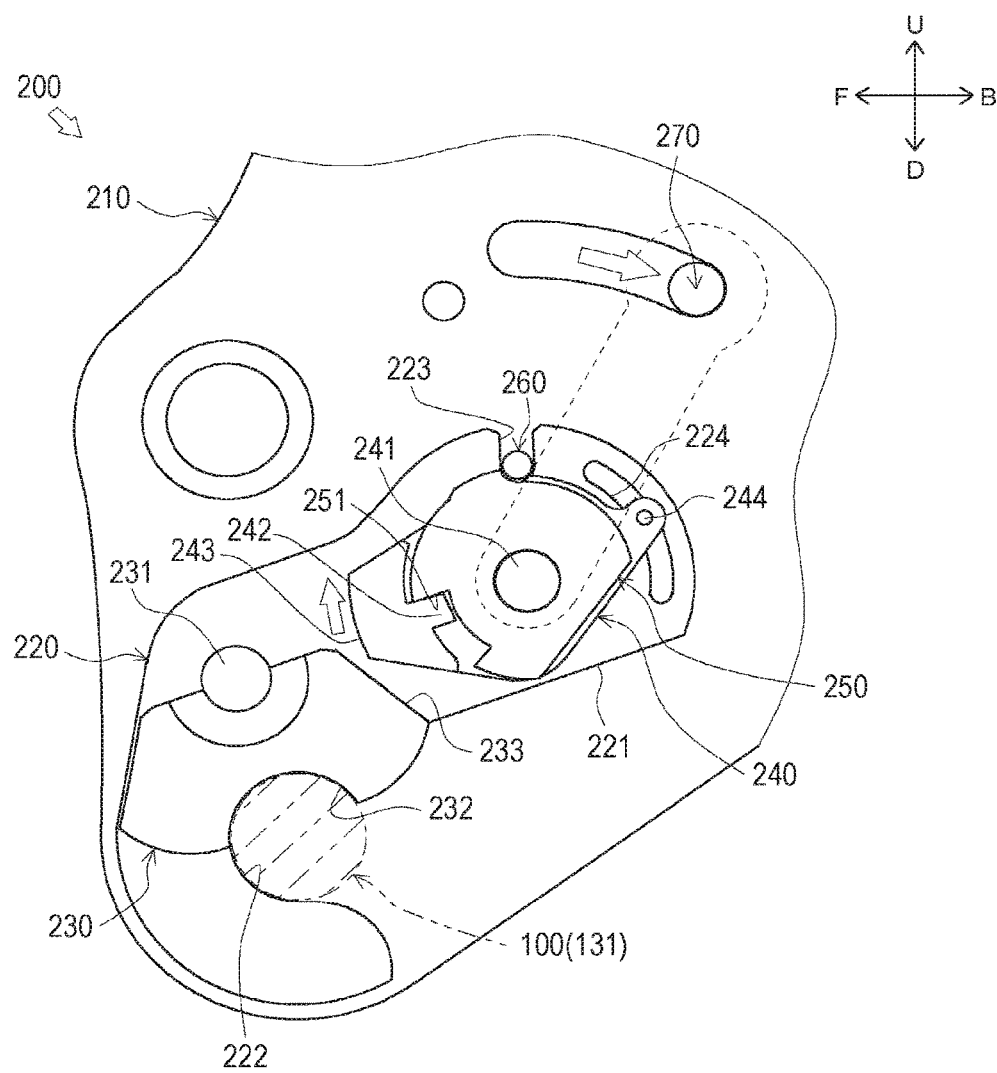
FIG. 9 (*a*) is a left side view showing a part of the sub-frame unit midway in removal from the main frame.
Figure 9B:
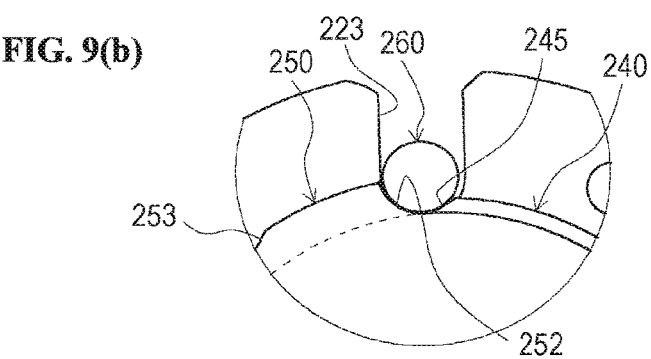
Figure 10A:
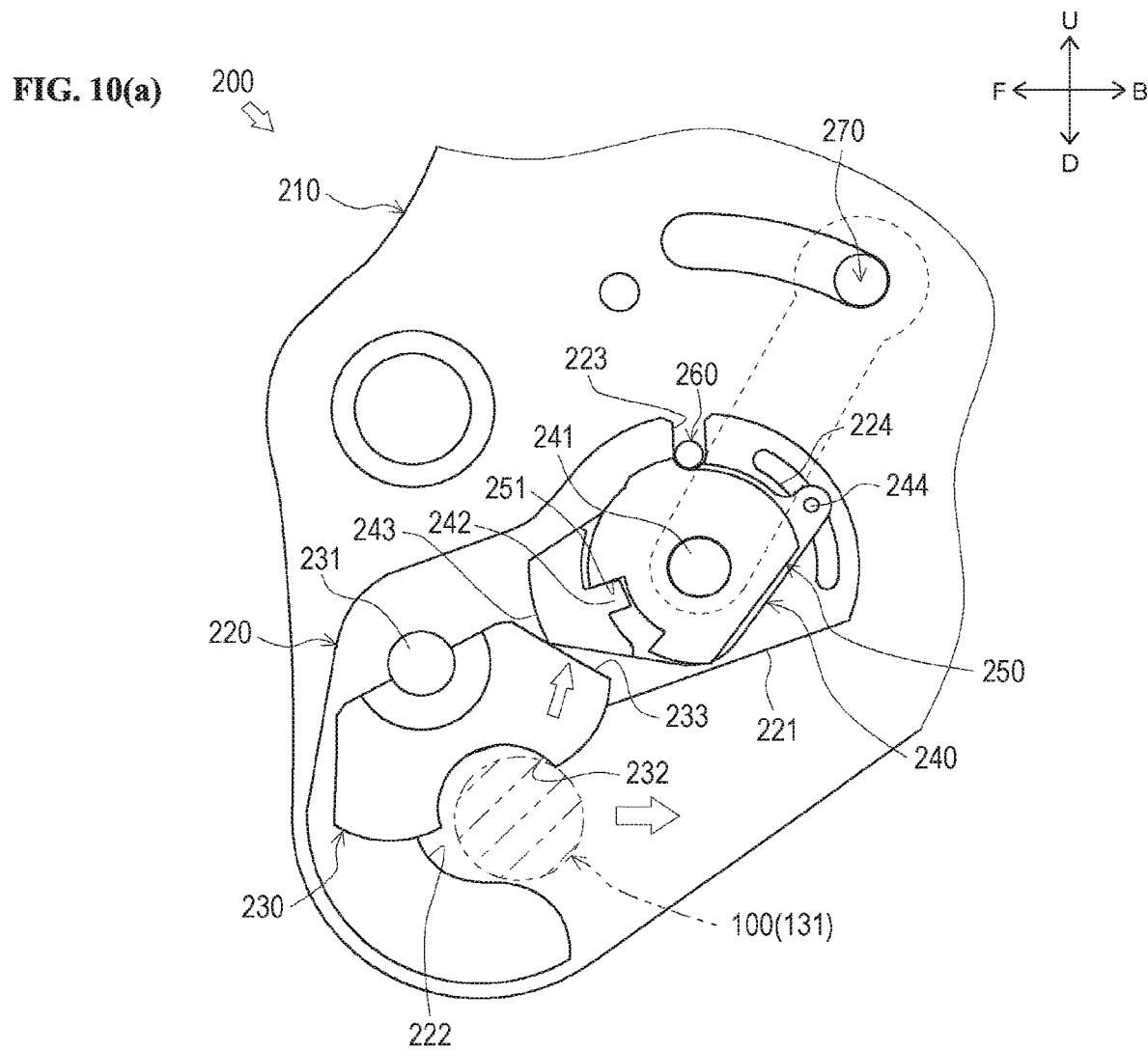
FIG. 10 (*a*) is a left side view showing a part of the sub-frame unit midway in removal from the main frame.
Figure 10B:
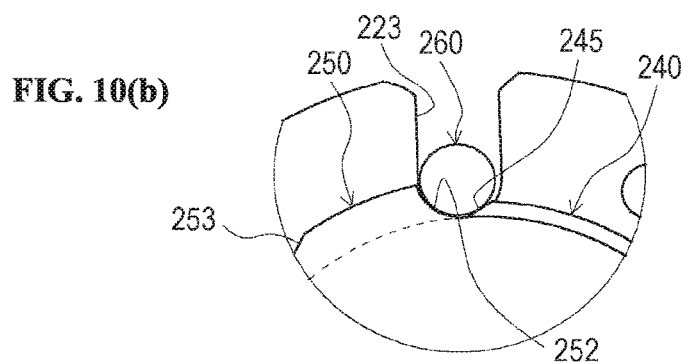
Figure 11A:
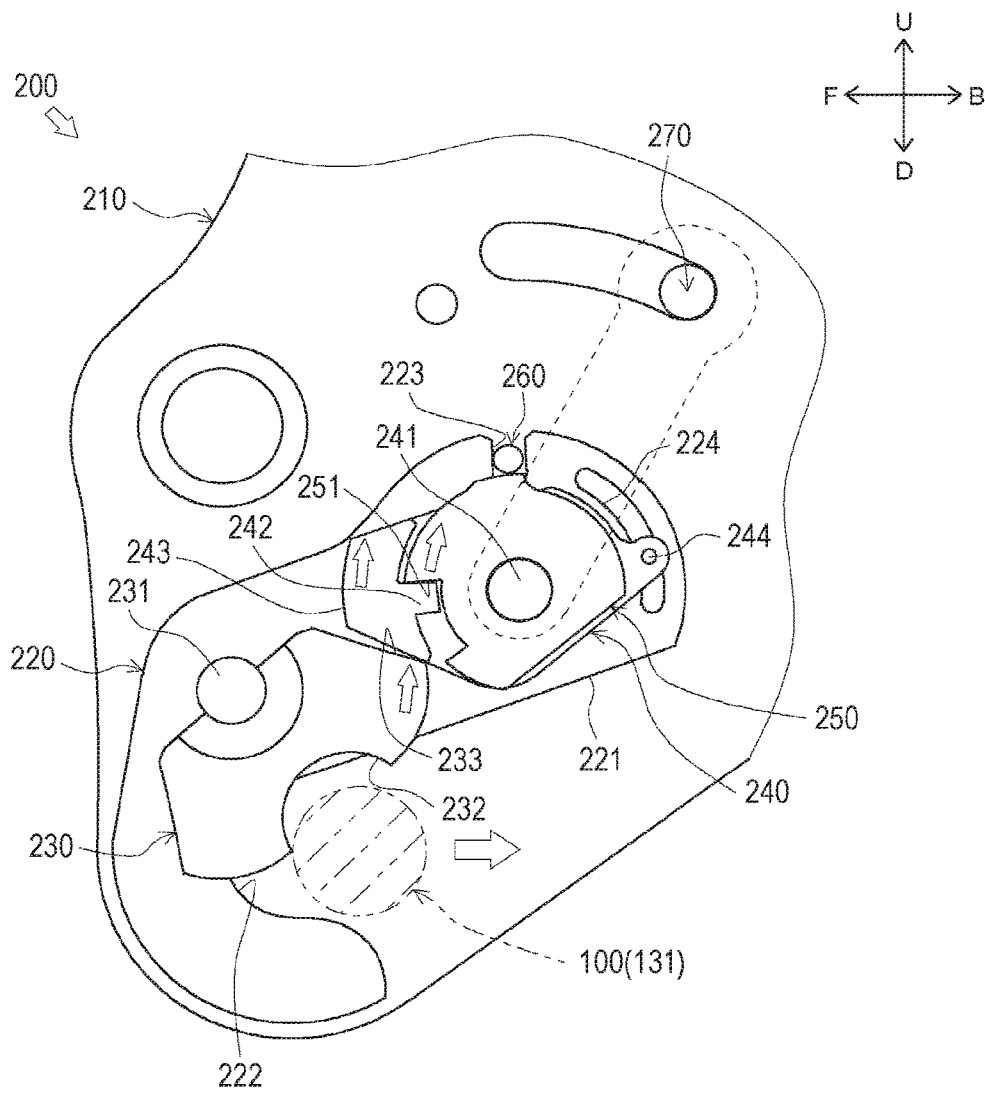
FIG. 11 (*a*) is a left side view showing a part of the sub-frame unit n a state removed from the main frame.
Figure 11B:
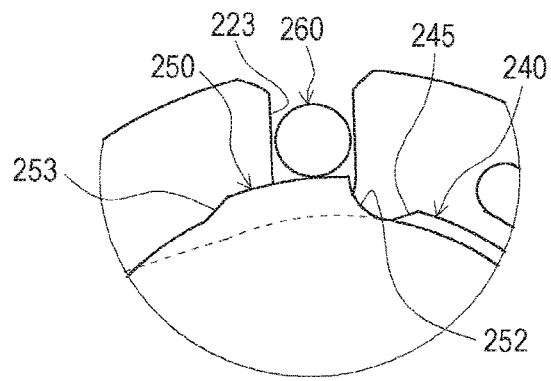

In the mounted state shown in FIG. 7 and FIG. 8, when the operation tool 270 swings 30° in the clockwise direction in the left side view along the regulating hole 212, the lock bar 240 swings 30° in the clockwise direction in the left side view (front rising direction) (see FIG. 9 (*a*)).

When the lock bar 240 swings 30° in the clockwise direction in the left side view from the mounted state, the detent pin 260 is locked with the first locked part 245 of the lock bar 240 (see FIG. 9 (*b*)). Here, the biasing force received by the lock bar 240 in the counterclockwise direction in the left side view is set to a size for which the detent pin 260 cannot surpass the first locked part 245, Because of this, the lock bar 240 has the swing in the counterclockwise direction in the left side view (front downward direction) regulated by the detent pin 260 and the first locked part 245. Therefore, the lock bar 240 is retained at a position swung 30° from the mounted state in the clockwise direction in the left side view (position shown in FIG. 9 (*a*)).

At this time, the control plate 250 has the swing in the clockwise direction in the left side view (front downward direction) regulated by projecting part 242 of the lock bar 240 (see FIG. 9 (*a*)). Also, by the detent pin 260 being locked to the second locked part 252, the control plate 250 has the swing in the clockwise direction in the left side view (front upward direction) regulated (see FIG. 9 (*b*)).

In the state shown in FIG. 9, the vehicle body 1 is moved back in a state with the front loader 20 (the part excluding the main frame 100) lowered to the ground. Having done that, the main frame 100 (main frame side pin 131) moves relative to the rear with respect to the sub-frame unit 200 while the back part of the thumb 230 is pushed upward (see FIG. 10 (*a*)). Having done that, the engagement of the thumb 230 and the main frame 100 (main frame side pin 131) is released. Also, the thumb 230 swings in the counterclockwise direction in the left side view by the biasing force received by the thumb 23, and abuts the lock bar 240.

Here the biasing force in the counterclockwise direction in the left side view (front downward direction) received by the thumb 230 is set so as to be greater than the biasing force in the counterclockwise direction in the left side view that the lock bar 240 receives (front downward direction). Because of this, the front part of the lock bar 240 is pushed up by the thumb 230. As a result, the lock bar 240 starts to swing in the clockwise direction in the left side view (front upward direction). At this time, the control plate 250 starts to swing in the clockwise direction in the left side view as an integral unit with the lock bar 240 by the notch part 251 being pressed by the projecting part 242.

When the thumb 230 further pushes up the front part of the lock bar 240, the control plate 250 is further pressed in the clockwise direction in the left side view by the projecting part 242 of the lock bar 240. Here, the difference between the biasing force in the counterclockwise direction in the left side view (front downward direction) received by the thumb 230 and the biasing force in the counterclockwise direction in the left side view (front downward direction) received by the lock bar 240 is set to be a size for which the detent pin 260 does not surpass the second locked part 252 of the control plate 250. Therefore, the control plate 250, when further pressed by the projecting part 242 of the lock bar 240, by the detent pin 260 surpassing the second locked part 252 (see FIG. 11 (b)), co-rotates with the lock bar 240 in the clockwise direction in the left side view (front upward direction) (see FIG. 11 (a)).

Figure 12A:
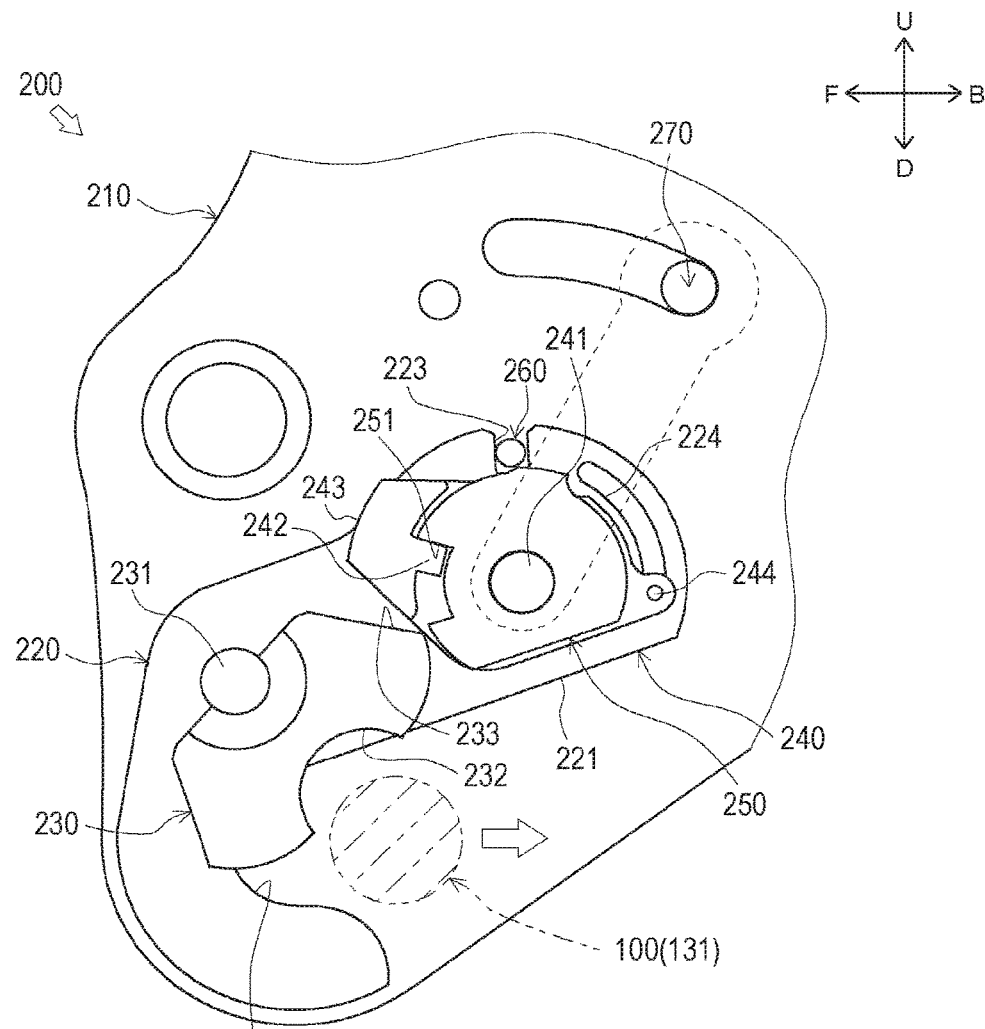
FIG. 12 (*a*) is a left side view of the front loader of FIG. 1 showing a part of the main frame and the sub-frame unit before mounting of the sub-frame unit on the main frame.
Figure 12B:
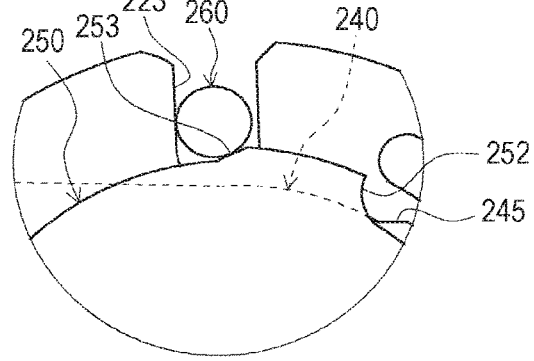

When the thumb 230 further pushes up the front part of the lock bar 240, the lock bar 240 swings as far as the furthest front upward position (regulation release position) within the swing range determined by the inserted through pin 244 and the engaging hole 224 (see FIG. 12 (a)). In specific terms, the regulation release position is the position swung 65° in the clockwise direction in the left side view from the furthest front downward position (regulated position) shown in FIG. 8. At this time, the lock bar 240 has the swing in the clockwise direction in the left side view (front upward direction) regulated by the engaging hole 224. Also, the lock bar 240 has the swing in the counterclockwise direction in the left side view (front downward direction) regulated by the pressing force by the thumb 230. The thumb 230 is retained at the position for which the lock bar 240 is pressed up to the furthest front upward position (release position).

At this time, the control plate 250 co-rotates with the lock bar 240, and swings to the position swung by 35° in the clockwise direction in the left view (front upward direction) from the mounted state. At this time, the control plate 250 has the swing in the counterclockwise direction in the left side view (front downward direction) regulated by the detent pin 260 locking with the third locked part 253 (see FIG. 12 (b)).

In this way, in a state with the front loader 20 (the part excluding the main frame 100) lowered to the ground, after the operation tool 270 is operated and the lock between the thumb 230 and the main frame side pin 131 is released, by moving back the vehicle body 1, it is possible to easily remove the front loader 20 sub-frame unit 200, the boom 300, and the bucket 400 from the main frame 100.

Next, the method for mounting the front loader 20 (more specifically, the part of the front loader 20 excluding the main frame 100) onto the vehicle body 1 is explained using FIG. 13 to FIG. 20.

Figure 13:
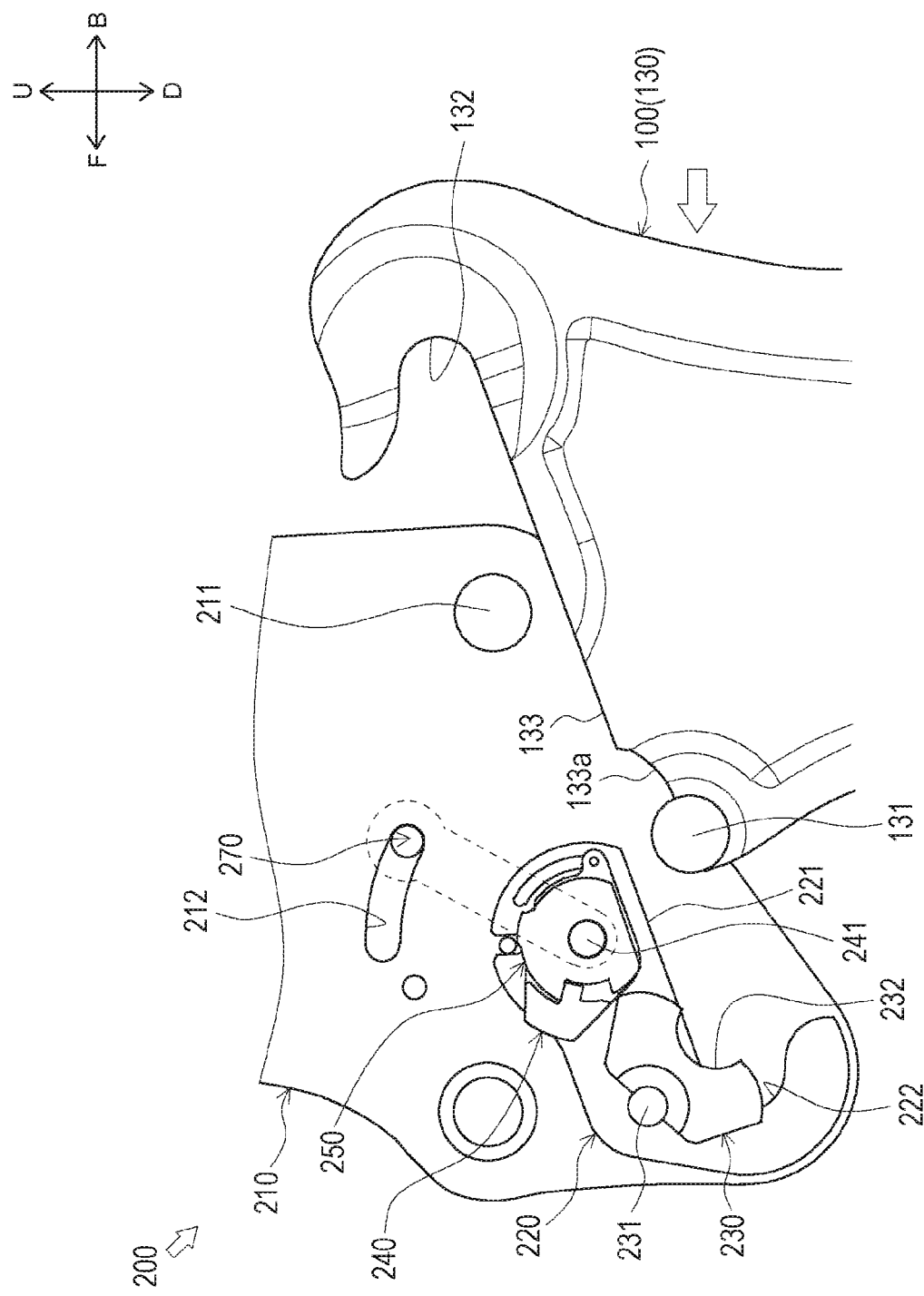
FIG. 13 is a left side view showing a part of the main frame and the sub-frame unit midway in mounting of the sub-frame unit on the main frame.

As shown in FIG. 13, in a state with the front loader 20 (the part excluding the main frame 100) removed from the main frame 100 and lowered to the ground, the vehicle body 1 is moved forward, and the main frame 100 is made to approach the sub-frame unit 200.

Figure 14:
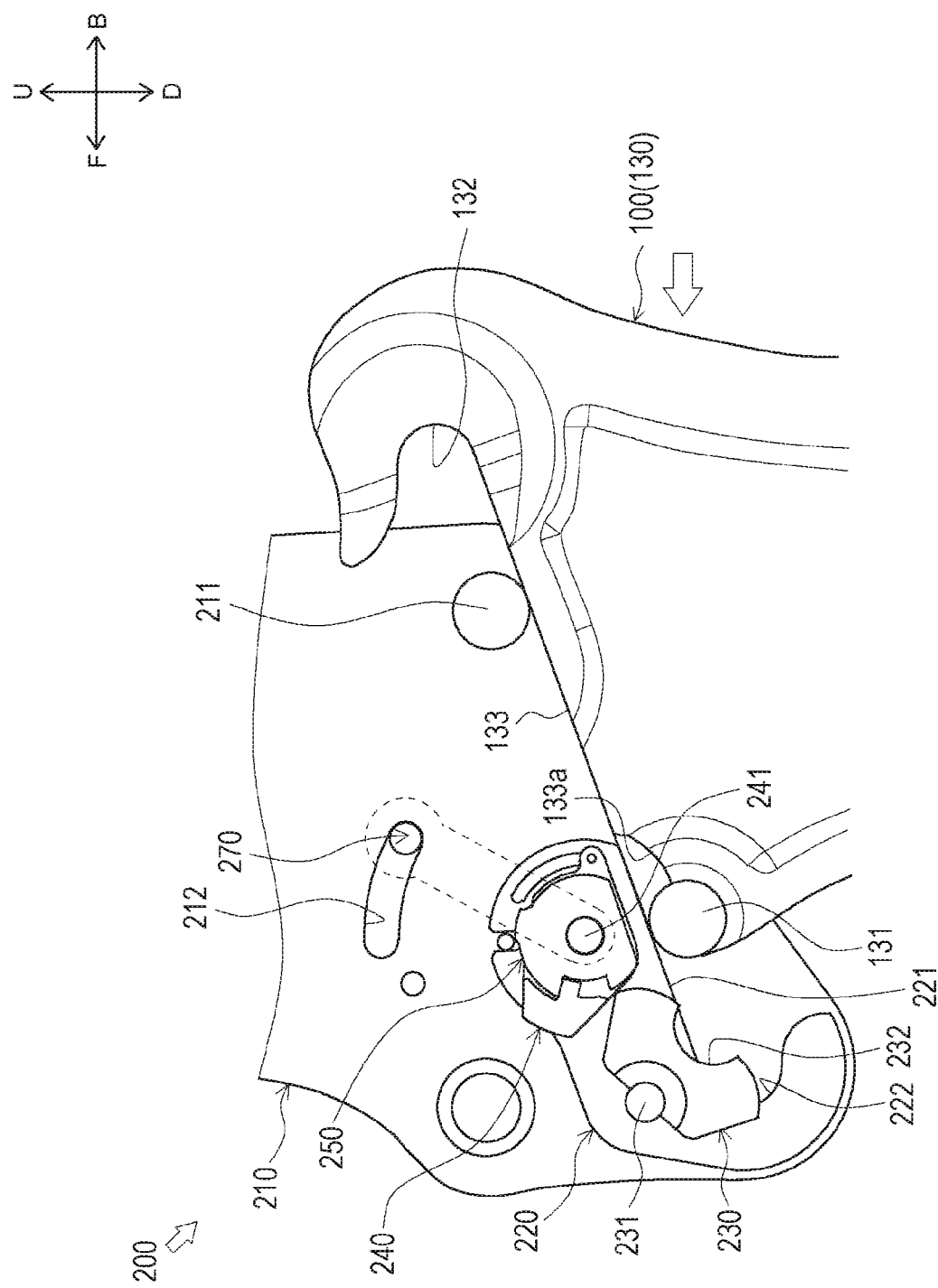
FIG. 14 is a left side view of the front loader of FIG. 1 showing a part of the sub-frame unit midway in mounting on the main frame.

As shown in FIG. 14, when the vehicle body 1 is further moved forward, the main frame side pin 131 abuts the sub-frame side guide face 221. Also, the main frame side pin 131 is guided to the sub-frame side hook 222 by the sub-frame side guide face 221. Also, when the vehicle body 1 moves forward, the main frame side guide face 133 abuts the sub-frame side pin 211. Also, the sub-frame side pin 211 is guided to the main frame side hook 132 by the main frame side guide face 133.

Here, because the sub-frame side guide face 221 is formed in a front downward inclined plane form, when the vehicle body 1 is moved forward, it is easy for the main frame side pin 131 to abut the sub-frame side guide face 221. Also, even if the height of the sub-frame unit 200 is slightly skewed with respect to the main frame 100, it is possible to have the main frame side pin 131 abut the sub-frame side guide face 221, so it is possible to make it easier to guide the main frame side pin 131 to the sub-frame side hook 222.

Similarly, because the main frame side guide face 133 is also formed in a front downward inclined plane form, when the vehicle body 1 is moved forward, it is easy for the sub-frame side pin 211 to abut the main frame side guide face 133. Also, even if the height of the sub-frame unit 200 is slightly skewed with respect to the main frame 100, it is possible to have the sub-frame side pin 211 abut the main frame side guide face 133, so it is possible to make it easier to guide the sub-frame side pin 211 to the main frame side hook 132.

Figure 15A:
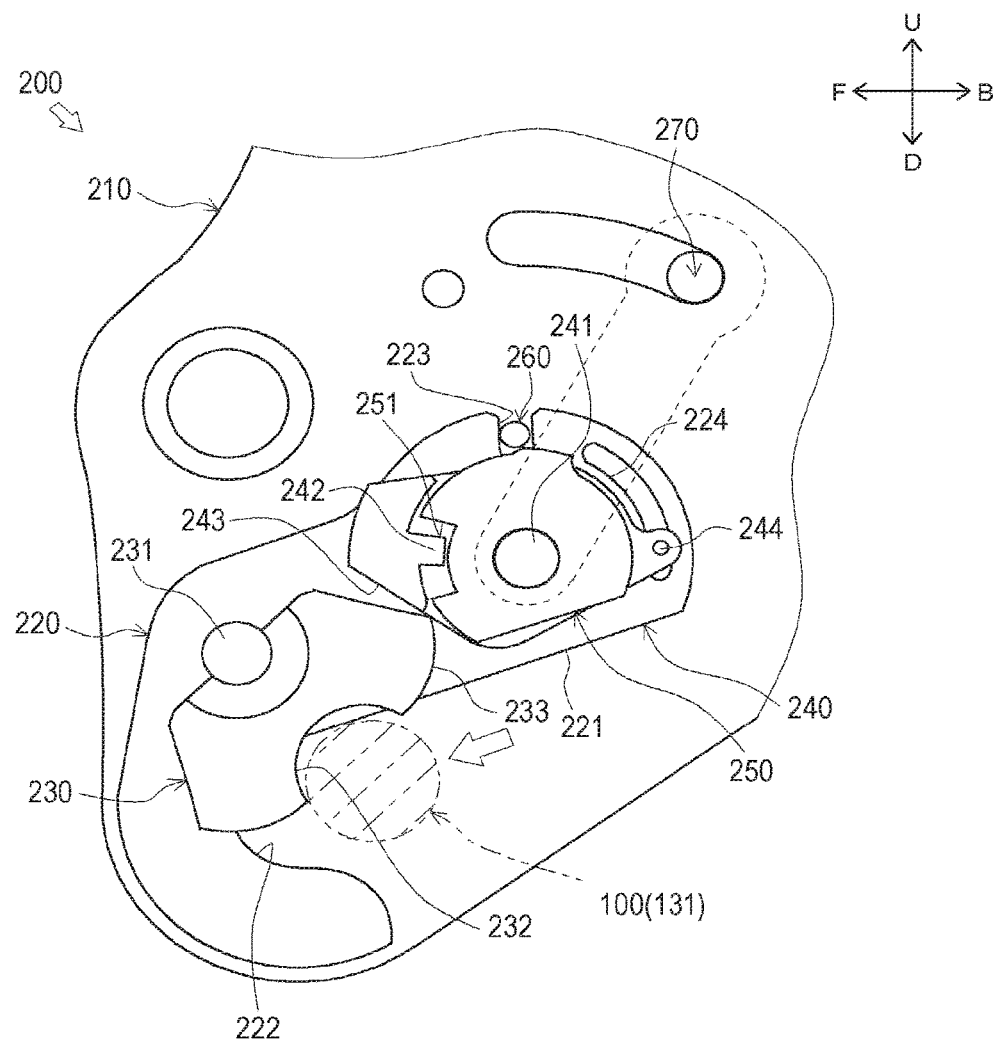
FIG. 15 (*a*) is a left side view showing a part of the sub-frame unit midway in mounting on the main frame.
Figure 15B:
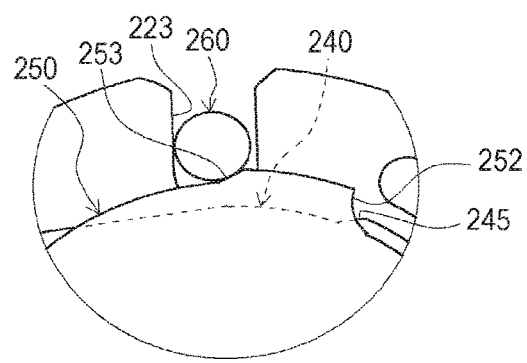

As shown in FIG. 15, the main frame side pin 131 abuts the thumb 230 midway in being guided to the sub-frame side hook 222. Also, the main frame side pin 131 presses the thumb 230 forward, and starts swinging it in the clockwise direction in the left side view (front upward direction). The lock bar 240 attempts to swing in the counterclockwise direction in the left side view following the thumb 230 by the biasing force received by that lock bar 240.

At this time, the detent pin 260 is locked to the third locked part 253 of the control plate 250 (see FIG. 15 (b)). Here, in the side view, of the outer peripheral surface of the lock bar 240, the diameter of the part adjacent to the back end of the first locked part 245 (distance from the swing shaft 241 axis line) is formed so as to be smaller than the diameter of the part adjacent to the front end of the third locked part 252. As a result, the lock bar 240 can swing in the counterclockwise direction in the left side view (front downward direction) following the thumb 230 without the detent pin 260 locking with the first locked part 245 (see FIG. 16 (a) and FIG. 16 (b)).

Figure 17A:
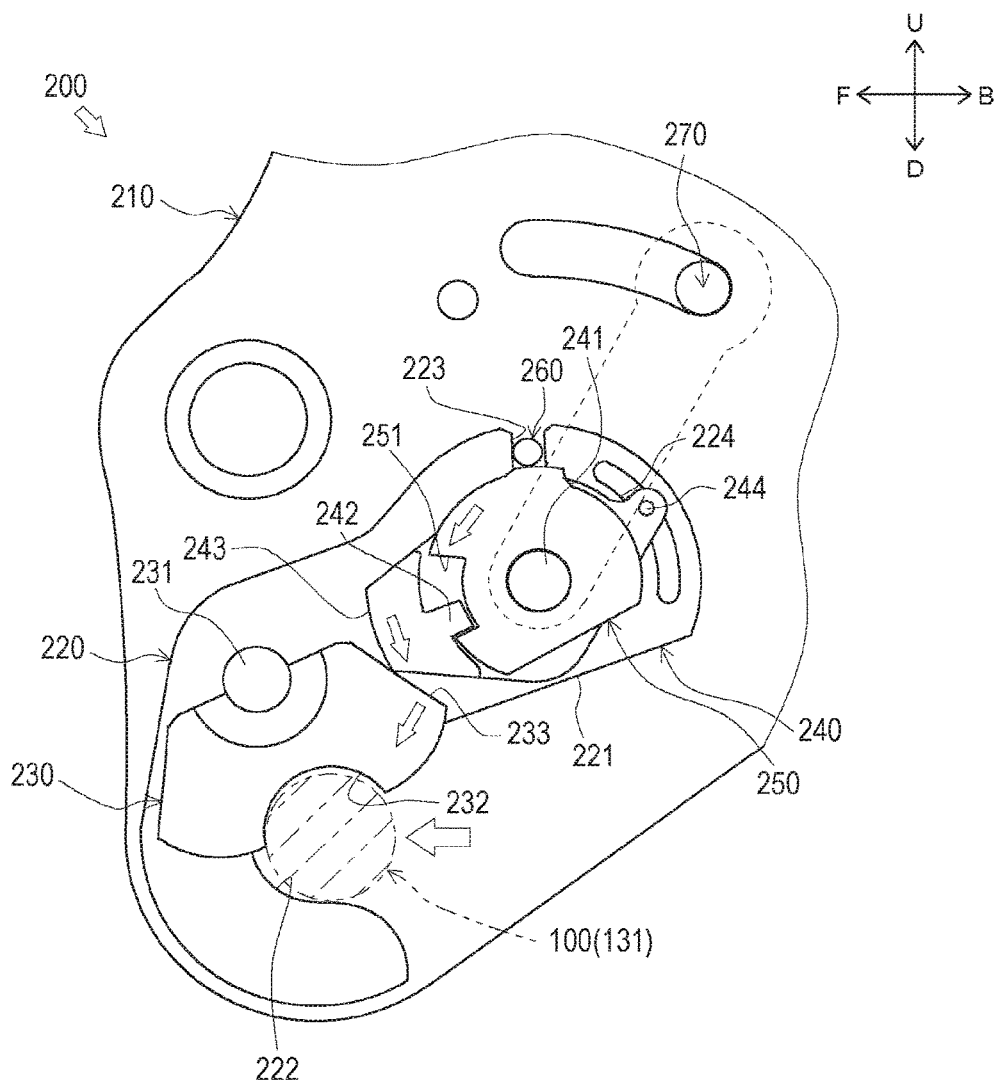
FIG. 17 (*a*) is a left side view of the front loader of FIG. 1 showing a part of the main frame and the sub-frame unit midway in mounting of the sub-frame unit on the main frame.
Figure 17B:
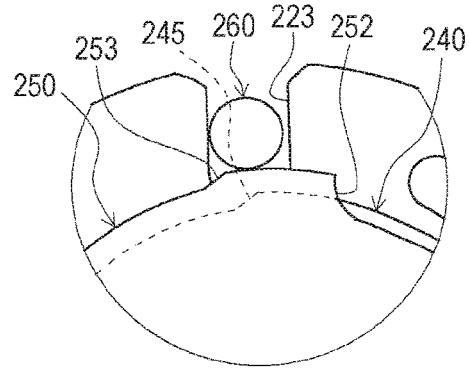

When the vehicle body 1 advances further, the thumb 230 swings further in the clockwise direction in the left side view (front upward direction) by the pressing force to the front by the main frame side pin 131, and the lock bar 240 swings in the counterclockwise direction in the left view (front downward direction) following the thumb 230 (see FIG. 17 (a)). The control plate 250 presses on the projecting part 242 of the lock bar 240, and attempts to co-rotate in the counterclockwise direction in the left side view (front downward direction) with the lock bar 240.

Here, the biasing force in the counterclockwise direction in the left side view (front downward direction) received by the lock bar 240 is set to a size for which it is possible for the detent pin 260 to surpass the third locked part 253. Therefore, the control plate 250, when further pressed by the projecting part 242 of the lock bar 240, by the detent pin 260 surpassing the third locked part 253 (see FIG. 17 (b)), is able to co-rotate in the counterclockwise direction in the left side view (front downward direction) with the lock bar 240.

Figure 18:
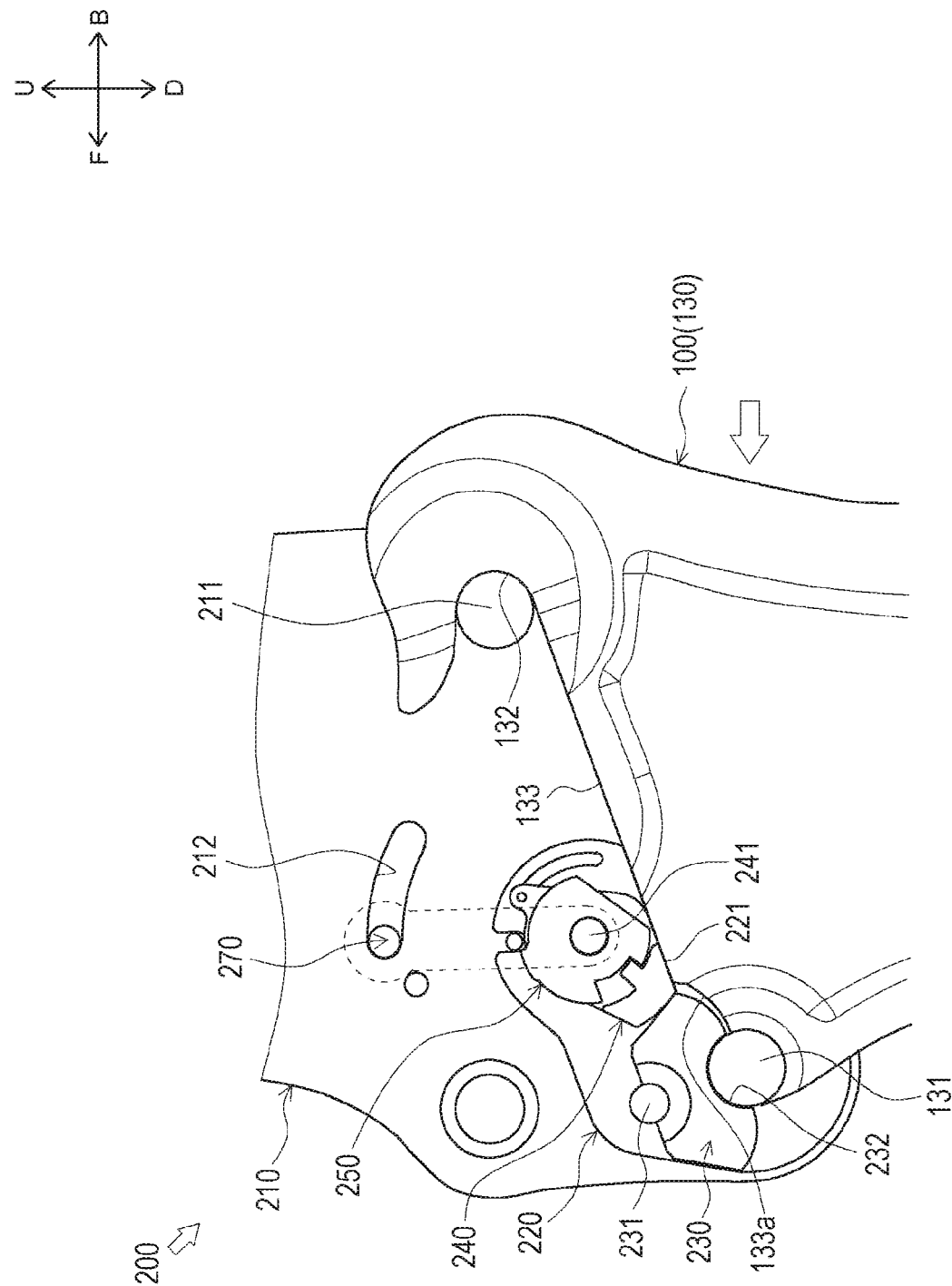
FIG. 18 is a left side view showing a part of the main frame and the sub-frame unit in a state with the sub-frame unit mounted on the main frame.

When the vehicle body 1 advances further, the thumb 230 returns to the engagement position and engages with the main frame side pin 131 (see FIG. 18). The lock bar 240 returns to the furthest front downward position of the lock bar 240 (regulated position) following the thumb 230, and regulates the swing of the thumb 230. In this way, the main frame side pin 131 is retained immovably on the sub-frame side hook 222 by the thumb 230. Therefore, falling out of the main frame side pin 131 from the sub-frame side hook 222 is prevented.

In this way, the sub-frame side pin 211 engages with the main frame side hook 132, and also the main frame side pin 131 engages with the sub-frame side hook 222. Also, the engagement of the sub-frame side hook 222 and the main frame side pin 131 is retained by the engagement groove 232 of the thumb 230.

In this way, in a state with the front loader 20 (the part excluding the main frame 100) lowered to the ground, simply by moving the vehicle body 1 forward, it is possible to easily mount onto the main frame 100 the sub-frame unit 200, as well as the boom 300 and the bucket 400 provided on the sub-frame unit 200. Also, as described previously, by operating the operation tool 270 and releasing the lock by the lock bar 240, in a state with the front loader 20 (the part excluding the main frame 100) lowered to the ground, simply by moving the vehicle body 1 back, it is possible to easily remove the sub-frame unit 200, as well as the boom 300 and the bucket 400 provided on the sub-frame unit 200 from the main frame 100.

Therefore, during the attachment and detachment work of the front loader 20, it is possible to eliminate the necessity of the conventional tasks of operating the boom 300 by hydraulics to align with the main frame 100, and inserting and retracting the pin to fix the boom 300 to the main frame 100. The operator also does not have to get in and out of the cabin 10 for these tasks. Thus, it is possible to reduce the work manhours when attaching and detaching the front loader 20, and to shorten the work time accompanying this.

Also, because the configuration performs alignment of the main frame 100 and the sub-frame unit 200 to each other, it is possible to perform alignment of the main frame 100 and the sub-frame unit 200 smoothly.

As described above, the attaching-detaching structure of the front loader 20 of this embodiment is provided with: a thumb 230 (engaging member), which, on a sub-frame 210 for supporting a boom 300, is supported so as to be able to move between an engagement position for engaging with a main frame 100 provided on a vehicle body 1 and a release position at which engagement with the main frame 100 is released, and which is biased in the release direction toward the release position from the engagement position; and a lock bar 240 (regulating member) which, on the sub-frame 210, is supported so as to be able to move between a regulated position for regulating the movement of the thumb 230 to the release direction from the engagement position, and a regulation release position that allows the thumb 230 to move to the release position.

By using such a configuration, it is possible to make the attaching and detaching work to the vehicle body 1 easier. In specific terms, simply by moving the lock bar 240 to the regulation release position, it is possible to easily move the thumb 230 to the release position, and thus possible to release the engagement of the thumb 230 and the main frame 100.

Also, the lock bar 240 is formed so as, in the regulated position, to abut with the thumb 230 positioned at the engagement position, and to regulate the movement of the thumb 230 in the release direction.

By using such a configuration, it is possible to regulate the movement of the thumb 230 in the release direction using a simple structure.

Also, the thumb 230 is formed so as to be supported on the sub-frame 210 to be able to swing between the engagement position and the release position.

By using such a configuration, using a simple structure, it is possible to engage the thumb 230 with the main frame 100, and also possible to release the engagement of the thumb 230 with the main frame 100.

Also, the lock bar 240 is formed so as to be supported on the sub-frame 210 to be able to swing between the regulated position and the regulation release position.

By using such a configuration, using a simple structure, it is possible to regulate the movement of the thumb 230 from the engagement position to the release direction, and also possible to release regulation of the movement of the thumb 230.

Also, the thumb 230 is formed so as, when the main frame 100 moves relatively to approach the sub-frame 210, to be pressed by the main frame 100, and move toward the engagement position from the release position.

By using such a configuration, by having the sub-frame 210 that is removed from the vehicle body 1 (main frame 100) approach the vehicle body 1, it is possible to easily engage the thumb 230 with the main frame 100.

Also, the lock bar 240 is biased in the regulated direction facing the regulated position from the regulation release position, and when the thumb 230 moves toward the engagement position from the release position, follows the thumb 230 and moves to the regulated direction from the regulation release position.

By using such a configuration, when the thumb 230 returns to the engagement position and is engaged with the main frame 100, it is possible for the lock bar 240 to return to the regulated position, and thus it is possible to regulate the movement of the thumb 230 in the release direction using the lock bar 240.

Also, the attaching-detaching structure of a front loader 20 of this embodiment is provided with a retention mechanism (thumb 230, lock bar 240, control plate 250, and detent pin 260) for retaining the lock bar 240 at the regulated position and the regulation release position.

By using such a configuration, by retaining the lock bar 240 at the regulated position, it is possible to retain the thumb 230 at the engagement position. Also, by retaining the lock bar 240 at the regulation release position, it is possible to retain the thumb 230 at the release position.

The attaching-detaching structure of a front loader 20 of this embodiment comprises a retention mechanism for retaining the lock bar 240 at the regulated position and the regulation release position; wherein the retention mechanism is provided with a detent mechanism (first locked part 245 and detent pin 260) for locking the lock bar 240 at an intermediate position between the regulated position and the regulation release position so as not to move in the regulated direction, and the thumb 230, in a state for which the lock bar 240 is locked at the intermediate position by the detent mechanism, when moved in the release direction, presses the lock bar 240 to be moved to the regulation release position.

By using such a configuration, it is possible to suppress the thumb 230 from forcefully moving to the release position.

Also, the detent mechanism is provided with a detent pin 260 biased so as to abut the outer periphery part of the lock bar 240, and a first locked part 245 (locked part) that is provided on the lock bar 240 and is locked by the locking part in the intermediate position.

By using such a configuration, it is possible to retain the lock bar 240 at the intermediate position by the detent pin 260 being locked to the first locked part 245.

Also provided is a control plate 250 (control member) that, when the lock bar 240 moves toward the regulated direction from the regulation release position, avoids having the detent pin 260 be locked to the first locked part 245 in the intermediate position.

By using such a configuration, when the lock bar 240 is moved toward the regulation release position from the regulated position, it is possible to retain the lock bar 240 at the intermediate position, and when moving the lock bar 240 toward the regulated position from the regulation release position, it is possible to move the lock bar 240 to the regulated position without retaining at the intermediate position.

Also, the control plate 250 is formed so as to avoid the detent pin 260 being locked to the first locked part 245 by pressing the detent pin 260 in resistance to the biasing force received by the detent pin 260 in the intermediate position.

By using such a configuration, using a simple structure, when moving the lock bar 240 toward the regulated position from the regulation release position, it is possible to move the lock bar 240 to the regulated position without retaining at the intermediate position.

Also, the lock bar 240 is formed so that in the regulated position, the pressing force received from the thumb 230 positioned at the engagement position faces the swing center of the lock bar 240.

By using such a configuration, when the lock bar 240 is regulating the swing of the engaging member, it is possible to prevent the lock bar 240 from swinging by the pressing force received from the thumb 230.

Also, the attaching-detaching structure of the front loader 20 of this embodiment is provided with an operation tool 270 for moving the lock bar 240.

By using such a configuration, it is possible to easily move the lock bar 240 using the operation tool 270.

Also, the attaching-detaching structure of the front loader 20 of this embodiment is provided with: a main frame side pin 131 (first retained part) provided on a main frame 100 that is provided on a vehicle body 1; a sub-frame side pin 211 (second retained part) provided on a sub-frame 210 that is detachable with the main frame 100 and supports a boom 300; a sub-frame side hook 222 (first retaining part) that is provided on the sub-frame 210 and retains the main frame side pin 131; a main frame side hook 132 (second retaining part) for retaining the sub-frame side pin 211; a sub-frame side guide face 221 (first guiding part) that, during mounting when the sub-frame 210 is mounted on the main frame 100, guides the main frame side pin 131 to the sub-frame side hook 222; and a main frame side guide face 133 (second guiding part) that, during mounting, guides the sub-frame side pin 211 to the main frame side hook 132.

By using such a configuration, it is possible to make the attaching and detaching work to the vehicle body 1 easier. In specific terms, during mounting to the vehicle body 1, it is possible to make it easier to perform alignment of the main frame 100 and the sub-frame 210. Also, by performing alignment of the main frame 100 and the sub-frame 210 to each other, it is possible to make it easier to perform alignment of the main frame 100 and the sub-frame 210.

Also, the sub-frame side hook 222 and the main frame side hook 132 are respectively formed to support the main frame side pin 131 and the sub-frame side pin 211 respectively from below.

By using such a configuration, it is possible to have the sub-frame 210 be supported from below by the main frame 100.

Also, the sub-frame side guide face 221 is provided on the sub-frame 210, and is an item for guiding (sub-frame side guiding part) the main frame side pin 131 (main frame side retained part) to the sub-frame side hook 222 (sub-frame side retaining part) during mounting, and the main frame side guide face 133 is an item for guiding (main frame side guiding part) the sub-frame side pin 211 (sub-frame side retained part) to the main frame side hook 132 (main frame side retaining part) during mounting.

By using such a configuration, alignment is performed between the main frame 100 and the sub-frame 210, so it is possible to make it easier to perform alignment of the main frame 100 and the sub-frame 210.

Also, the main frame side guide face 133 is an item that is formed so as to guide the sub-frame side pin 211 to the main frame side hook 132 while supporting from below during mounting.

By using such a configuration, during mounting on the vehicle body 1, it is possible to perform alignment of the main frame 100 and the sub-frame 210 while supporting the sub-frame 210 from below, so it is possible to improve workability.

Also, the sub-frame side guide face 221 is an item that is formed so as to guide the main frame side pin 131 to the sub-frame side hook 222 while being supported from below by the main frame side pin 131 during mounting.

By using such a configuration, during mounting to the vehicle body 1, it is possible to perform alignment of the main frame 100 and the sub-frame 210 while supporting the sub-frame 210 from below, so it is possible to improve workability.

Also, the main frame side guide face 133 and the sub-frame side guide face 221 are respectively items that are formed in an inclined plane form for which the vertical direction height becomes smaller as they face in the front direction of the vehicle body 1.

By using such a configuration, during mounting to the vehicle body 1, when the vehicle body 1 is moved forward and the main frame 100 is made to approach the sub-frame 210, it is easier for the retained parts (the main frame side pin 131 and the sub-frame side pin 211) to abut each guide part (the sub-frame side guide face 221 and the main frame side guide face 133). As a result, it is possible to make it easier to guide each retained part to each retaining part (the sub-frame side hook 222 and the main frame side hook 132).

Also, the main frame 100 is provided with a recess 133a formed between the main frame side guide face 133 and the main frame side pin 131.

By using such a configuration, it is possible to prevent deformation or damage of the main frame side pin 131 due to contact impact, etc., during attaching and detaching with the vehicle body 1.

Also, the attaching-detaching structure of the front loader 20 of this embodiment is provided with a thumb 230 (engaging member) that is provided on the sub-frame 210, and when the main frame side pin 131 is guided by the sub-frame side guide face 221 to the sub-frame side hook 222, this engages with the main frame side pin 121, preventing falling out of the main frame side pin 131 from the sub-frame side hook 222.

By using such a configuration, it is possible to prevent falling out of the main frame side pin 131 from the sub-frame side hook 222.

Also, the front loader 20 of this embodiment is provided with the attaching-detaching structure of this embodiment.

By using such a configuration, it is possible to provide the front loader 20 that can make the attaching and detaching work to the vehicle body 1 easier.

Also, the tractor (work vehicle) of this embodiment is provided with the front loader 20.

By using such a configuration, it is possible to provide the tractor work vehicle that can make the attaching and detaching work of the front loader 20 to the vehicle body 1 easier.

Above, an embodiment of the present invention was explained, but the present invention is not limited to the configuration noted above, and various modifications are possible within the scope of the invention noted in the claims.

For example, in this embodiment, the thumb 230 was an item that performs engagement with the main frame side pin 131 and release of that engagement by swinging, but the movement mode of the thumb 230 is not limited to swinging, and for example can also be performed by sliding with respect to the sub-frame 210.

Also, in this embodiment, the lock bar 240 was an item that performs regulating of the swinging of the thumb 230 and release of that regulating using swinging, but the movement mode of the lock bar 240 is not limited to swinging, and for example, it is also possible to perform that using sliding with respect to the sub-frame 210.

Also, in this embodiment, the configuration was such that the thumb 230 was provided on the inside (between) two guide plates 220, but the invention is not limited to this, and for example, it is also possible to have one guide plate 220, or to provide the thumb 230 on the outside of the guide plate 220. However, in tetras of the point of stability, etc., of supporting the sub-frame unit 200 on the main frame 100, as with this embodiment, it is preferable to have a configuration in which the thumb 230 is provided on the inside (between) the guide plates 220 respectively provided on the left-right pair of sub-frames 210.

Also, in this embodiment, this was an item for which the lock bar 240 was positioned at roughly the same position as the thumb 230 in the left-right direction on the inside of two guide plates 220, but the invention is not limited to this, and for example, it is also possible to be an item for which the lock bar 240 is provided at a different positions than the thumb 230 in the left-right direction (e.g., an item that presses the thumb 230 from the left-right direction to regulate the swing). However, in regards to the point of ease of regulating the swing of the thumb 230, etc., as with this embodiment, it is preferable to have a structure for which the lock bar 240 is provided at roughly the same position (on the same flat plane) in the left-right direction as the thumb 230 inside the guide plates 200 provided respectively on the left-right pair of sub-frames 210.

Also, in this embodiment, the control plate 250 was an item that swings around the same axis as the lock bar 240 (swing shaft 241), but it is also possible to provide a separate swing shaft for the control plate 250. However, in terms of the points of ease of control of the swing of the lock bar 240 and reduction of the number of parts, etc., as with this embodiment, it is preferable to be an item that swings around the same shaft as the lock bar 240.

Also, in this embodiment, the control plate 250 was an item provided on one side of the lock bar 240, but it is also possible to be an item provided at both the left and right sides of the lock bar 240.

Also, in this embodiment, the retained parts (the main frame side pin 131 and the sub-frame side pin 211) are provided on mutually different members (the main frame 100 and the sub-frame 210), but it is also possible for these to be provided on the same member. The retaining parts (the sub-frame side hook 222 and the main frame side hook 132) may also be provided on the same member. For example, each retained part (pin) may be provided together on the main frame 100 side, and each retaining part (hook) may be provided together on the sub-frame 210 side. Alternatively, each retained part (pin) may be provided together on the sub-frame 210 side, and each retaining part (hook) may be provided together on the main frame 100 side.

Figure 19:
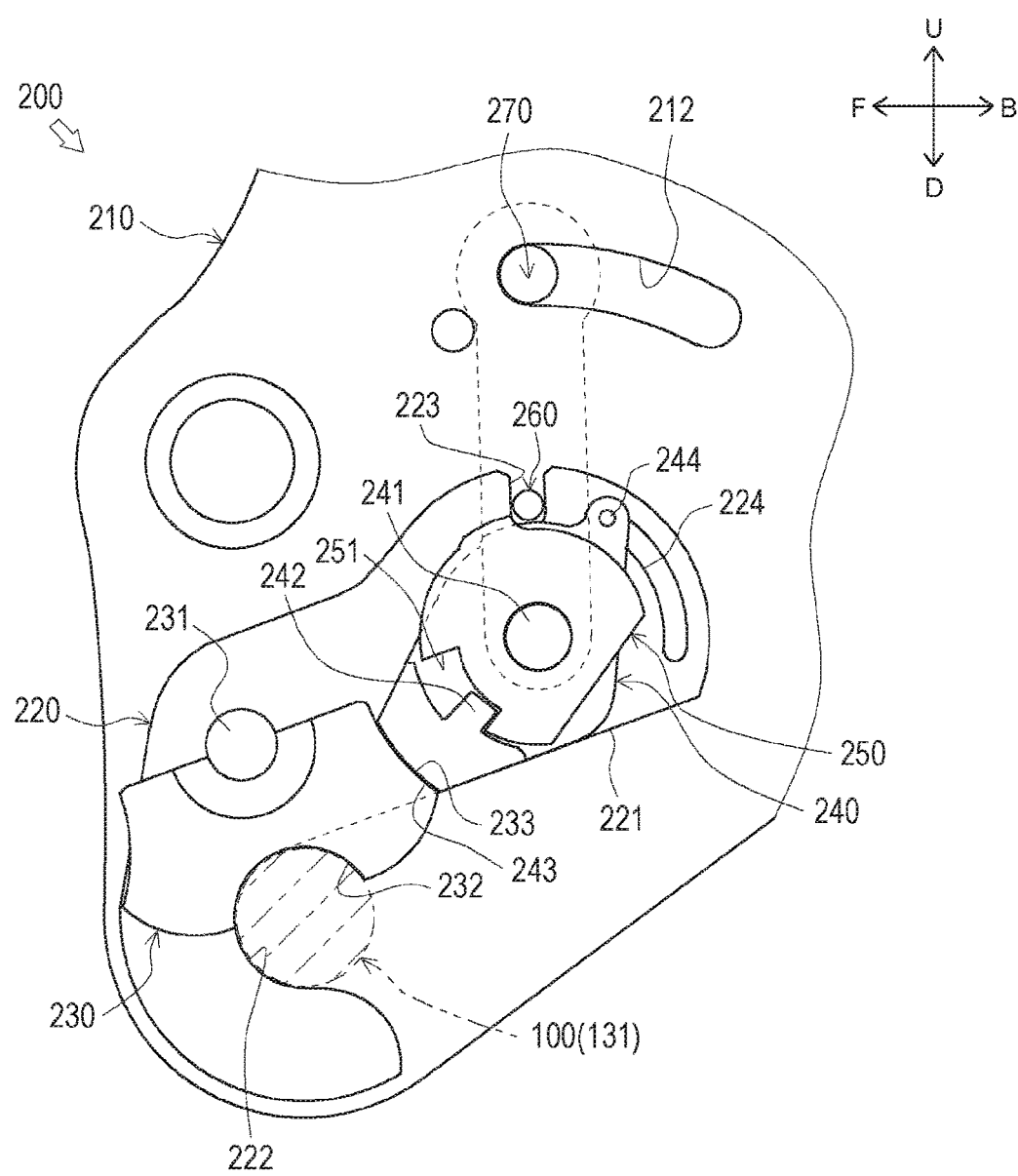
FIG. 19 is a left side view showing a part of the sub-frame unit of another example.
Figure 20:
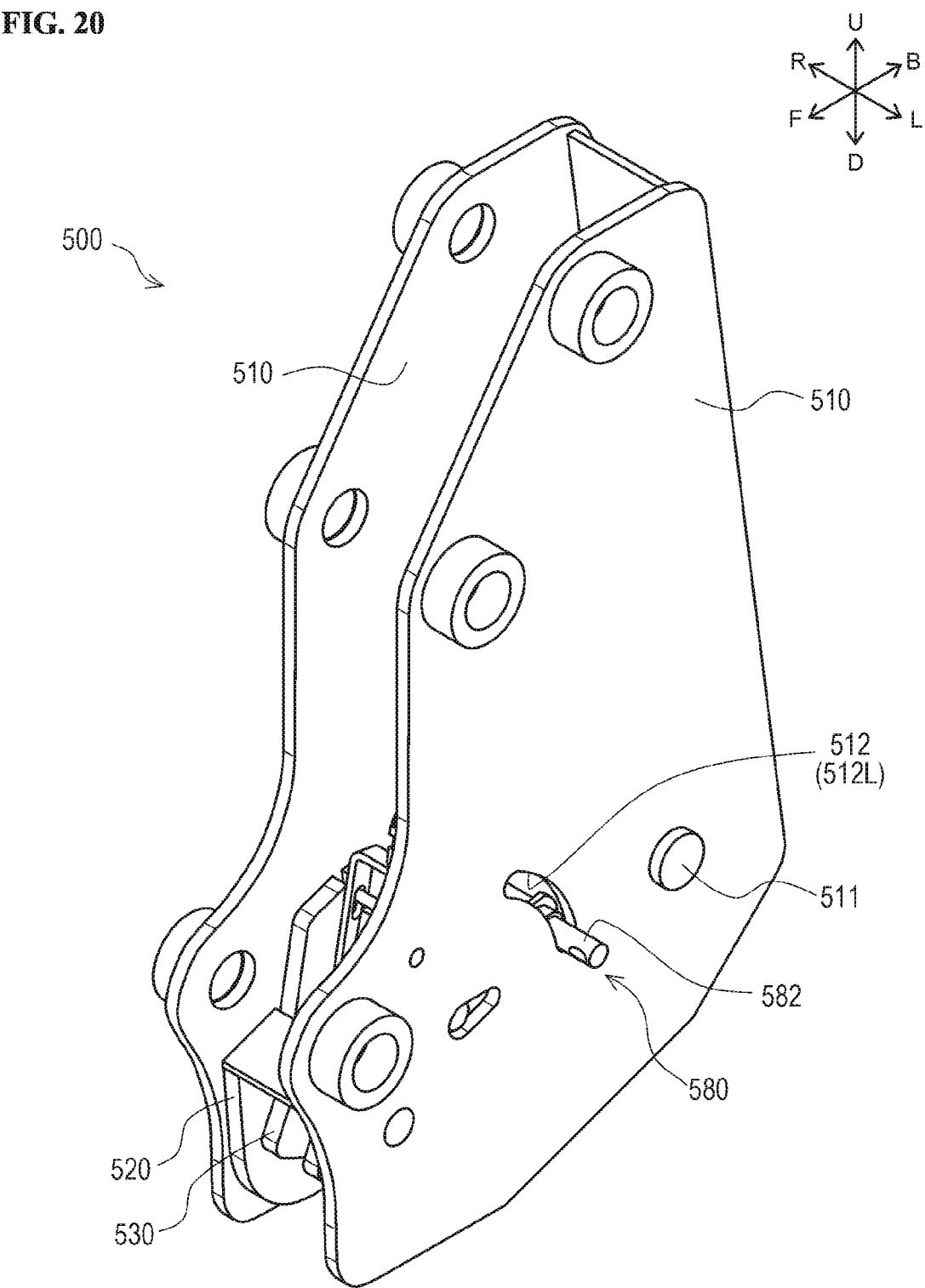
FIG. 20 is a left upper perspective view of the sub-frame unit relating to a second embodiment.

Also, in this embodiment, the thumb side abutting surface 233 was an item formed in a flat plane shape, but as shown in FIG. 19, in the side view, it is also possible to be an item formed in an arc shape for which the radius of curvature is approximately the same radius of curvature as that of the lock bar side abutting surface 243. By doing this, it is possible to have the lock bar 240 swing in the front upward direction without being hindered by the thumb 230, and also, in the mounted state, since it is possible to increase the contact surface of the thumb side abutting surface 233 with the lock bar side abutting surface 243, it is possible to make it easier to regulate the swinging of the thumb 230.

As described above, the attaching-detaching structure of the front loader 20 of this embodiment is formed so that the thumb 230 is supported on the sub-frame 210 to be able to swing between the engagement position and the release position, the lock bar 240 is formed so as to be supported on the sub-frame 210 to be able to swing between the regulated position and the regulation release position, the swing shaft 231 of the thumb 230 is provided so as to be parallel to the swing shaft 241 of the lock bar 240, the lock bar side abutting surface 243 (the abutting part of the lock bar 240 with the thumb 230), in the swing axis line direction view of the lock bar 240, is formed in an arc shape having the swing shaft 241 of the lock bar 240 as the center, and the thumb side abutting surface 233 (the abutting part of the thumb 230 with the lock bar 240), in the swing axis line direction view of the thumb 230, is % lined in an arc shape for which the radius of curvature is approximately the same as the radius of curvature of the lock bar side abutting surface 243.

By using such a configuration, it is possible to make the lock bar 240 swing without being hindered by the thumb 230.

Hereafter, using FIG. 20 to FIG. 34, the front loader 20 of a second embodiment is explained. Members that are the same as those of the first embodiment are given the same code numbers and an explanation is omitted. The front loader 20 of the second embodiment is provided with a sub-frame unit 500 instead of the sub-frame unit 200 of the first embodiment.

Using FIG. 20 to FIG. 28, the detailed configuration of the sub-frame unit 500 is explained. The left-right pair of sub-frame units 500 are formed symmetrically at left and right to each other, and in FIG. 20 to FIG. 28 (and in FIG. 29 to FIG. 34 described later), of the left-right pair of sub-frame units 500, the left side sub-frame unit 500 is illustrated. Hereafter, unless specifically noted otherwise, the left side sub-frame unit 500 is explained, and an explanation of the right side sub-frame unit 500 is omitted. Also, FIG. 20 to FIG. 28 show the state with the sub-frame unit 500 mounted on the main frame unit 100 (mounted state), and the explanation is given with this mounted state as a reference.

The sub-frame unit 500 is provided with a sub-frame 510, a guide plate 520, a thumb 530, a lock bar 540, a spring 550, a detent mechanism 560, a release arm 570, and an operating mechanism 580.

The sub-frame 510 shown in FIG. 20 to FIG. 24 is formed in approximately the same manner as the sub-frame 210 of the first embodiment. In FIG. 21, FIG. 22, FIG. 24 to FIG. 27, and FIG. 30 to FIG. 34, for convenience of the explanation, an illustration of the left side sub-frame 510 is omitted. Also, in FIG. 23, for convenience of the explanation, an illustration of the right side sub-frame 510 is omitted. A sub-frame side pin 511 and a regulating hole 512 are formed on the sub-frame 510.

The sub-frame side pin 511 shown in FIG. 20 and FIG. 21 to FIG. 24 is formed in approximately the same manner as the sub-frame side pin 211 of the first embodiment.

The regulating hole 512 shown in FIG. 20 to FIG. 24 is an item for regulating the operating range of an operating lever 582 described later. The regulating hole 512 is formed so as to pierce through the sub-frame 510 in the left-right direction. The regulating hole 512, in the side view, is formed in a partial ring shape of central angle approximately 50° with the swing center of a lock bar 540 described later (swing shaft 541) as the center. The regulating hole 512 is formed to the rear upward of the swing shaft 541 (see FIG. 26, etc.).

Also, the regulating hole 512 formed on the sub-frame 510 of the outside of the vehicle body 1 (in FIG. 20, etc., the left side) (hereafter also called regulating hole 512L) is formed so that the width across the entire area is constant. In contrast to this, the regulating hole 512 formed on the sub-frame 510 of the inside of the vehicle body 1 (in FIG. 20, etc., the right side) (hereafter also called regulating hole 512R) is formed so that with respect to the lower end part, the width of the other parts is smaller (see FIG. 24).

In specific terms, a lower end part 512Ra of the regulating hole 512R is formed in approximately a circular shape. The width (diameter of the circle) of the lower end part 512Ra is formed so as to be approximately the same as the width of the regulating hole 512L. The width of the part excluding the lower end part of the regulating hole 512R (the arc shaped part extending from the top end part to near the bottom end part, hereafter called "arc part 512Rb") is formed to be smaller (narrower) than the width of the regulating hole 512L.

The guide plate 520 shown in FIG. 20 to FIG. 24 is formed in approximately the same manner as the sub-frame side pin 211 of the first embodiment. For convenience of the explanation, the same as with the sub-frame 510, illustration of the guide plate 520 is omitted as appropriated according to the drawing. On the guide plate 520, formed are a sub-frame side guide face 521, a sub-frame side hook 522, and a notch part 523. The sub-frame side guide face 521, the sub-frame side hook 522, and the notch part 523 are formed in approximately the same manner as the sub-frame side guide face 221, the sub-frame side hook 222, and the notch part 223 of the first embodiment.

The thumb 530 shown in FIG. 21 to FIG. 23, FIG. 25, and FIG. 26, is an item for immovably retaining the main frame side pin 131 on the sub-frame side hook 522 (for preventing the main frame side pin 131 from falling off from the sub-frame side hook 522). The thumb 530 is provided between the left-right pair of guide plates 520. The thumb 530 is formed in approximately an L shape in the side view. The thumb 530 is mainly provided with a swing shaft 531, an engagement groove 532, a thumb side first abutting surface 533, a thumb side second abutting surface 534, and a coupling shaft 535.

The swing shaft 531 is an item for supporting the thumb 530 to be able to swing. The swing shaft 531 is placed with the axis line facing the left-right direction. The swing shaft 531 is placed above the sub-frame side hook 522. Both ends of the swing shaft 531 are respectively fixed to the left and right guide plates 520. The swing shaft 531 is inserted through the front-back center part of the left-right pair of thumbs 530.

Figure 25:
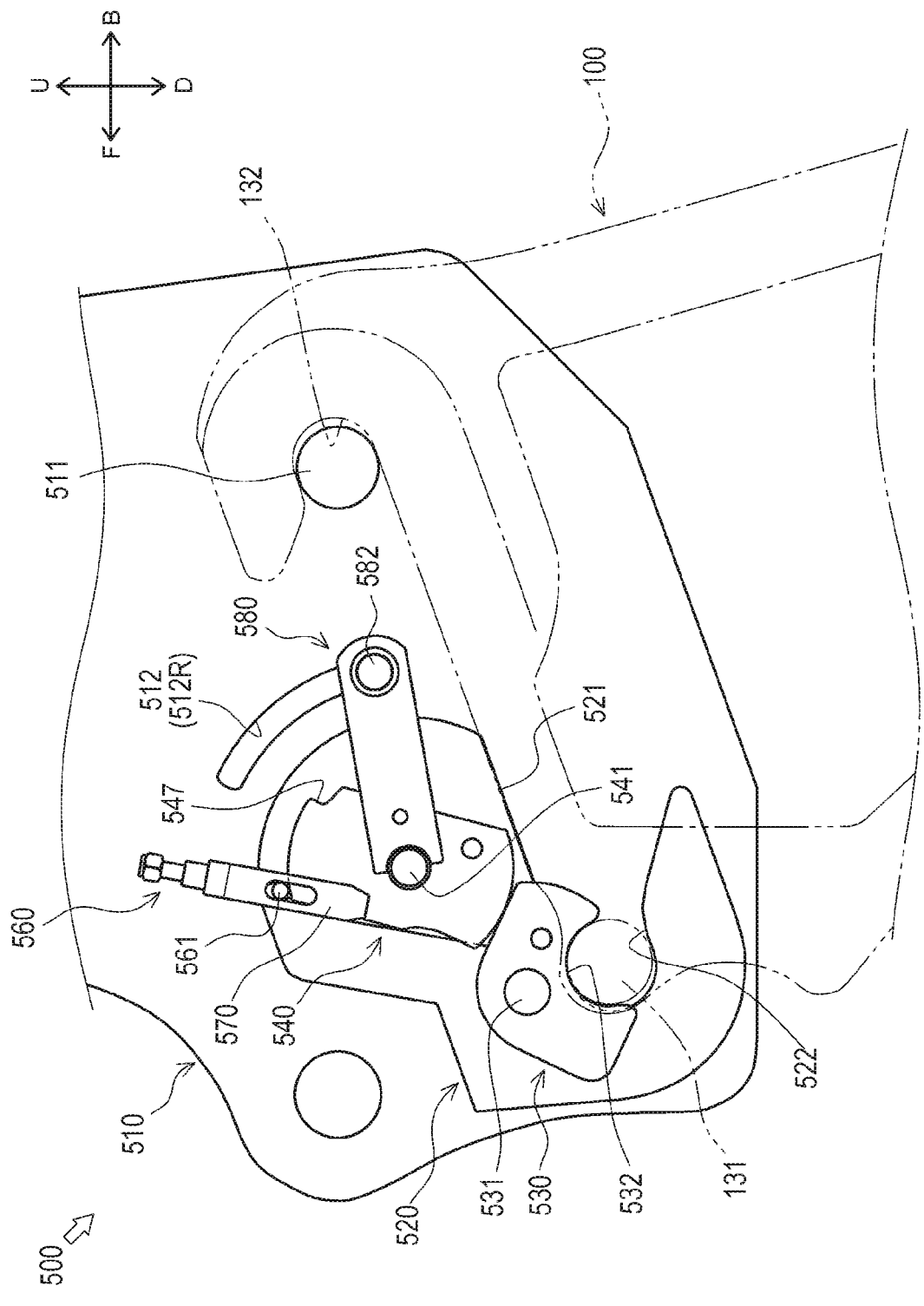
FIG. 25 is a left side view showing the attaching-detaching structure of the main frame and the sub-frame unit.
Figure 26:
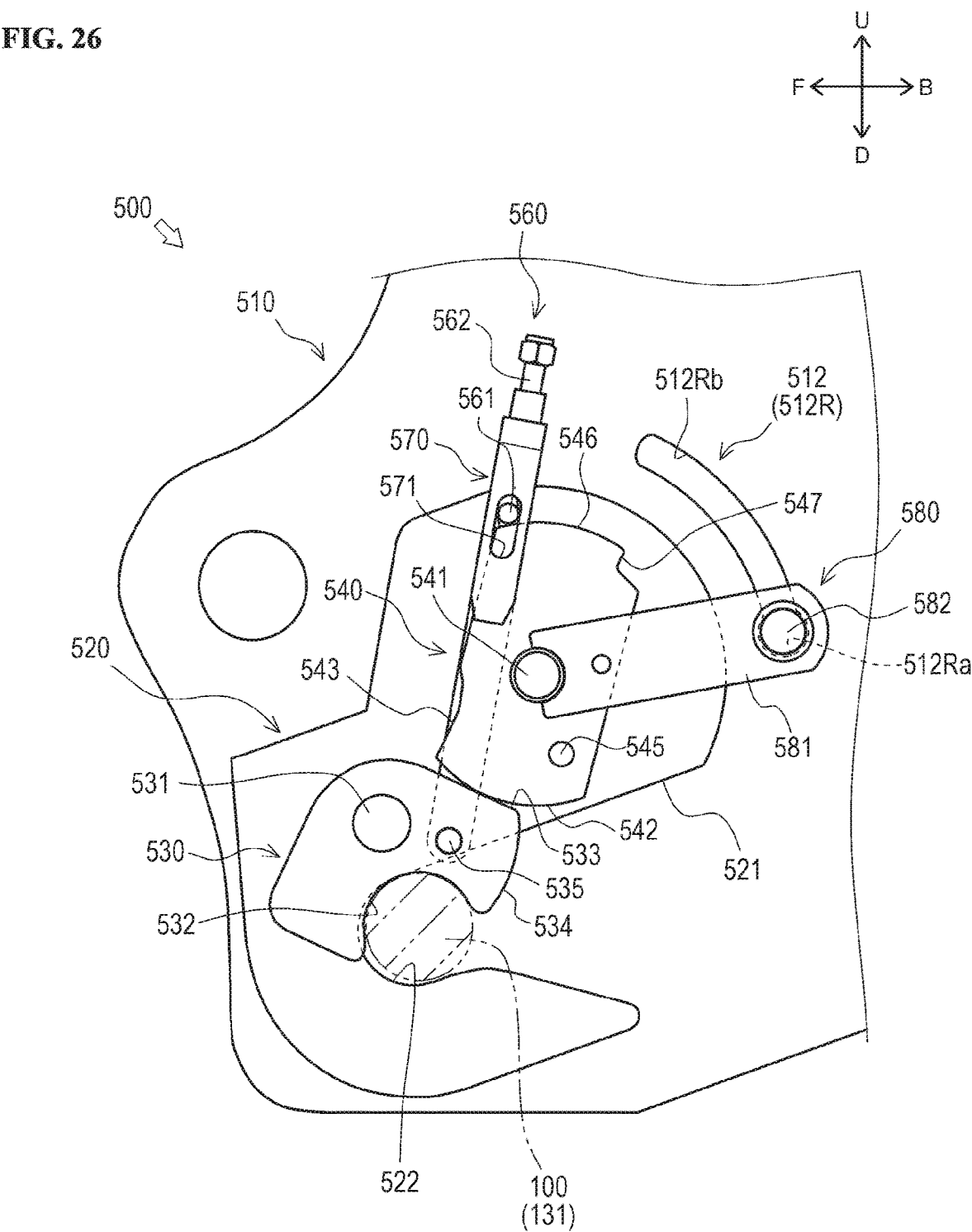
FIG. 26 is a left side view showing a part of the sub-frame unit in a state retained on the main frame.

The engagement groove 532 shown in FIG. 25 and FIG. 26 is a part that engages with the main frame side pin 131. The engagement groove 532 is formed at the thumb 530 bottom part and the front-back center part. The engagement groove 532 is formed in a semicircular arc shape that opens downward in the side view. The engagement groove 532 is formed so that the diameter is approximately the same as the diameter of the main frame side pin 131 in the side view.

The thumb side first abutting surface 533 shown in FIG. 26 is the rear side surface of the thumb 530. The thumb side first abutting surface 533 is formed in a flat plane shape with the surface facing rear and upward.

The thumb side second abutting surface 534 is the rear side surface of the thumb 530. The thumb side second abutting surface 534 is formed in a curved surface shape with the surface facing rear and downward. In more specific terms, the thumb side second abutting surface 534 is formed in an arc shape with the swing shaft 531 as the center in the side view.

The coupling shaft 535 is an item for coupling the left-right pair of thumbs 530. The coupling shaft 535 is placed with the axis line facing the left-right direction. The coupling shaft 535 is placed to the rear and downward of the swing shaft 531. Both ends of the coupling shaft 535 are respectively fixed to the left-right pair of thumbs 530. As a result, the left-right pair of thumbs 530 are coupled to each other, and are able to swing as an integral unit.

Figure 21:
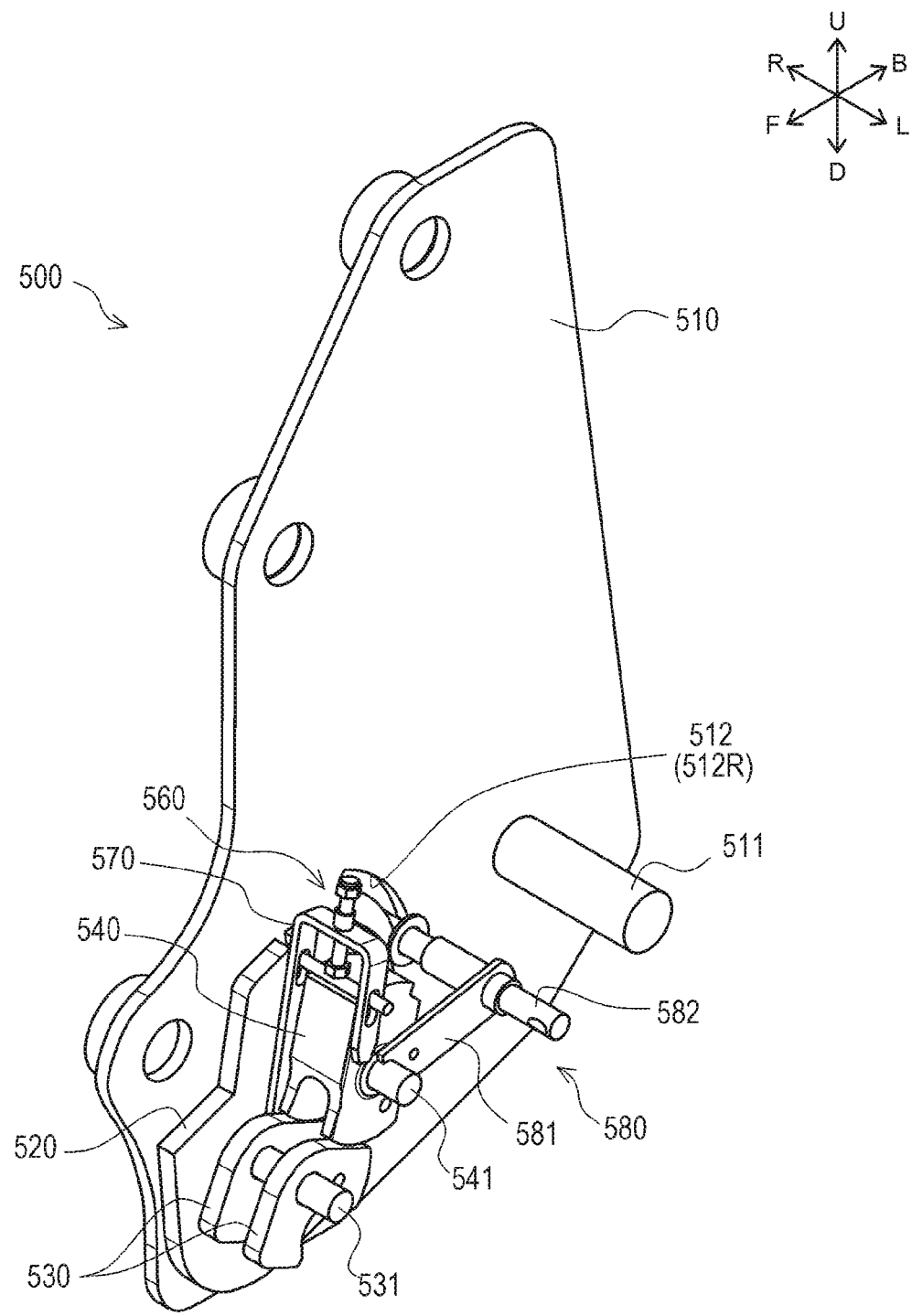
FIG. 21 is a left upper perspective view for which illustration of a part of the sub-frame unit is omitted.
Figure 22:
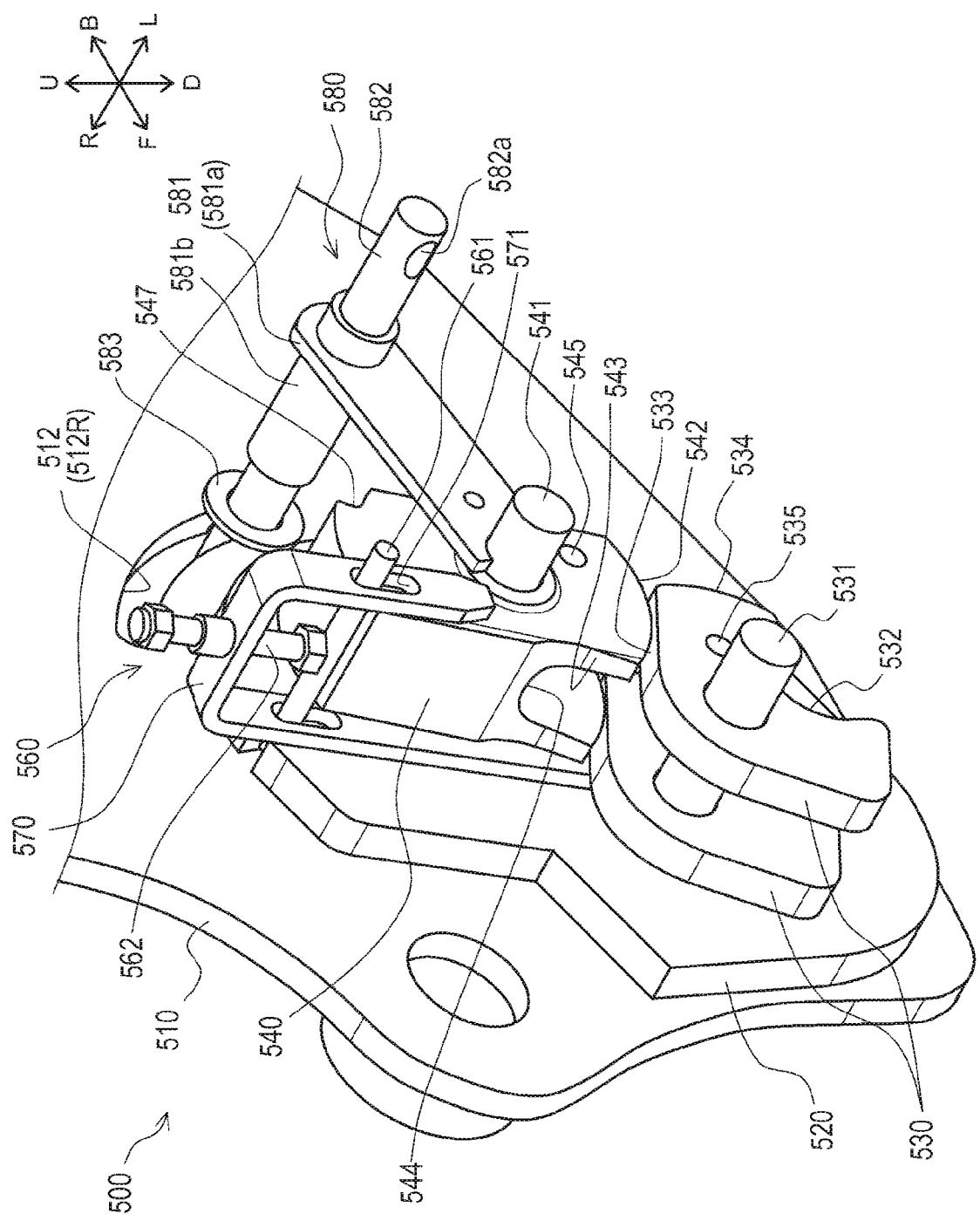
FIG. 22 is a left upper perspective view of the major parts of the sub-frame unit.
Figure 23:
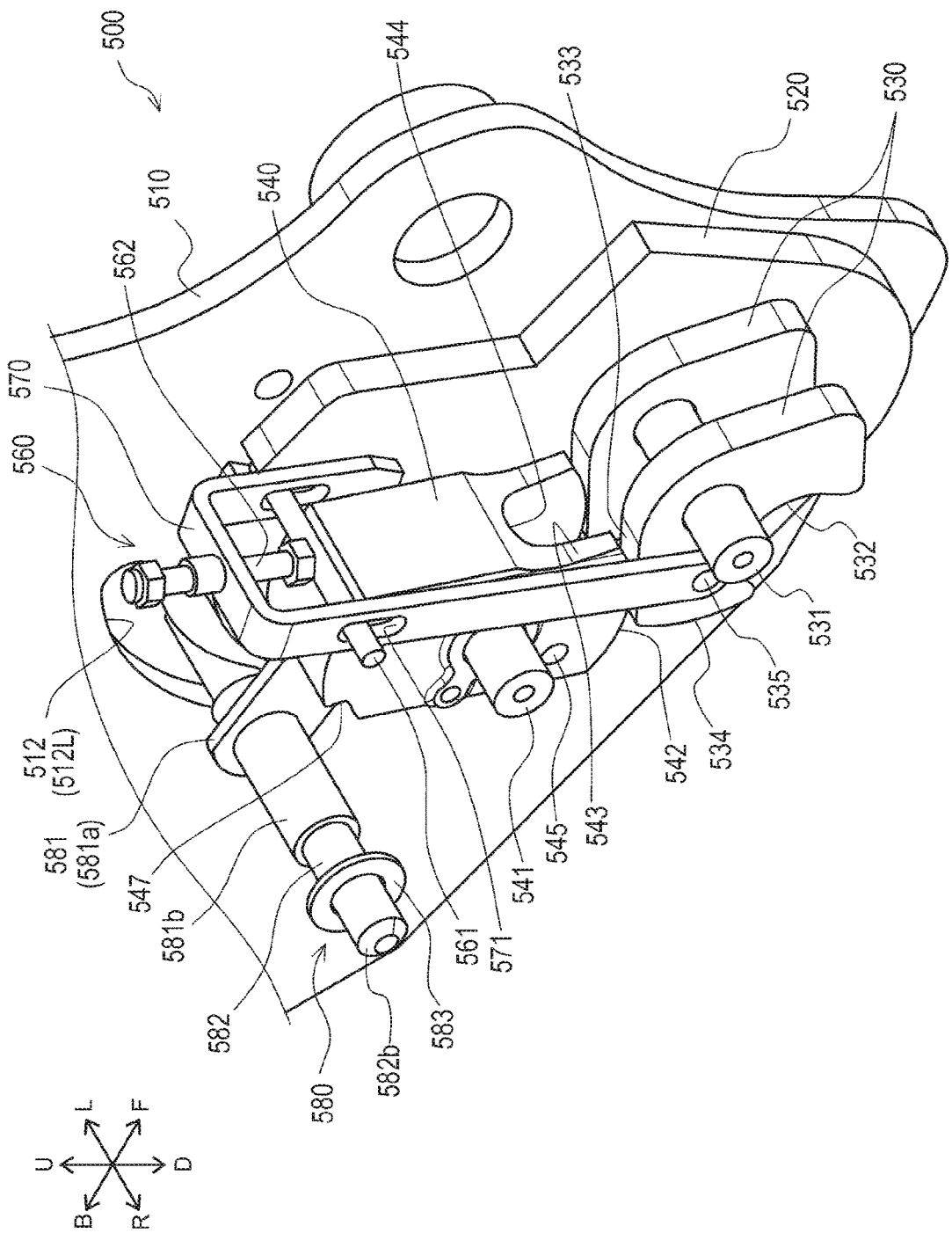
FIG. 23 is a right upper perspective view of the major parts of the sub-frame unit.
Figure 24:
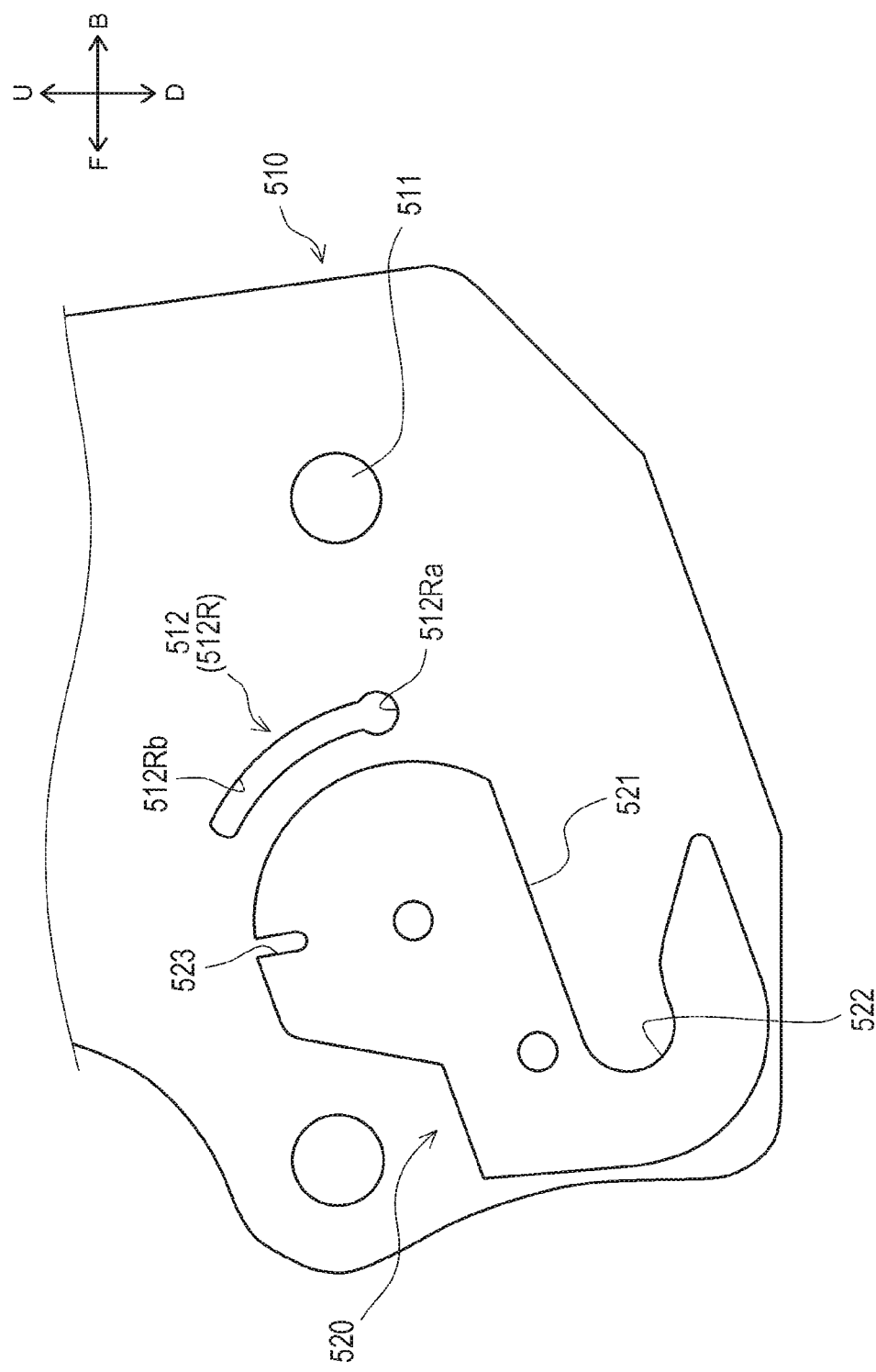
FIG. 24 is a left side enlarged view of the sub-frame of the right side.
Figure 27:
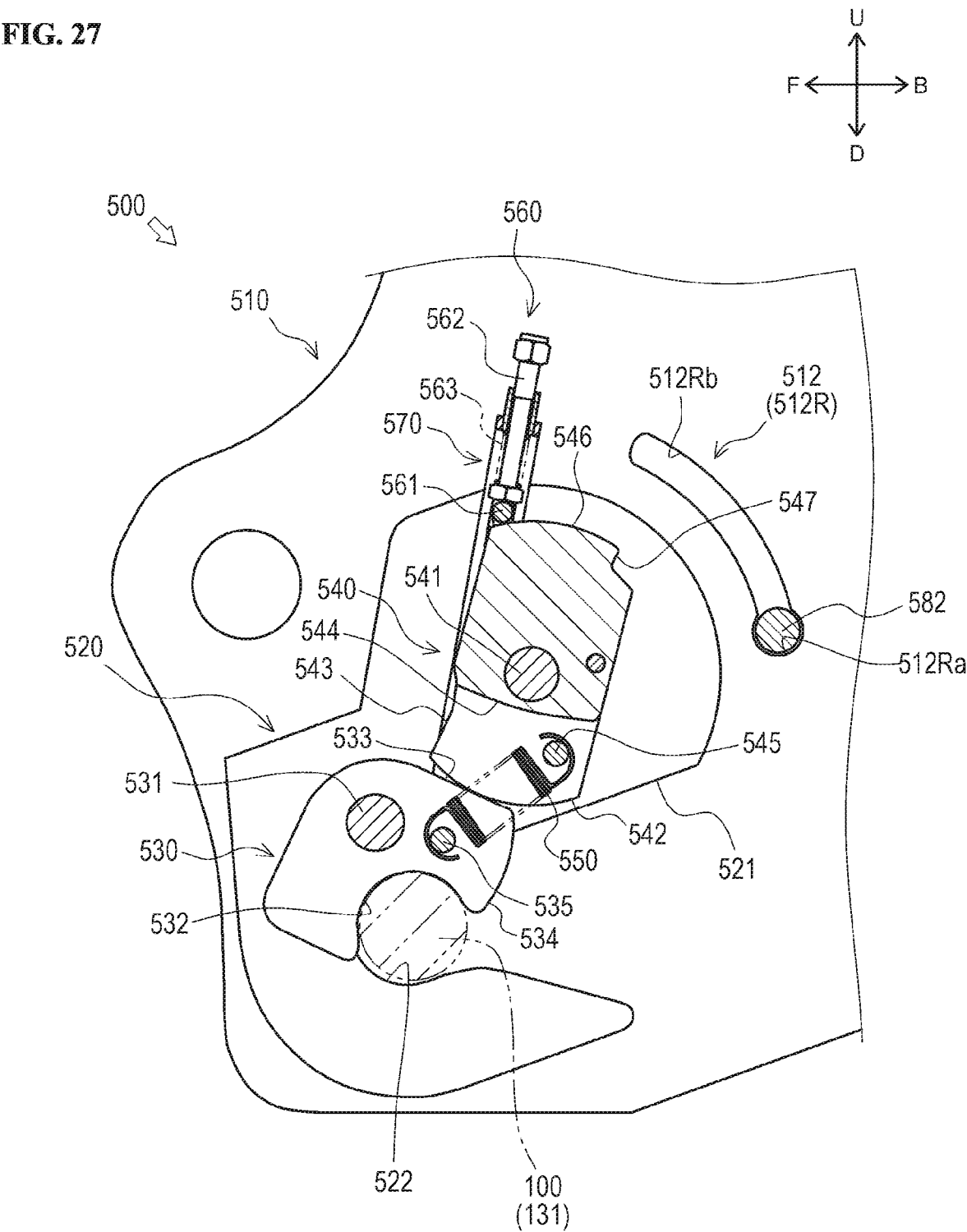
FIG. 27 is a left side cross section view showing a part of the sub-frame unit in a state retained on the main frame.

The lock bar 540 shown in FIG. 21 to FIG. 23, as well as FIG. 25 to FIG. 27, is an item for regulating the swing of the thumb 530. The lock bar 540 is provided between the left-right pair of guide plates 520. The lock bar 540 is formed in an oval shape having a pair of arcs in the side view. The lock bar 540 is placed to the rear and upward of the thumb 530. The lock bar 540 is provided mainly with a swing shaft 541, a lock bar side first abutting surface 542, a lock bar side second abutting surface 543, a groove part 544, a coupling shaft 545, a guide face 546, and a locked part 547.

The swing shaft 541 is an item that supports the lock bar 540 to be able to swing. The swing shaft 541 is placed with the axis line facing the left-right direction. Both ends of the swing shaft 541 are respectively fixed to the left and right guide plates 520. The swing shaft 541 is inserted through the center part of the lock bar 540.

The lock bar side first abutting surface 542 shown in FIG. 26 is the front side surface of the lock bar 540. The lock bar side first abutting surface 542 is formed in a curved surface shape with the surface facing front and downward. More specifically, the lock bar side first abutting surface 542 is formed in an arc shape with the swing shaft 541 as the center in the side view.

The lock bar side second abutting surface 543 is the front side surface of the lock bar 540. The lock bar side second abutting surface 543 is formed in a flat plane shape with the surface facing front and upward.

The groove part 544 shown in FIG. 22, FIG. 23, and FIG. 27 is formed on the bottom part of the lock bar 540. More specifically, the groove part 544 is formed so as to have the left-right center of the bottom of the lock bar 540 be recessed facing upward (the swing shaft 541 side).

The coupling shaft 545 is an item coupled by the spring 550 described later. The coupling shaft 545 is placed with the axis line facing the left-right direction. The coupling shaft 545 is fixed to the rear bottom part of the lock bar 540 (near the rear end part of the groove part 544). The coupling shaft 545 is placed so as to laterally span the groove part 544.

The guide face 546 shown in FIG. 26 and FIG. 27 is the surface that guides a detent pin 561 described later in the outer periphery part of the lock bar 540. The guide face 546 is formed in a curved surface shape with the surface facing the rear and upward. More specifically, the guide face 546 is formed in an arc shape with the swing shaft 541 as the center in the side view. The guide face 546 is formed sandwiching the swing shaft 541, at the side opposite to the lock bar side first abutting surface 542.

The locked part 547 is a part for locking the detent pin 561 described later. The locked part 547 is formed at the outer periphery part of the lock bar 540. The locked part 547 is formed so as to be adjacent to the rear side of the guide face 546. The locked part 547 is formed by a surface that stands up along the radial direction of the lock bar 540.

The spring 550 shown in FIG. 27 is an item for biasing the thumb 530 and the lock bar 540 facing a specified direction. The spring 550 is formed by a tension coil spring. The spring 550 is placed between the left-right pair of thumbs 530 and spanning the inside of the groove part 544 of the lock bar 540. One end of the spring 550 is coupled to the coupling shaft 535 of the thumb 530. The other end of the spring 550 is coupled to the coupling shaft 545 of the lock bar 540. By the biasing force of the spring 550, the thumb 530 is biased counterclockwise in the left side view, and the lock bar 540 is biased clockwise in the left side view. To simplify the illustration, the spring 550 is shown only in FIG. 27.

The detent mechanism shown in FIG. 22, FIG. 23, FIG. 26, and FIG. 27 is an item for regulating the swing of the lock bar 540. The detent mechanism 560 is provided mainly with a detent pin 561, a bolt 562, and a spring 563.

The detent pin 561 is formed in a round pillar shape. The detent pin 561, in a state with the axis line facing the left-right direction, has both left and right end parts provided so as to be respectively inserted through the notch parts 523 (see FIG. 24) of the left-right pair of guide plates 520. As a result, the detent pin 561 is able to move (slide) up and down along the lengthwise direction of the notch part 523.

The bolt 562 is a member that abuts the detent pin 561 from above. The bolt 562 is placed in a state with the head part facing downward. The bolt 562 is supported to be able to slide on the top surface of a release arm 570 described later. The head part (bottom end part) of the bolt 562 abuts the detent pin 561 from above.

The spring 563 is an item that biases the bolt 562 facing downward. The spring 563 is formed using a compression coil spring. The spring 563 is placed between the head part of the bolt 562 and the top surface of the release arm 570 described later. The bolt 562 is always biased facing downward by the spring 563, and thus the detent pin 561 is always biased facing downward. To simplify the illustration, the spring 563 is shown only in FIG. 27.

The release arm 570 is an item for suitably releasing the regulation of the swing of the lock bar 540 by the detent mechanism 560. The release arm 570 is formed with a long, thin plate material bent in approximately a U shape. The release arm 570 is formed having a left-right pair of side surfaces and a top surface by being bent in approximately a U shape opened facing downward. The release arm 570 is placed so that the left-right pair of side surfaces are positioned respectively at the left-right both sides of the lock bar 540. The top surface of the release arm 570 is placed so as to be positioned above the lock bar 540. The bottom end part of the release arm 570 (bottom end part of the side surface of the right side) is supported to be able to rotate on the coupling shaft 535 of the thumb 530. A long hole 571 is formed on the release arm 570.

The long holes 571 are formed on the respective left-right pair side surfaces of the release arm 570. The long holes 571 are formed extending by a specified length along the lengthwise direction of the side surface of the release arm 570. Both ends of the detent pin 561 are respectively inserted through the left-right pair of long holes 571.

The operating mechanism 580 shown in FIG. 22, FIG. 23, and FIG. 26 to FIG. 28 is an item for swinging the lock bar 540 when the sub-frame unit 500 is removed from the main frame 100. The operating mechanism 580 is provided mainly with an arm part 581, an operating lever 582, a washer 583, and a spring 584.

The arm part 581 is a member fixed to the lock bar 540. The arm part 581 is provided with a body part 581a and a boss part 581b.

The body part 581a is a plate member of an approximately rectangular shape in the side view. One end part (front end part) of the body part 581a is fixed to the left side surface of the lock bar 540 by a suitable fastening member (bolt, etc.). The body part 581a is placed so as to extend toward the rear from the lock bar 540.

The boss part 581b is a cylinder shaped member. The boss part 581b is placed with the axis line facing the left-right direction. The boss part 581b is fixed in a state inserted through the rear end part of the body part 581a.

The operating lever 582 is a member gripped by the operator and operated. The operating lever 582 is formed in approximately a round pillar shape. The operating lever 582 is inserted through so as to be able to slide on the boss part 581b. The diameter of the operating lever 582 is formed so as to be approximately the same as the width of the regulating hole 512L formed on the sub-frame 510, as well as the width (diameter) of the bottom end part 512Ra of the regulating hole 512R. Mainly formed on the operating lever 582 are a recess 582a and a sharp tip part 582b.

Figure 28:
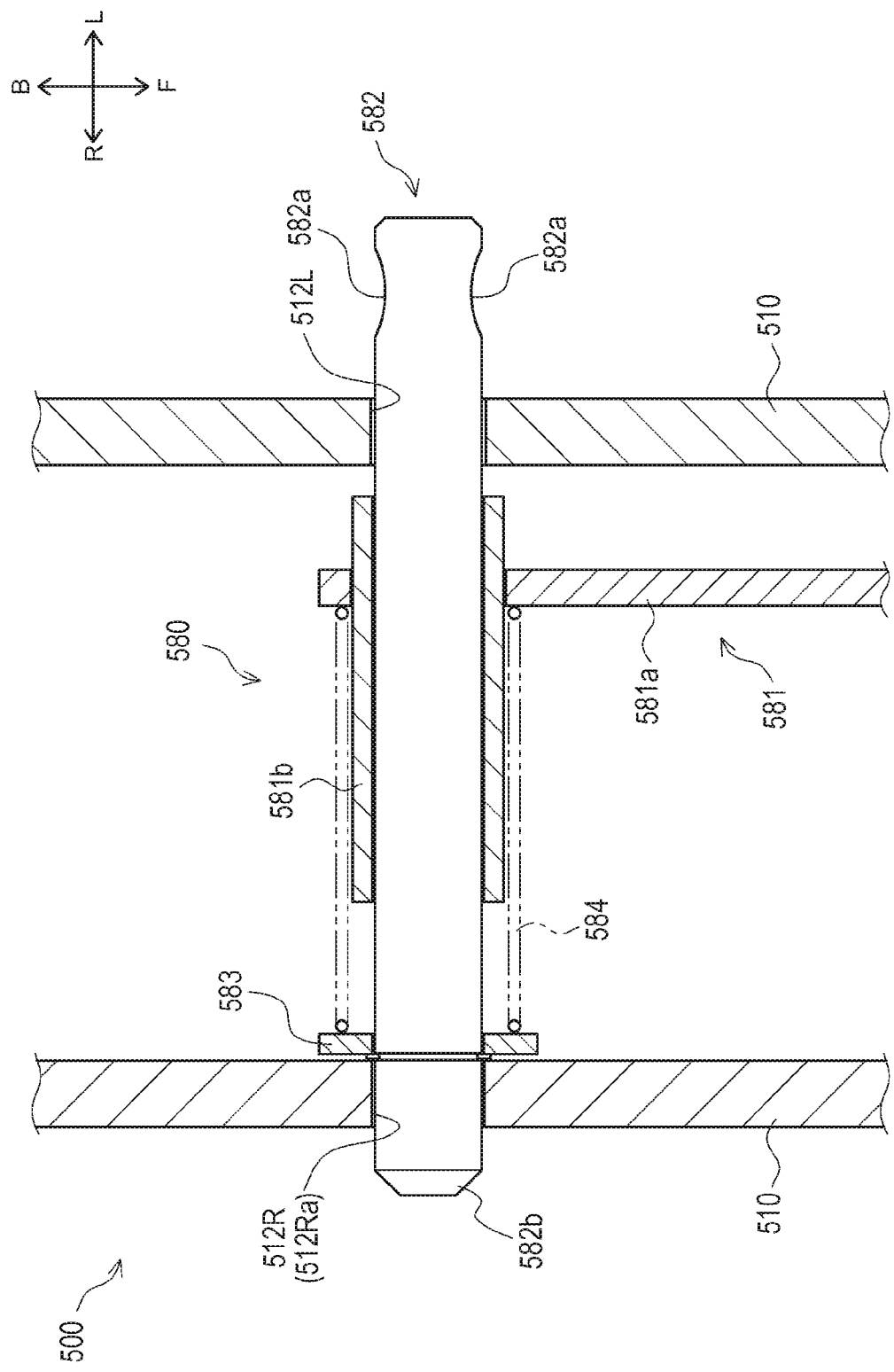
FIG. 28 is a plan cross section view showing an operating mechanism.

The recess 582a shown in FIG. 22 and FIG. 28 is a part formed by having the outer peripheral surface of the operating lever 582 recessed. The recess 582a is formed near the left end part of the operating lever 582. A pair of the recesses 582a is formed sandwiching the shaft core of the operating lever 582. In this way, by forming the recesses 582a on the round pillar shaped operating lever 582, it is possible to make it easier to grip (easier to operate) the operating lever 582.

The sharp tip part 582b shown in FIG. 23 and FIG. 28 is an approximately truncated cone shape formed so as to be reduced in diameter facing the right end of the operating lever 582. The diameter of the tip end (right end) of the sharp tip part 582b is formed so as to be smaller than the width of the arc part 512Rb (see FIG. 24) of the regulating hole 512R formed on the sub-frame 510.

The washer 583 shown in FIG. 22, FIG. 23, and FIG. 28 is an approximately annular disk shaped member. The right end part of the operating lever 582 is inserted through the washer 583. The washer 583 has the movement to the right with respect to the operating lever 582 regulated by a suitable locking tool.

The spring 584 shown in FIG. 28 is an item for biasing the operating lever 582 toward the right side. The spring 584 is formed by a compression coil spring. The spring 584 is placed between the body part 581a of the arm part 581 and the washer 583. By this spring 584, the washer 583 is always biased facing the right side, and thus the operating lever 582 is always biased facing the right side. To simplify the illustration, the spring 584 is shown only in FIG. 28 and FIG. 29.

Both left and right end parts of the operating lever 582 are respectively inserted through the regulating hole 512 of the left-right pair of sub-frames 510. More specifically, in the mounted state, the left end part of the operating lever 582 is inserted through the bottom end part of the regulating hole 512L of the left side sub-frame 510. Also, the right end part of the operating lever 582 is inserted through the bottom part 512Ra of the regulating hole 512R of the right side sub-frame 510. The operating lever 582 has the movement range (swing range) prescribed by the regulating hole 512.

Next, the method for removing the front loader 20 (more specifically, the part excluding the main frame 100 of the front loader 20) from the vehicle body 1 is explained.

FIG. 25 and FIG. 26 show the state with the sub-frame unit 500 mounted on the main frame 100 (mounted state). In the mounted state, the main frame side pin 131 is retained on the sub-frame side hook 522, and also, the sub-frame side pin 511 is retained on the main frame side hook 132 (see FIG. 25).

At this time, the lock bar 540, by the biasing force of the spring 550, is retained at the position (regulated position) swung furthest clockwise within the movement range determined by the operating lever 582 and the regulating hole 512. The lock bar side first abutting surface 542 of the lock bar 540, by abutting the thumb side first abutting surface 533 of the thumb 530, regulates the swing to the counterclockwise direction in the left side view of the thumb 530. As a result, the thumb 530 is retained at the position (engagement position) at which the engagement groove 532 engages with the main frame side pin 131, and prevents the falling out of the main frame side pin 131 from the sub-frame side hook 522. At this time, the main frame side pin 131 is fixed by the left and right sub-frame side hooks 522 and the engagement groove 532 positioned between them.

At this time, the lock bar side first abutting surface 542 (arc shaped surface with the swing shaft 541 as the center) of the lock bar 540 abuts the thumb side first abutting surface 533 (flat surface) of the thumb 530, so the pressing force that the lock bar 540 receives from the thumb 530 operates so as to have this face the swing center of the lock bar 540 (swing shaft 541). Specifically, the pressing force from the thumb 530 does not act in the direction (circumferential direction) that swings the lock bar 540. As a result, it is possible to make it so that the lock bar 540 does not swing by the pressing force received from the thumb 530.

Also, in the mounted state, the detent pin 561 presses against the guide face 546 of the lock bar 540. The guide face 546 is formed in a smooth arc shape, so the detent pin 561 is not locked with the lock bar 540, and the swinging of the lock bar 540 is not regulated by the detent pin 561.

Also, in the mounted state, the operating lever 582 is inserted through the bottom end part 512Ra of the regulating hole 512R of the sub-frame 510 (see FIG. 27). The width of the arc part 512Rb of the regulating hole 512R is smaller than the diameter of the operating lever 582, so it is not possible for the operating lever 582 to move within the regulating hole 512R. In this way, movement is regulated by the regulating hole 512R, so it is possible to prevent misoperation of the operating lever 582.

Figure 29:
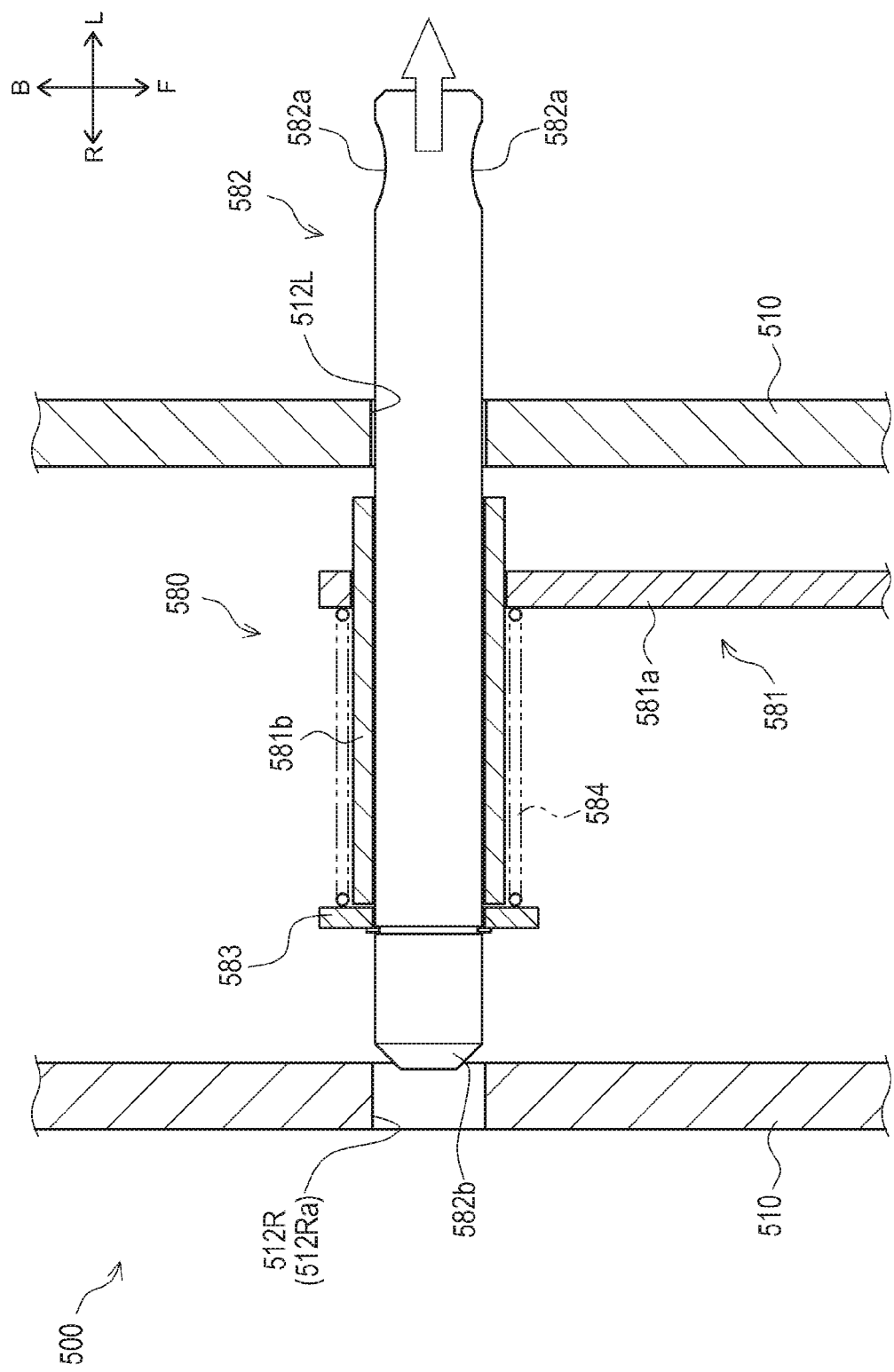
FIG. 29 is a plan cross section view showing the operating mechanism in a state with an operating lever pulled.

When swinging the lock bar 540 using the operating lever 582 from the mounted state, as shown in FIG. 29, the operating lever 582 is pulled to the outside (left side) until the washer 583 abuts the boss part 581b. As a result, it is possible to have the operating lever 582 significantly project to the outside of the sub-frame 510, so the operating lever 582 can be easily gripped (easily operated).

Also, by pulling the operating lever 582 to the outside, only the sharp tip part 582b of the operating lever 582 is positioned inside the regulating hole 512R. At this time, the diameter of the sharp tip part 582b positioned inside the regulating hole 512R is formed to be approximately the same as the width of the arc part 512Rb of the regulating hole 512R (see FIG. 27). Because of that, in a state with the operating lever 582 pulled to outside, the movement of the operating lever 582 is not regulated by the regulating hole 512R. Specifically, the operating lever 582 can move along the regulating hole 512R (arc part 512Rb).

Figure 30:
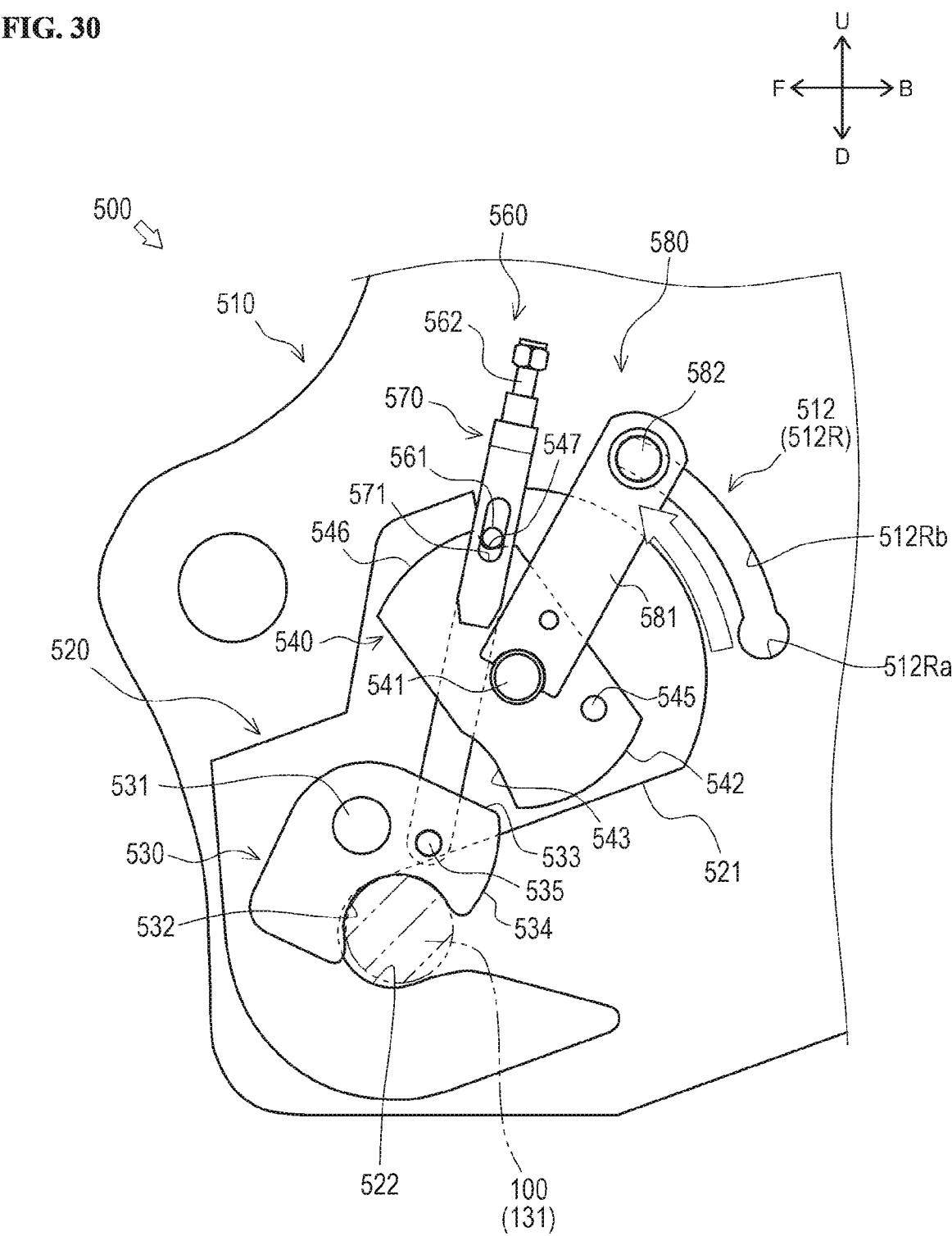
FIG. 30 is a left side cross section view showing a part of the sub-frame unit in a state with the operating lever operated.

With the operating lever 582 left pulled out, when the operating lever 582 is moved in the counterclockwise direction in the left side view along the regulating hole 512, in accordance with this, the lock bar 540 swings in the counterclockwise direction in the left side view (see FIG. 30).

When the lock bar 540 swings approximately 50° in the counterclockwise direction in the left side view from the mounted state (until the operating lever 582 is positioned near the top end part of the regulating hole 512), the detent pin 561 locks to the locked part 547 of the lock bar 540. Because of this, the lock bar 540 has the swing in the clockwise direction in the left side view regulated by the detent pin 561 and the locked part 547. Specifically, the lock bar 540 is retained at that position (regulation release position). Even if the operator releases his hand from the operating lever 582 in this state, the lock bar 540 does not return to the original position (regulated position).

In the state shown in FIG. 30, the vehicle body 1 is moved back in a state with the front loader 20 (the part excluding the main frame 100) lowered to the ground. Having done this, the main frame 100 (main frame side pin 131) moves to the rear relative to the sub-frame unit 500 while pushing the rear part of the thumb 530 upward (see FIG. 31). The thumb 530 swings in the counterclockwise direction in the let side view by the pressing force from the main frame side pin 131 and the biasing force by the spring 550. In the left side view, when the thumb 530 swings to the position for which the gap between the rear bottom surface of the thumb 530 and the top surface of the sub-frame side hook 522 becomes the diameter of the main frame side pin 131 or greater (release position), the engagement of the thumb 530 and the main frame 100 (main frame side pin 131) is released. When the vehicle body 1 is moved back further from this state, it is possible to remove the sub-frame unit 500 from the main frame 100.

Figure 31:
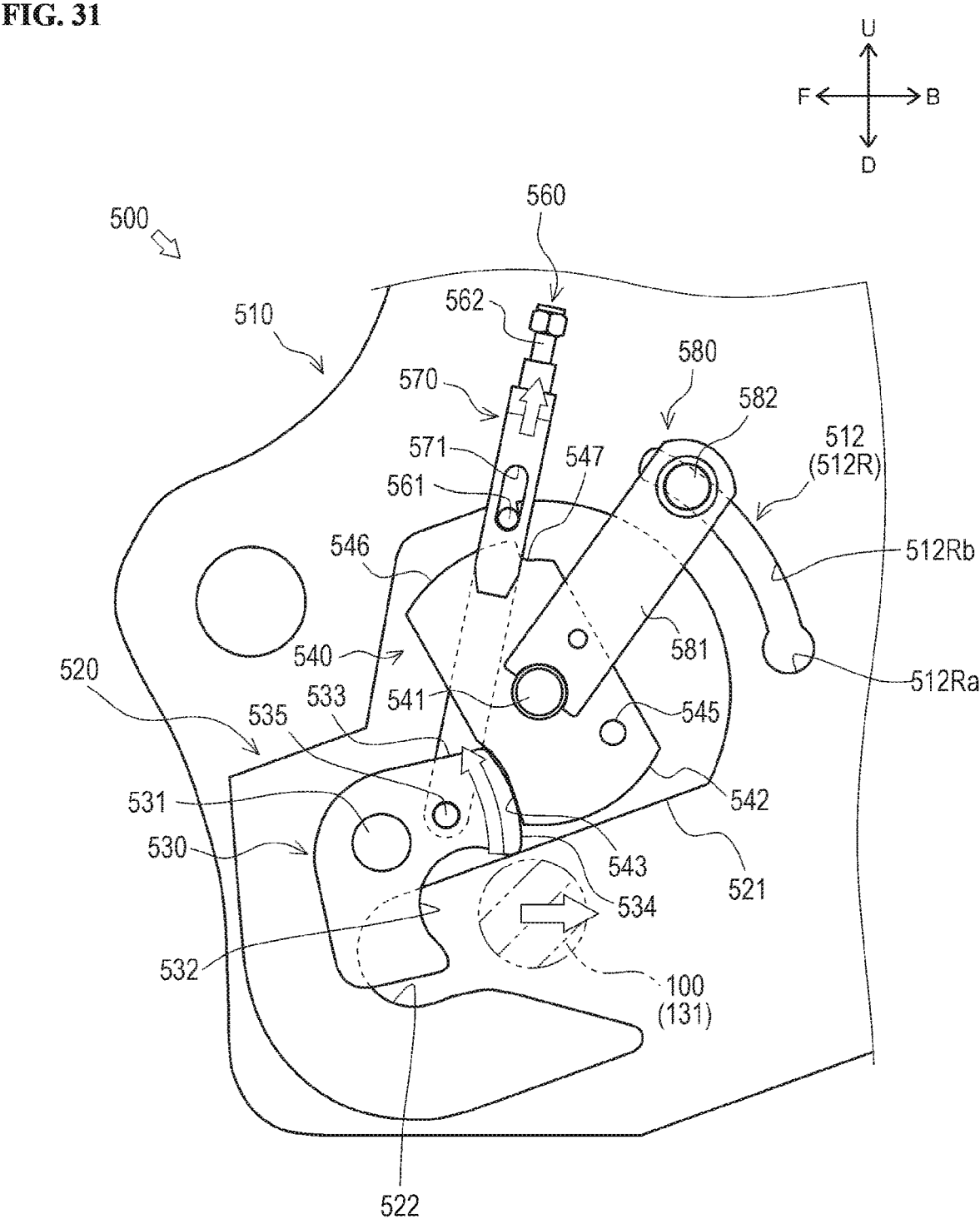
FIG. 31 is a left side view showing a part of the sub-frame unit midway in removal from the main frame.

Also, when the thumb 530 swings in the counterclockwise direction in the left side view, as shown in FIG. 31, the release arm 570 that is coupled to the coupling shaft 535 of the thumb 530 is pressed upward. When the release arm 570 is pressed upward, the detent pin 561 is pressed upward by the bottom end part of the long hole 571 of the release arm 570. As a result, the detent pin 561 is separated from the lock bar 540, and the locking of the detent pin 561 and the locked part 547 of the lock bar 540 is released. Specifically, regulation of swinging of the lock bar 540 by the detent pin 561 is released by the release arm 570.

When locking of the detent pin 561 and the locked part 547 is released, the lock bar 540 swings in the clockwise direction in the left side view by the biasing force of the spring 550. When the lock bar 540 swings, the thumb side second abutting surface 534 of the thumb 530 and the lock bar side second abutting surface 543 of the lock bar 540 abut (see FIG. 31). As a result, the swing of the lock bar 540 in the clockwise direction in the left side view is regulated.

At this time, the thumb side second abutting surface 534 of the thumb 530 (the arc shaped surface with the swing shaft 531 as the center) abuts the lock bar side second abutting surface 543 (flat plane) of the lock bar 540, so the pressing force that the thumb 530 receives from the lock bar 540 acts so as to face the swing center of the thumb 530 (swing shaft 531). Specifically, the pressing force from the lock bar 540 does not act in the direction that swings the thumb 530 (circumferential direction). As a result, it is possible to have the thumb 530 not swing by the pressing force received from the lock bar 540.

In this way, in a state with the front loader 20 (the part excluding the main frame 100) lowered to the ground, after operating the operating lever 582 and releasing the lock of the thumb 530 with the main frame side pin 131, by moving back the vehicle body 1, it is possible to easily remove the front loader 20 sub-frame unit 500, the boom 300, and the bucket 400 from the main frame 100.

Next, the method of mounting the front loader 20 (more specifically, the part excluding the main frame 100 of the front loader 20) on the vehicle body 1 is explained.

Figure 32:
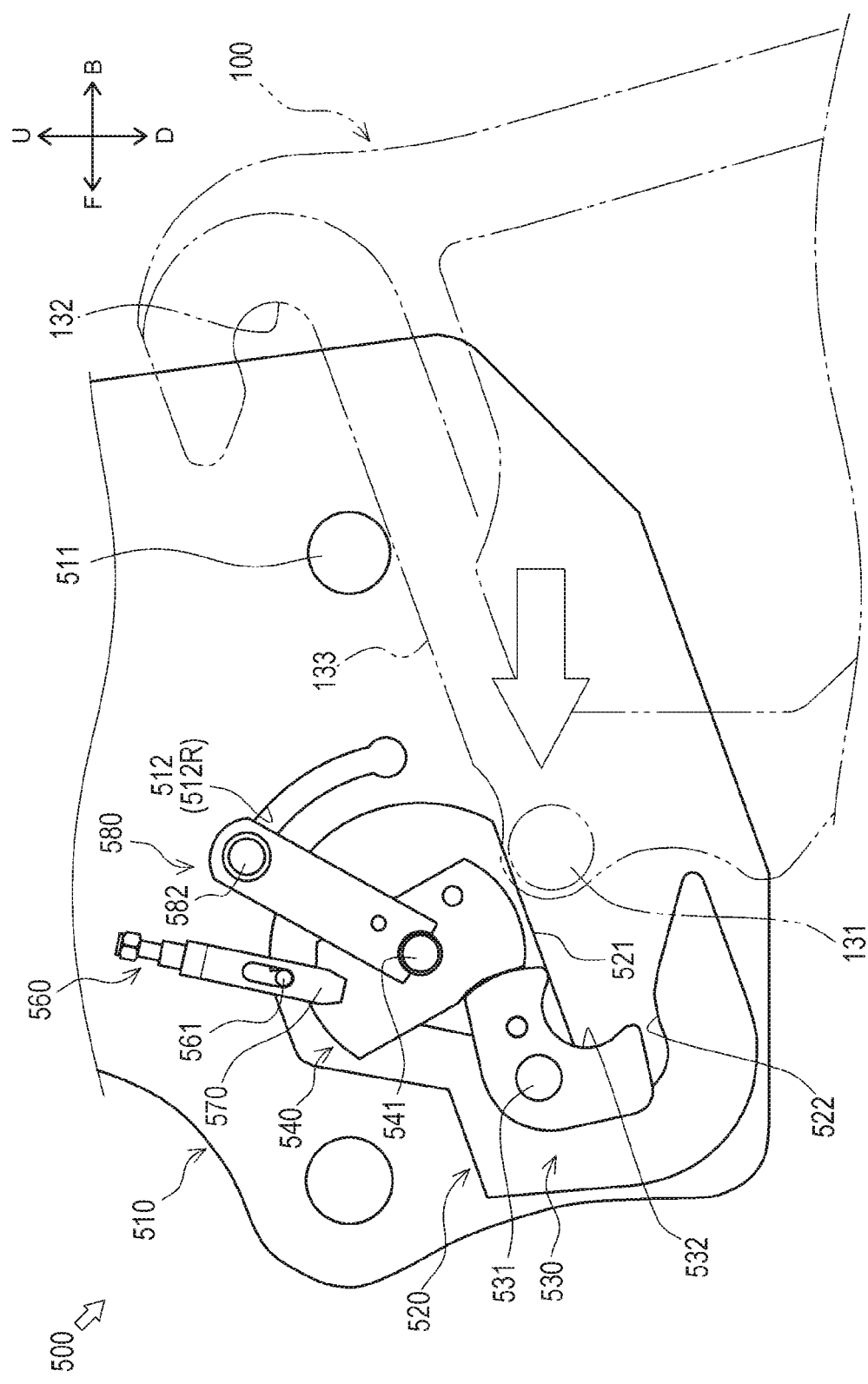
FIG. 32 is a left side view showing the sub-frame unit midway in mounting on the main frame.

In a state with the front loader 20 (the part excluding the main frame 100) removed from the main frame 100 and lowered to the ground, as shown in FIG. 32, the vehicle body 1 is moved forward, and the main frame 100 is made to approach the sub-frame unit 500.

When the vehicle body 1 is moved forward, the main frame side pin 131 abuts the sub-frame side guide face 521. Also, the main frame side pin 131 is guided to the sub-frame side hook 522 by the sub-frame side guide face 521. Also, when the vehicle body 1 moves forward, the main frame side guide face 133 abuts the sub-frame side pin 511. Also, the sub-frame side pin 511 is guided to the main frame side hook 132 by the main frame side guide face 133.

Here, because the sub-frame side guide face 521 is formed in a front downward inclined plane shape, when the vehicle body 1 is moved forward, it is easy for the main frame side pin 131 to abut the sub-frame side guide face 521. Also, even dale height of the sub-frame unit 500 is slightly skewed with respect to the main frame 100, it is possible for the main frame side pin 131 to be abutted with the sub-frame side guide face 521, so it is possible to easily guide the main frame side pin 131 to the sub-frame side hook 522.

Similarly, since the main frame side guide face 133 is also formed in a front downward inclined plane shape, when the vehicle body 1 is moved forward, it is easy for the sub-frame side pin 511 to abut the main frame side guide face 133. Also, even if the height of the sub-frame unit 500 is slightly skewed with respect to the main frame 100, it is possible to have the sub-frame side pin 511 abut the main frame side guide face 133, so it is possible to easily guide the sub-frame side pin 511 to the main frame side hook 132.

Figure 33:
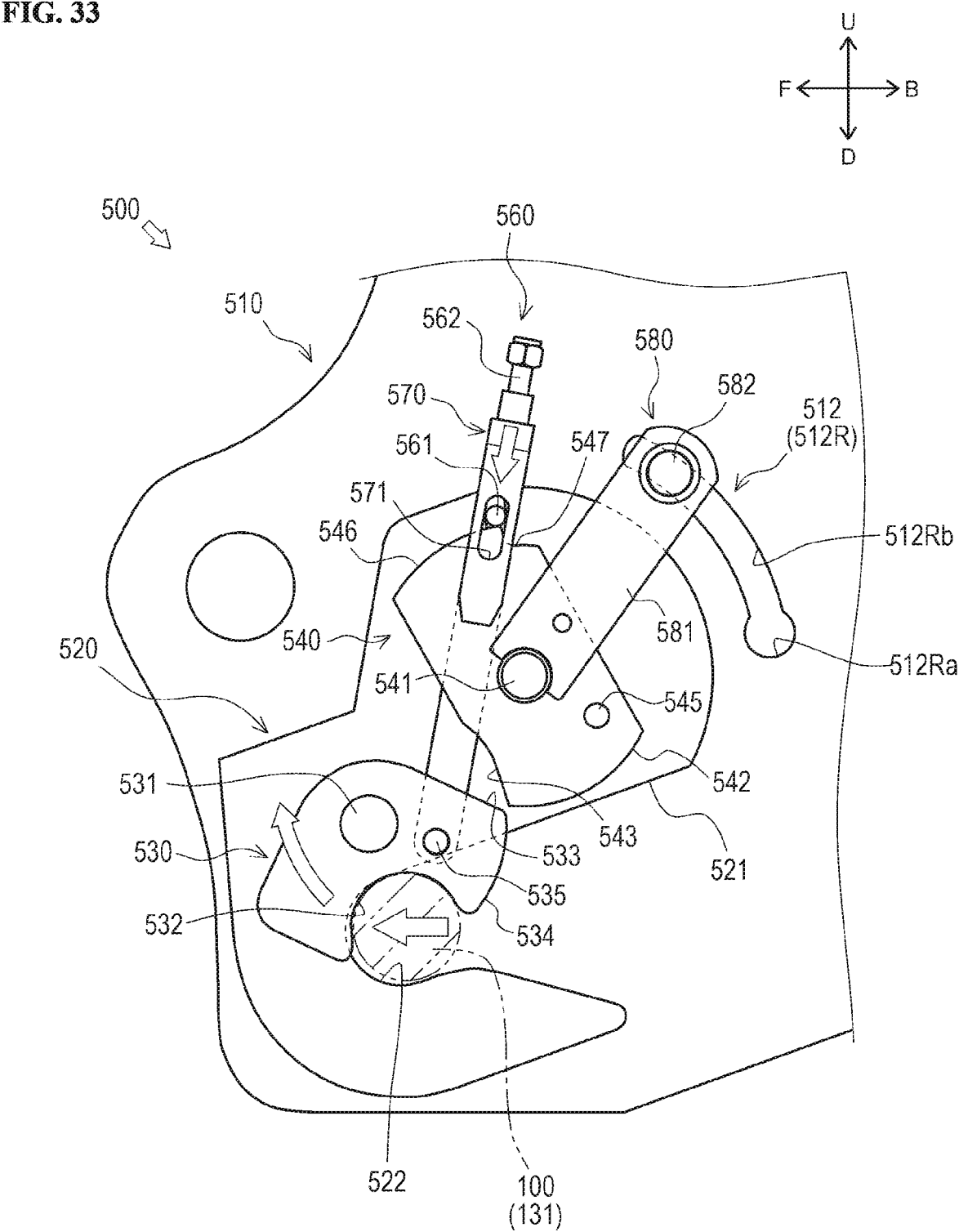
FIG. 33 is a left side view showing a part of the sub-frame unit n a state with the thumb returned to the engagement position.
Figure 34:
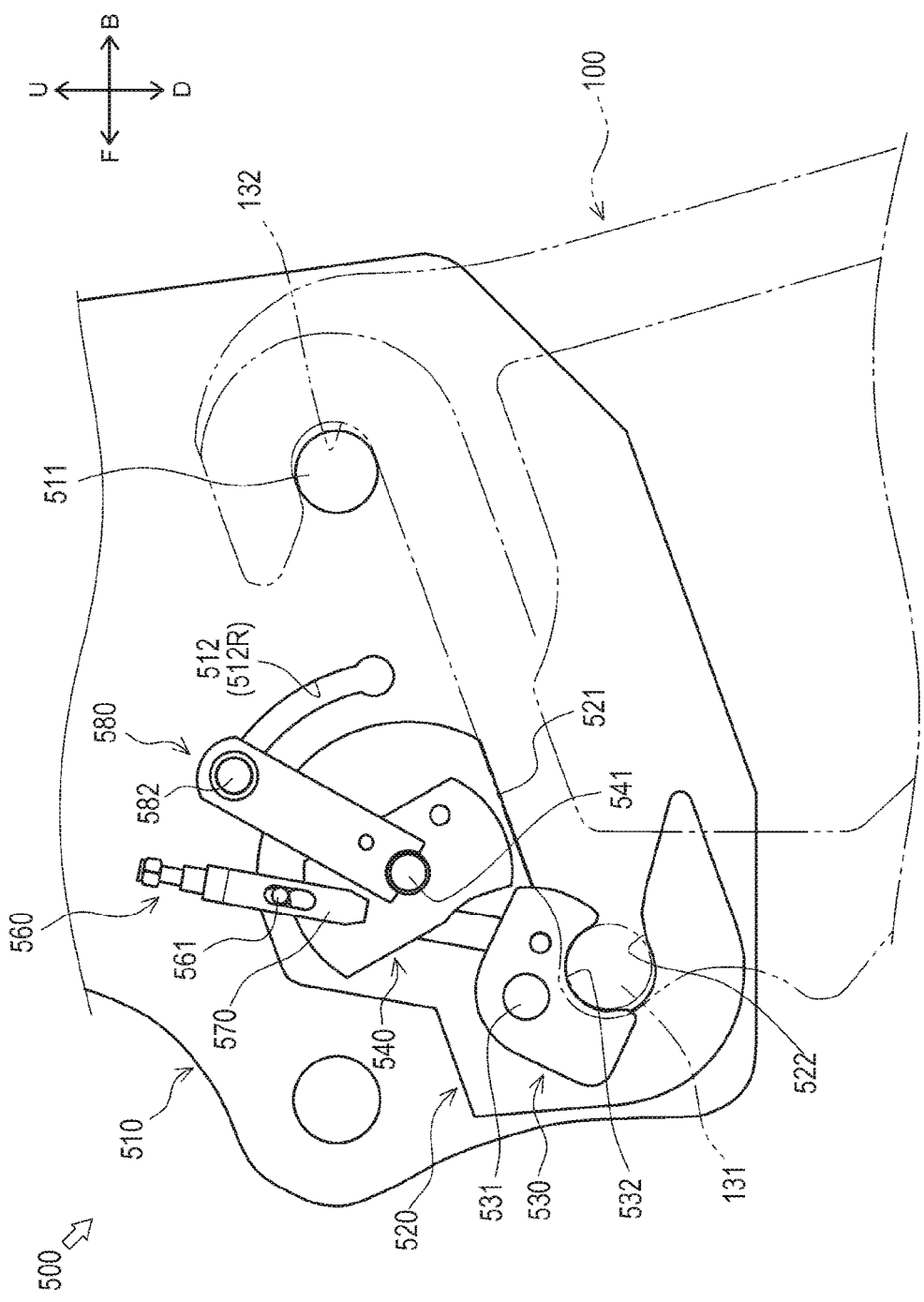
FIG. 34 is a left side view showing a part of the main frame and the sub-frame unit in a state with the thumb returned to the engagement position.

As shown in FIG. 33 and FIG. 34, the main frame side pin 131, when guided to the sub-frame side hook 522, presses the front end part of the thumb 530 facing forward, and swings the thumb 530 in the clockwise direction in the left side view (front upward direction). As a result, the thumb 530 again returns to the engagement position, and engages with the main frame side pin 131.

Also, the release arm 570 is pulled downward along with swinging of the thumb 530. When the release arm 570 is pulled down, the detent pin 561 that is pressed upward by the release arm 570 again abuts the guide face 546 of the lock bar 540.

Also, by the thumb 530 swinging, the thumb 530 (thumb side second abutting surface 534) and the lock bar 540 (lock bar side second abutting surface 543) are separated. As a result, it is possible for the lock bar 540 to swing clockwise in the left side view.

The lock bar 540 swings in the clockwise direction in the left side view by the biasing force of the spring 550, and again moves to the regulated position (see FIG. 25 and FIG. 26). In this state, the swinging of the thumb 530 is regulated by the lock bar 540, and it is possible to prevent falling out of the main frame side pin 131 from the sub-frame side hook 522.

In this way, in a state with the front loader 20 (the part excluding the main frame 100) lowered to the ground, simply by moving the vehicle body 1 forward, it is possible to easily mount the sub-frame unit 500, as well as the boom 300 and the bucket 400 provided on the sub-frame unit 500 onto the main frame 100.

Therefore, during the attachment and detachment work of the front loader 20, it is possible to eliminate the necessity of the conventional tasks of operating the boom 300 by hydraulics to align with the main frame 100, and inserting and retracting the pin to fix the boom 300 to the main frame 100. The operator also does not have to get in and out of the cabin 10 for these tasks. Thus, it is possible to reduce the work manhours when attaching and detaching the front loader 20, and to shorten the work time accompanying this.

Also, because a structure is used for performing alignment of the main frame 100 and the sub-frame unit 500 to each other, it is possible to perform alignment of the main frame 100 and the sub-frame unit 500 smoothly.

As described above, the attaching-detaching structure of the front loader 20 of this embodiment is provided with:

a thumb 530 (engaging member) supported on a sub-frame 510 for supporting a boom 300 so as to be movable between an engagement position for engaging with a main frame 100 provided on a vehicle body 1 and a release position at which engagement with the main frame 100 is released, and which is biased in the release direction toward the release position from the engagement position; and a lock bar 540 (regulating member) supported on the sub-frame 510 so as to be movable between a regulated position for regulating the movement of the thumb 530 to the release direction from the engagement position, and a regulation release position that allows the thumb 530 to move to the release position, and that is biased in the regulated direction from the regulation release position to the regulated position, a detent mechanism 560 (release position retention mechanism) configured to retain the lock bar 540 at the regulation release position, and a release arm 570 (release mechanism) configured to release the retaining of the lock bar 540 by the detent mechanism 560 along with movement of the thumb 530 to the release position.

By using such a configuration, it is possible to make the attaching and detaching work to the vehicle body 1 easier. In specific terms, in a state with the lock bar 540 retained at the regulation release position, when the thumb 530 moves to the release position, it is possible to release the retaining of the lock bar 540 along with movement of the thumb 530. As a result, it is possible to move the lock bar 540 again toward the regulated position, so it is possible to quickly perform regulating of the thumb 530 by the lock bar 540.

Also, the thumb 530 in the release position is an item for regulating the movement of the lock bar 540 from the regulation release position to the regulated direction.

By using such a configuration, in a state with the thumb 530 in the release position, since it is not necessary for the lock bar 540 to regulate the movement of the thumb 530, it is possible to prevent movement of the lock bar 540 to the regulated direction. Also, the mechanism for preventing the movement of the lock bar 540 can be used jointly with the thumb 530, and possible to reduce the number of parts.

Also, the thumb 530 is an item that is configured so as to be supported on the sub-frame 510 to be able to swing between the engagement position and the release position.

By using such a configuration, using a simple structure, it is possible for the thumb 530 to engage with the main frame 100, and also possible to release the engagement of the thumb 530 with the main frame 100.

Also, the lock bar 540 is an item configured so that it can be supported on the sub-frame 510 to be able to swing between the regulated position and the regulation release position.

By using such a configuration, using a simple structure, it is possible to regulate the movement of the thumb 530 from the engagement position to the release direction, and also to release the regulation of the movement of the thumb 530.

Also, the thumb 530 is configured to be supported on the sub-frame 510 to be able to swing between the engagement position and the release position, the lock bar 540 is configured to be supported on the sub-frame 510 to be able to swing between the regulated position and the regulation release position, the swing shaft 531 of the thumb 530 is arranged to be parallel to the swing shaft 541 of the lock bar 540, the part at which the lock bar 540 abuts the thumb 530 in the regulated position (lock bar side first abutting surface 542) is formed in an arc shape with the swing shaft 541 of the lock bar 540 as the center in the swing-axis-line direction view of the lock bar 540, and the part at which the thumb 530 abuts the lock bar 540 in the regulated position (thumb side first abutting surface 533) is formed in linear form in the swing-axis-line direction view of the thumb 530.

By using such a configuration, when the lock bar 540 is regulating the swing of the thumb 530, it is possible to prevent having the lock bar 540 swing due to pressing force received from the thumb 530.

Also, the thumb 530 is configured to be supported on the sub-frame 510 to be able to swing between the engagement position and the release position, the lock bar 540 is configured to be supported on the sub-frame 510 to be able to swing between the regulated position and the regulation release position, the swing shaft 531 of the thumb 530 is arranged to be parallel to the swing shaft 541 of the lock bar 540, the part at which the thumb 530 abuts the lock bar 540 in the release position (thumb side second abutting surface 534) is formed in an arc shape with the swing shaft 531 of the thumb 530 as the center in the swing axis line direction view of the thumb 530, and the part of the lock bar 540 that abuts the thumb 530 in the release position is formed in linear form in the swing-axis-line direction view of the lock bar 540.

By using such a configuration, when the thumb 530 is regulating the swing of the lock bar 540, it is possible to prevent the thumb 530 from swinging due to pressing force received from the lock bar 540.

Also, the detent mechanism 560 is provided with a detent pin 561 (abutting part) that is biased so as to abut the outer periphery part of the lock bar 540, and regulates the movement of the lock bar 540 by abutting with the outer periphery part of the lock bar 540, and the release arm 570 is an item that presses so as to separate the detent pin 561 from the outer periphery part of the lock bar 540 along with movement of the thumb 530 to the release position.

By using such a configuration, it is possible to use a simple structure for the detent mechanism 560 and the release arm 570.

The thumb 530 is an item that is configured to be pressed by the main frame 100 when the main frame 100 moves relatively so as to approach the sub-frame 510, and to move toward the engagement position from the release position.

By using such a configuration, by having the vehicle body 1 be made to approach the sub-frame 510 that is removed from the vehicle body 1 (main frame 100), it is possible to easily have the thumb 530 engage with the main frame 100.

Also, the attaching-detaching structure of the front loader 20 of this embodiment is an item that is further provided with a spring 550 (biasing member) that is coupled to the thumb 530 and the lock bar 540, biases the thumb 530 in the release direction, and also biases the lock bar 540 in the regulated direction.

By using such a configuration, by jointly using the member for biasing the alum 530 and the lock bar 540, it is possible to reduce the number of parts.

Also, the attaching-detaching structure of the front loader 20 of this embodiment is an item provided with an operating lever 582 (operation tool) for moving the lock bar 540.

By using such a configuration, it is possible to easily move the lock bar 540 using the operating lever 582.

Also, the front loader 20 of this embodiment is an item provided with the attaching-detaching structure described above.

By using such a configuration, it is possible to provide the front loader 20 that can make easier the work of attaching and detaching to the vehicle body 1.

Also, the tractor (work vehicle) of this embodiment is provided with the front loader 20 described above.

By using such a configuration, it is possible to provide a tractor that can make easier the work of attaching and detain the front loader 20 to the vehicle body 1.

The thumb 530 of this embodiment one mode of embodying the engaging member of the present invention.

Also, the lock bar 540 of this embodiment is one mode of embodying the regulating member of the present invention.

Also, the detent mechanism 560 of this embodiment is one mode of embodying the release position retention mechanism of the present invention.

Also, the release arm 570 of this embodiment is one mode of embodying the release mechanism of the present invention.

Also, the detent pin 561 of this embodiment is one mode of embodying the abutting part of the present invention.

Also, the spring 550 of this embodiment is one mode of embodying the biasing member of the present invention.

Also, the operating lever 582 of this embodiment is one mode of embodying the operation tool of the present invention.

Also, the tractor of this embodiment is one mode of embodying the work vehicle of the present invention.

Above, an embodiment of the present invention was explained, but the invention is not limited to this, and various modifications are possible within the scope of the invention noted in the claims.

EXPLANATION OF CODES

1 Vehicle body
20 Front loader
100 Main frame
131 Main frame side pin
132 Main frame side hook
133 Main frame side guide face
133*a* Recess
210 Sub-frame
211 Sub-frame side pin
221 Sub-frame side guide face
222 Sub-frame side hook
230 Thumb
240 Lock bar
245 First locked part
250 Control plate
260 Detent pin 270 Operation tool
300 Boom

What is claimed is:

1. A readily attachable and detachable structure of a front loader comprising:
   a first retained part provided on one of a main frame that is provided on a vehicle body or a sub-frame that is detachable with the main frame and supports a boom;
   a second retained part provided on the other of the main frame or the sub-frame;
   a first retaining part that is provided on the side opposite to the side on which the first retained part is provided and retains the first retained part;
   a second retaining part that is provided on the side opposite to the side on which the second retained part is provided and retains the second retained part;
   a first guiding part that guides the first retained part to the first retaining part when the sub-frame is mounted on the main frame; and
   a second guiding part that guides the second retained part to the second retaining part when the sub-frame is mounted on the main frame, wherein:
   the first retained part is provided on the main frame,
   the second retained part is provided on the sub-frame,
   the first retaining part is provided on the sub-frame,
   the second retaining part is provided on the main frame,
   the first guiding part is provided on the sub-frame, and
   the second guiding part is provided on the main frame.

2. The readily attachable and detachable structure of a front loader according to claim 1, wherein:
   the first retaining part and the second retaining part are respectively formed to support the first retained part and the second retained part respectively from below.

3. The readily attachable and detachable structure of a front loader according to claim 1, wherein:
   the second guiding part is formed so as to guide the second retained part to the second retaining part while supporting from below when the sub-frame is mounted on the main frame.

4. The readily attachable and detachable structure of a front loader according to claim 1, wherein:
   the first guiding part is formed so as to guide the first retained part to the first retaining part while being supported from below by the first retained part when the sub-frame is mounted on the main frame.

5. The readily attachable and detachable structure of a front loader according to claim 1, wherein:
   the second guiding part and the first guiding part are respectively formed in an inclined plane form for which the vertical direction height becomes smaller as they face in the front direction of the vehicle body.

6. The readily attachable and detachable structure of a front loader according to claim 1, wherein:
   the main frame is provided with a recess formed between the second guiding part and the first retained part.

7. The readily attachable and detachable structure of a front loader according to claim 1, further comprising:
   an engaging part that is provided on the sub-frame, and engages with the first retained part when the first retained part is guided by the first guiding part to the first retaining part, preventing falling out of the first retained part from the first retaining part.

8. A work vehicle provided with the readily attachable and detachable structure of the front loader according to claim 1.

* * * * *